(12) United States Patent
Yanai et al.

(10) Patent No.: US 8,804,249 B2
(45) Date of Patent: Aug. 12, 2014

(54) ZOOM LENS AND IMAGE PICKUP APPARATUS USING THE SAME

(71) Applicant: Olympus Imaging Corp., Tokyo (JP)

(72) Inventors: Tetsuya Yanai, Tokyo (JP); Minoru Ueda, Kanagawa (JP); Mayu Miki, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 13/869,423

(22) Filed: Apr. 24, 2013

(65) Prior Publication Data

US 2013/0286277 A1    Oct. 31, 2013

(30) Foreign Application Priority Data

Apr. 27, 2012 (JP) ................................. 2012-102385
Apr. 27, 2012 (JP) ................................. 2012-102386
Apr. 27, 2012 (JP) ................................. 2012-102387
Jan. 11, 2013 (JP) ................................. 2013-003779

(51) Int. Cl.
*G02B 15/14* (2006.01)

(52) U.S. Cl.
USPC .......................................... 359/687; 359/683

(58) Field of Classification Search
USPC .................................................. 359/683, 687
See application file for complete search history.

(56) References Cited

U.S. PATENT DOCUMENTS

| | | | |
|---|---|---|---|
| 2006/0056055 A1* | 3/2006 | Obama et al. | 359/689 |
| 2007/0070514 A1* | 3/2007 | Obama | 359/676 |
| 2007/0070515 A1* | 3/2007 | Obama | 359/676 |

FOREIGN PATENT DOCUMENTS

JP    2010-217478    9/2010

* cited by examiner

*Primary Examiner* — Scott J Sugarman
(74) *Attorney, Agent, or Firm* — Kenyon & Kenyon LLP

(57) ABSTRACT

A zoom lens includes in order from an object side, a first lens unit having a positive refractive power, a second lens unit having a negative refractive power, a third lens unit having a positive refractive power, and a fourth lens unit having a positive refractive power, and at the time of zooming, the first lens unit moves, and the zoom lens satisfies the following conditional expressions (1-1a), (1-2a), and (1-3a).

$$0.43 < (\beta_{2T}/\beta_{2W})/(\beta_{3T}/\beta_{3W}) < 0.68 \quad (1\text{-}1a)$$

$$0.4 < (\Delta_{1G}/f_1)/(\Delta_{4G}/f_4) < 2.3 \quad (1\text{-}2a)$$

$$2.1 < f_3/f_W < 4.1 \quad (1\text{-}3a)$$

34 Claims, 39 Drawing Sheets

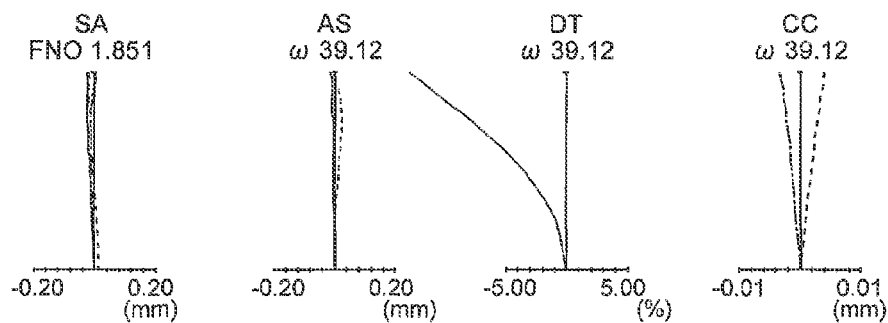
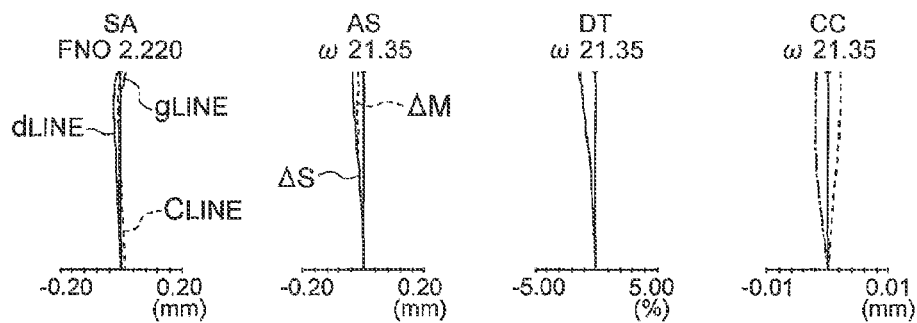

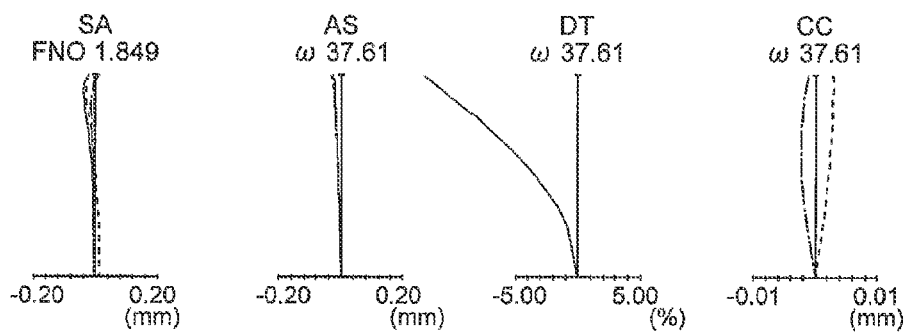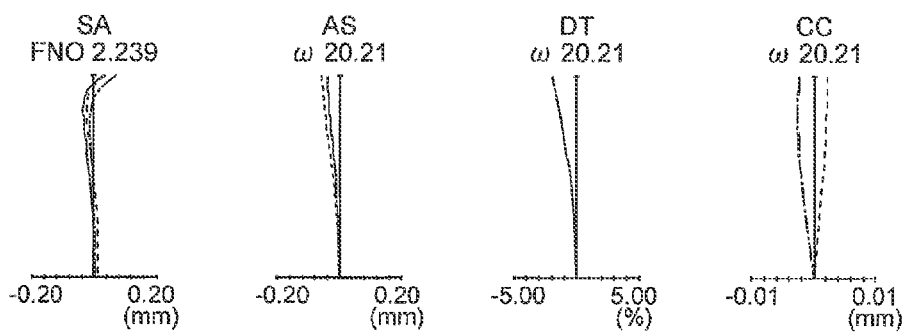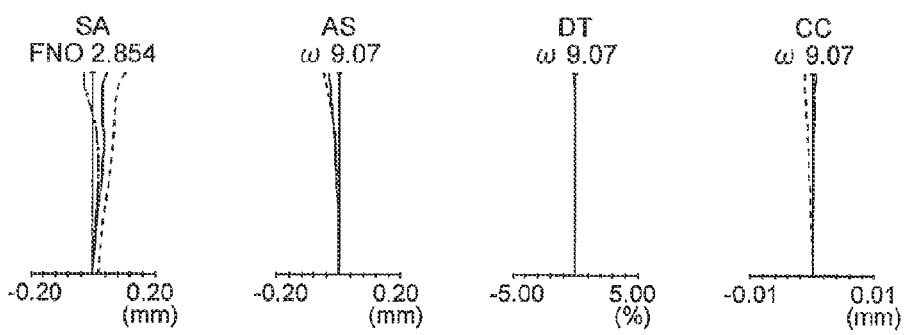

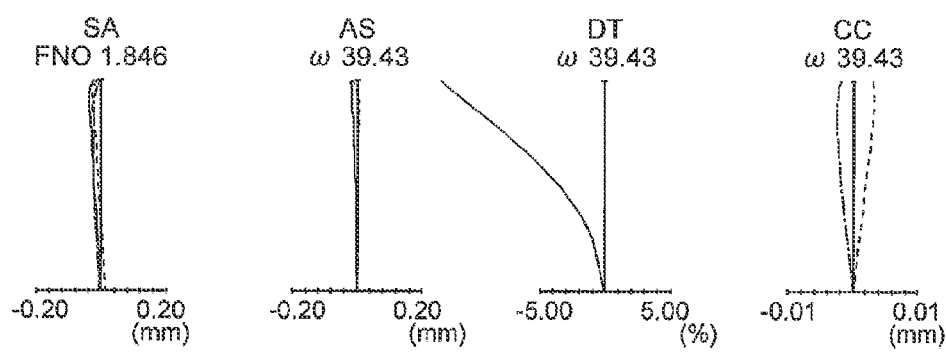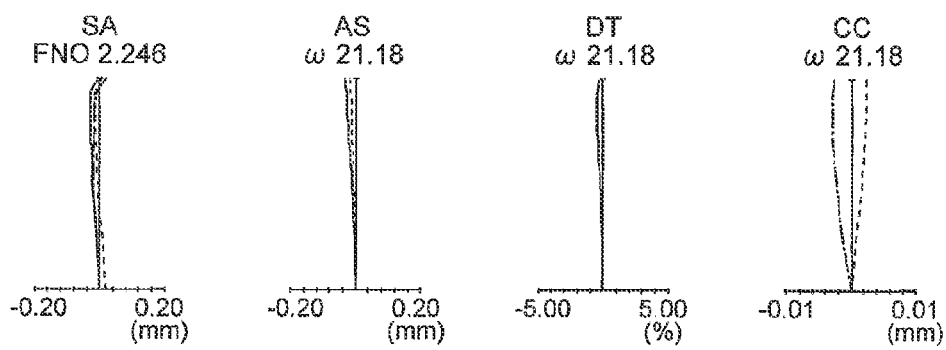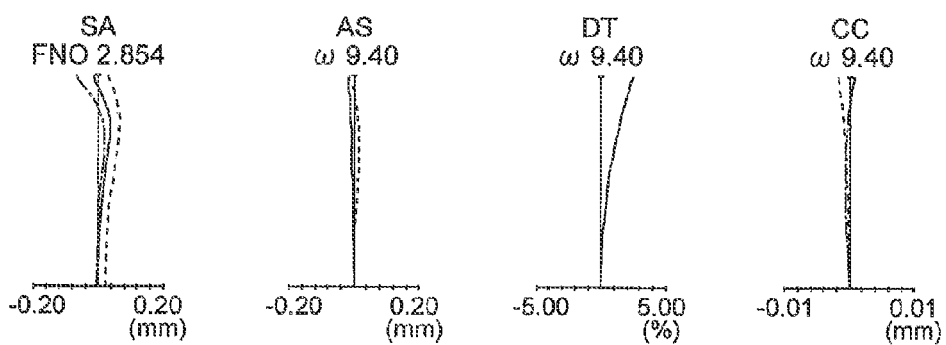

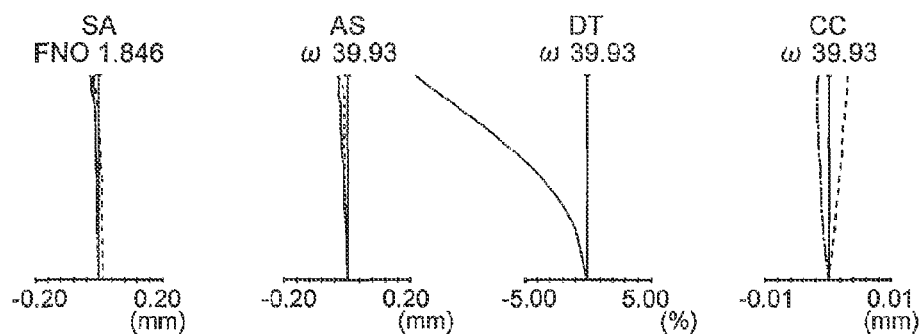
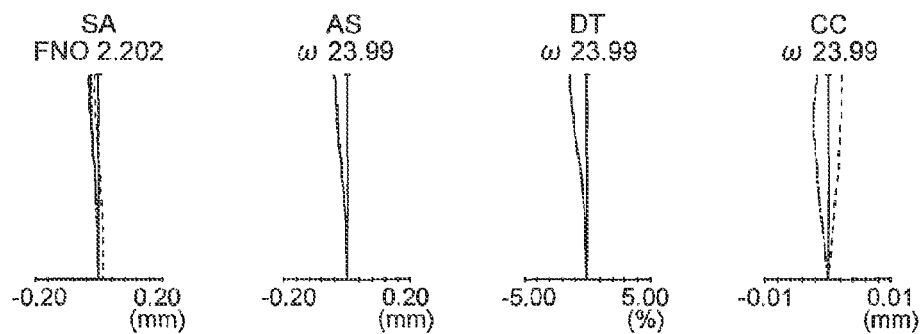
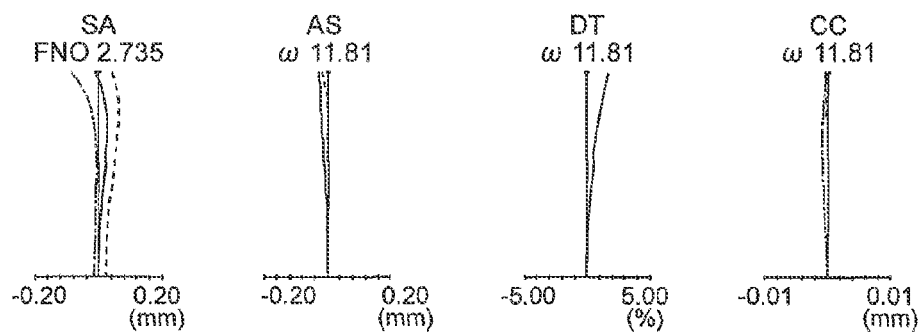

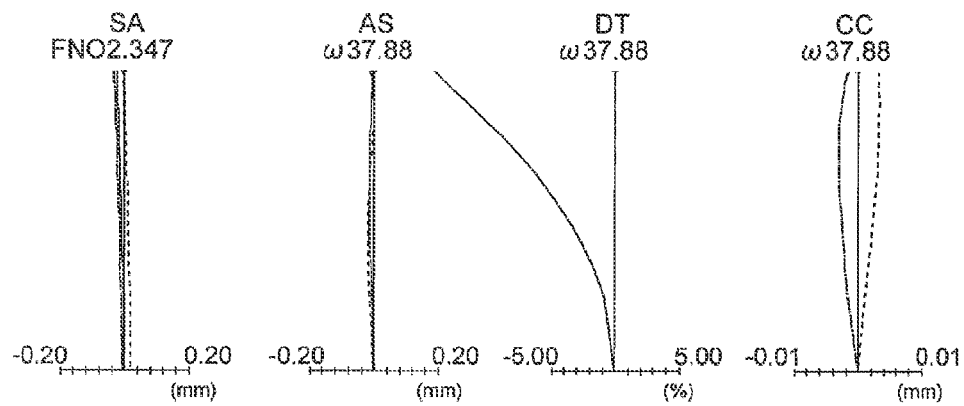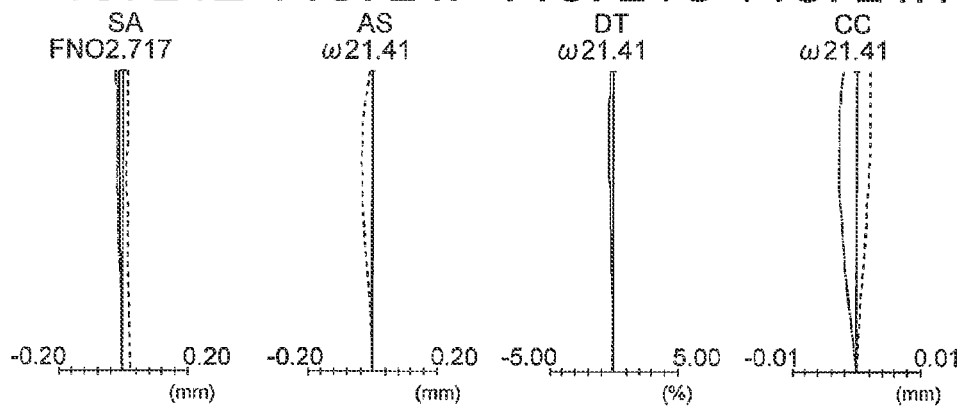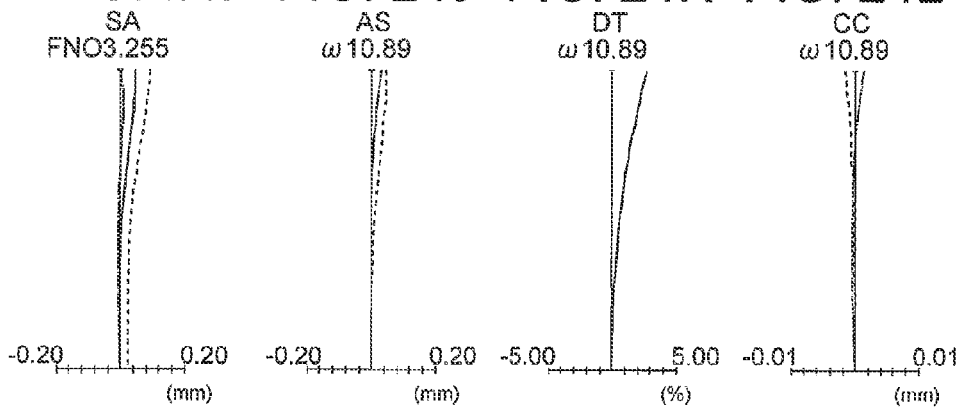

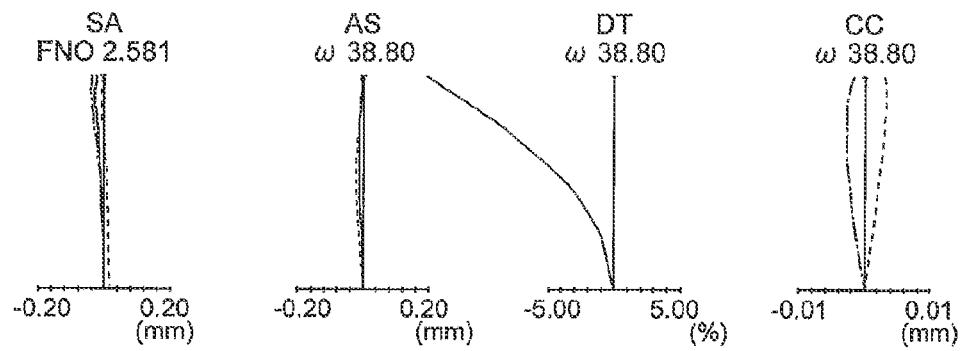
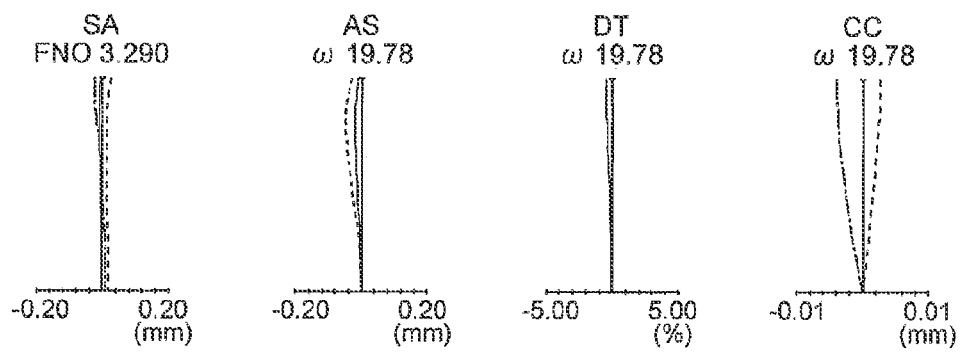
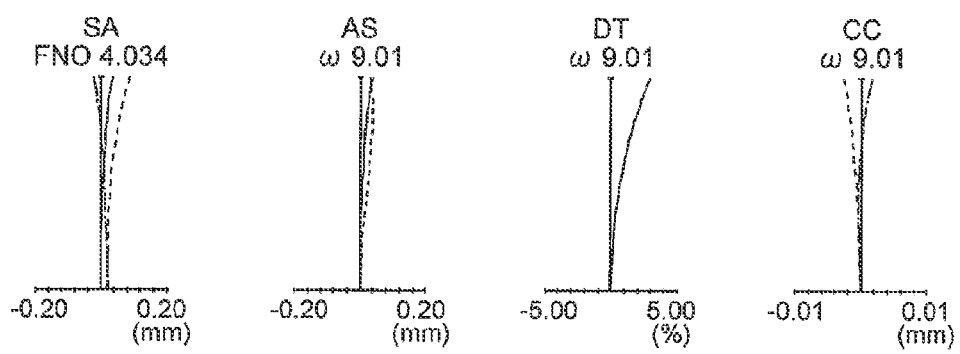

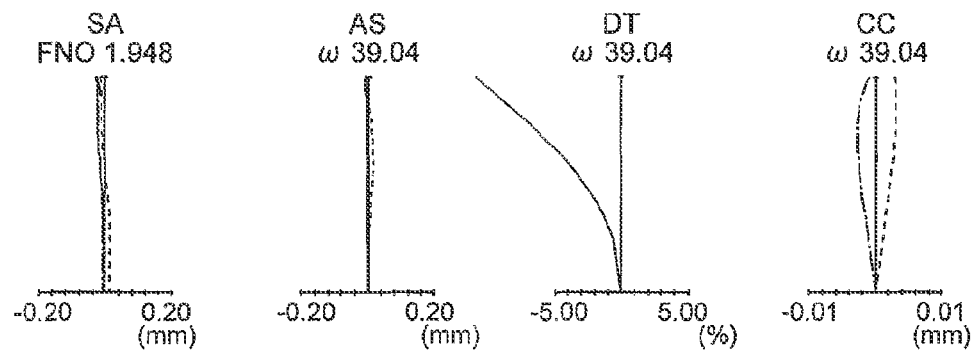
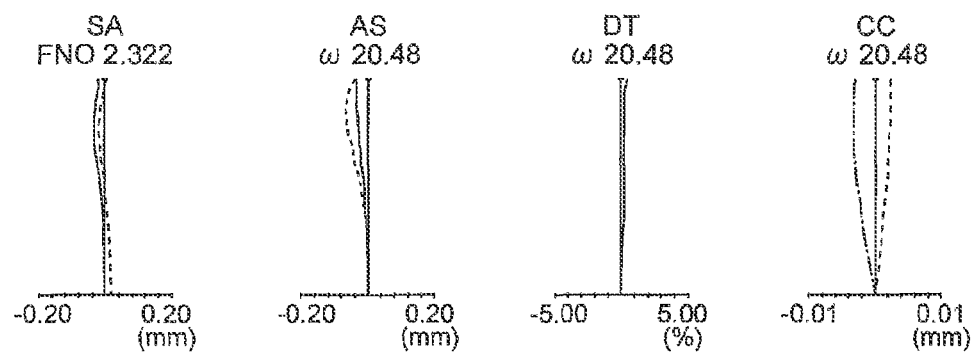
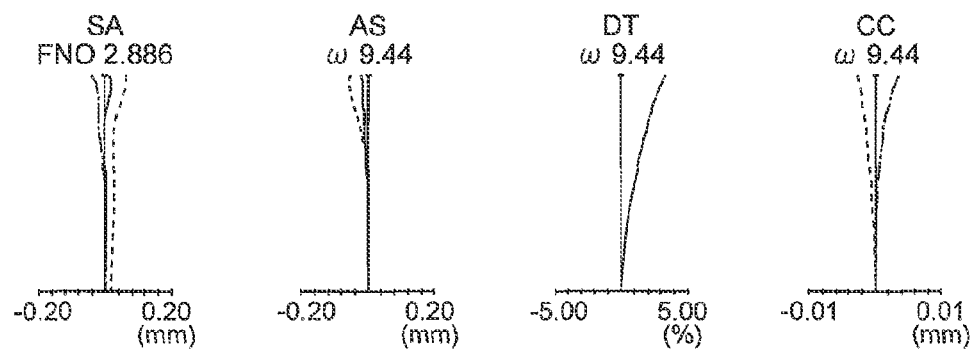

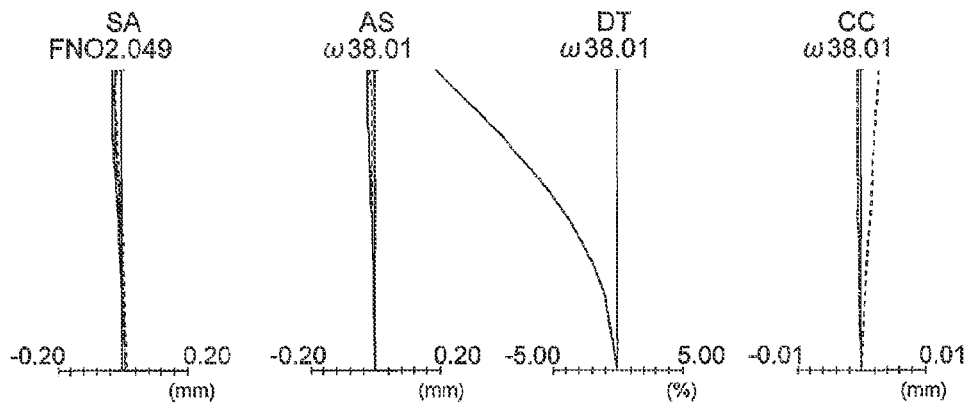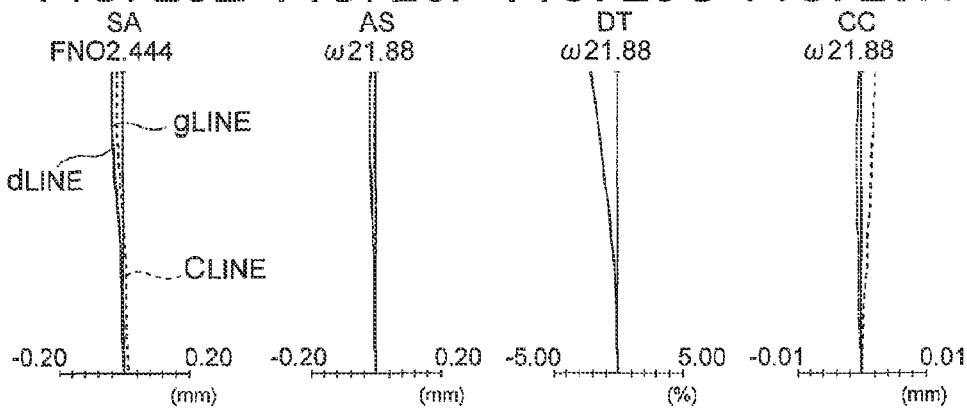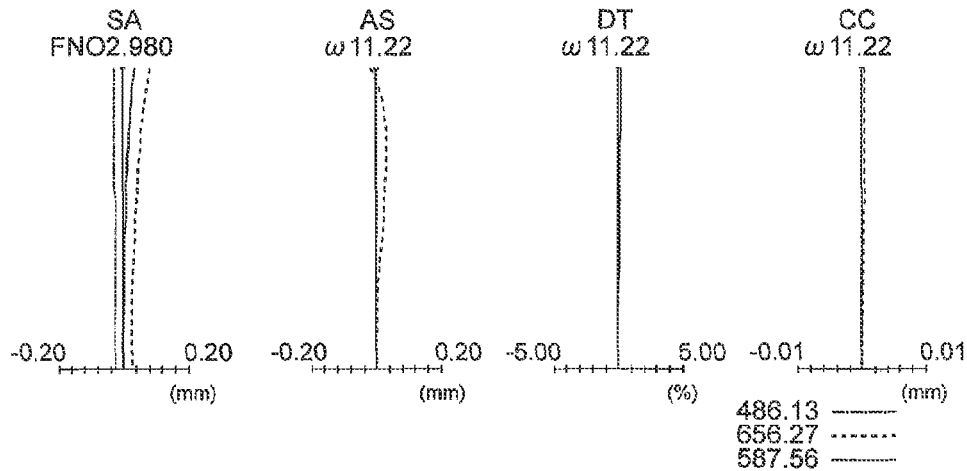

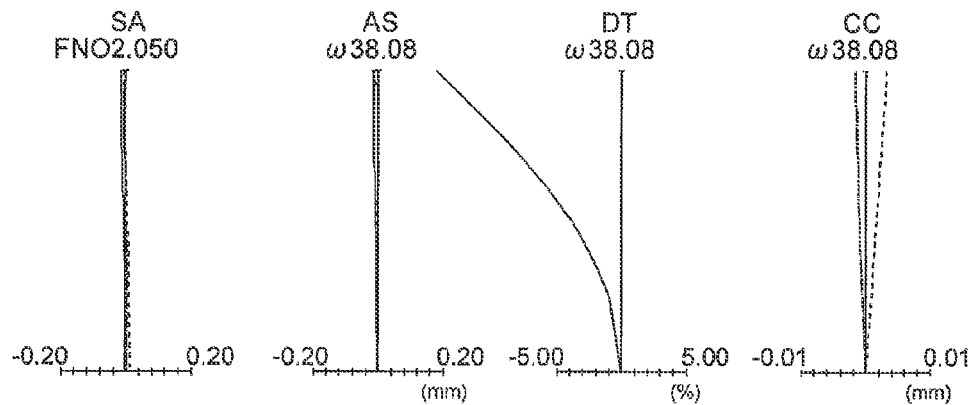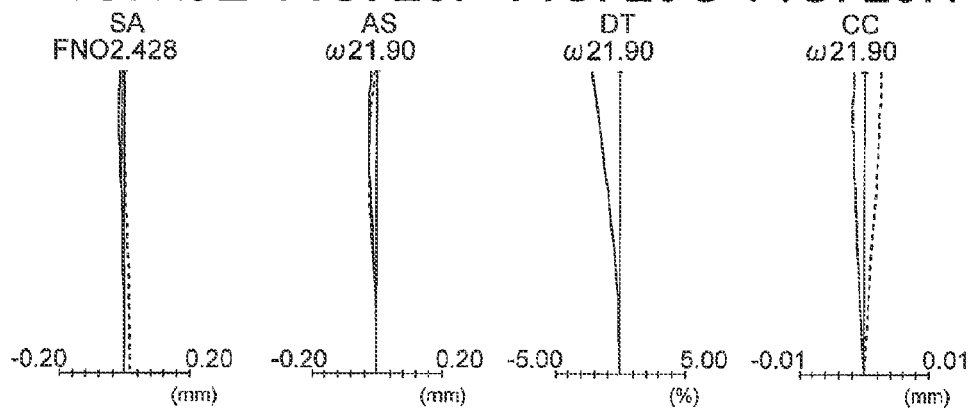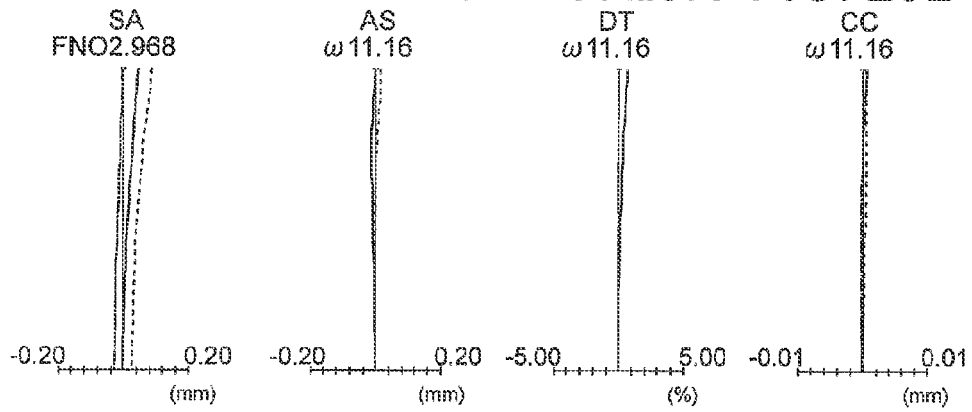

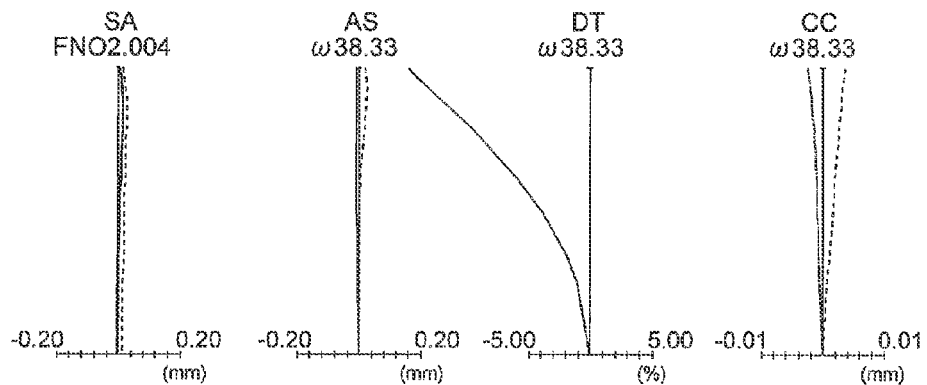
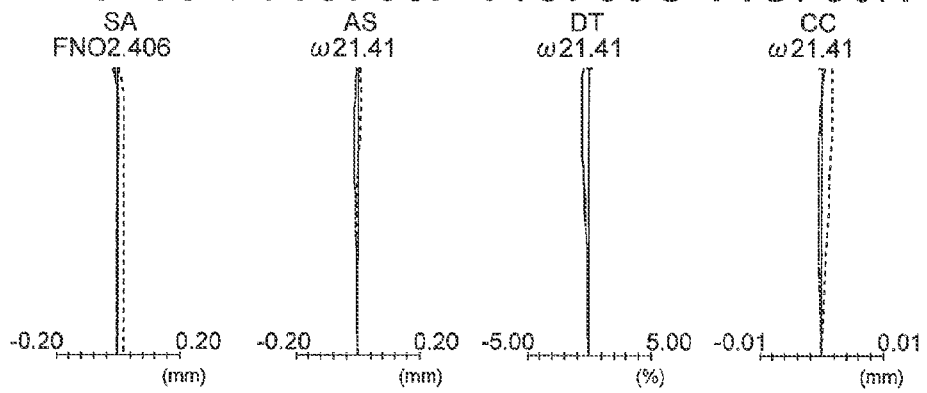
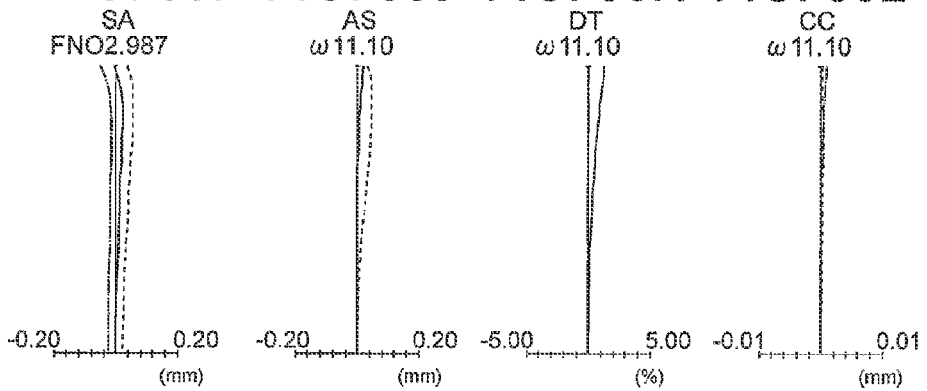

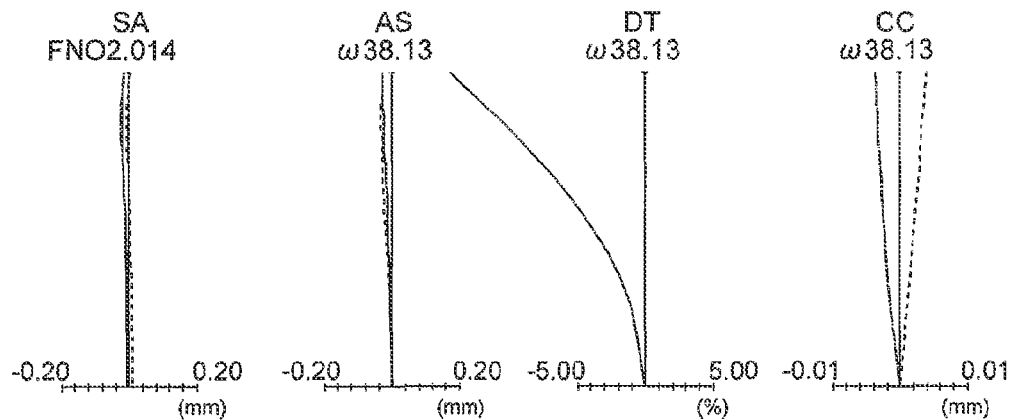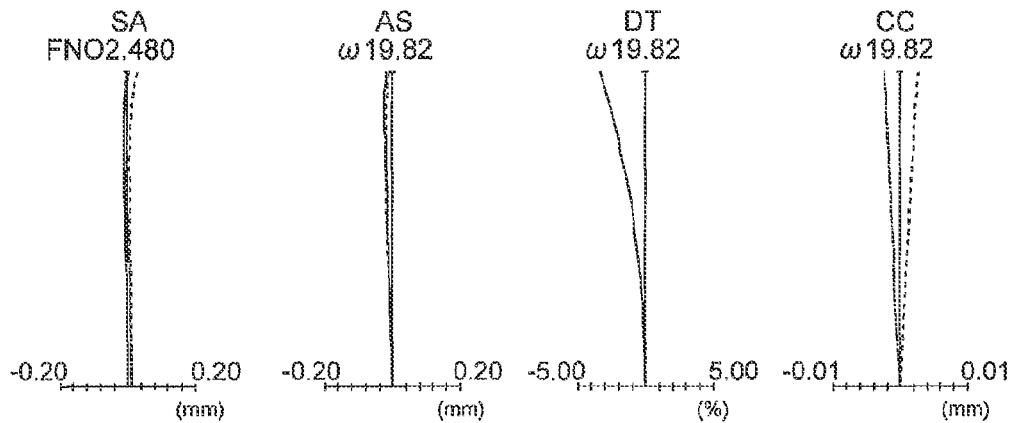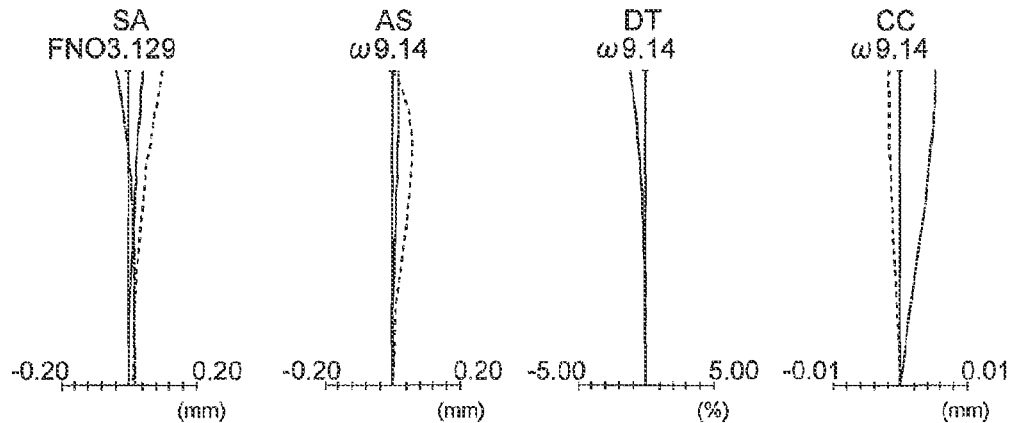

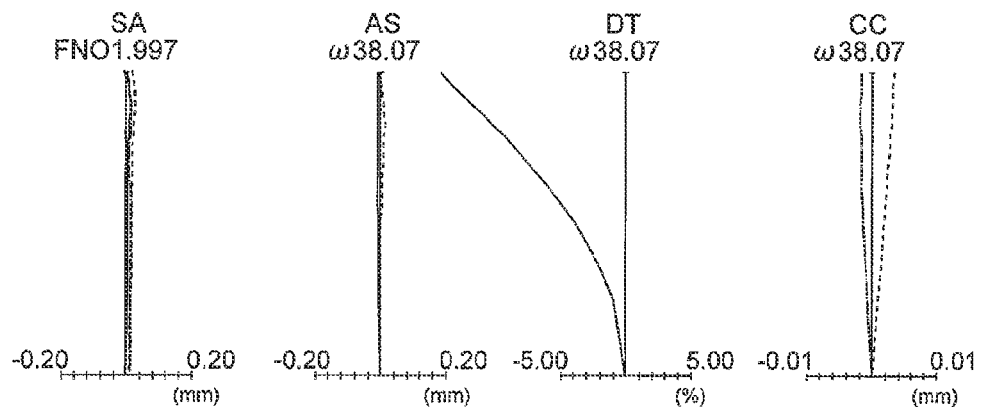
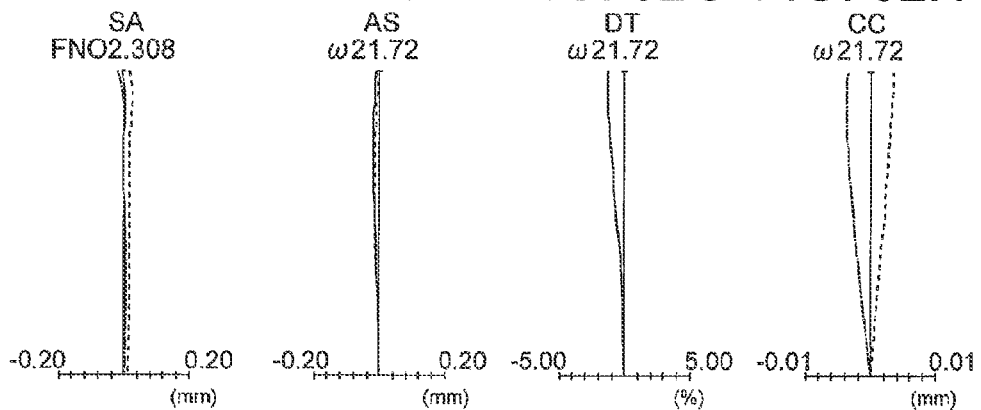
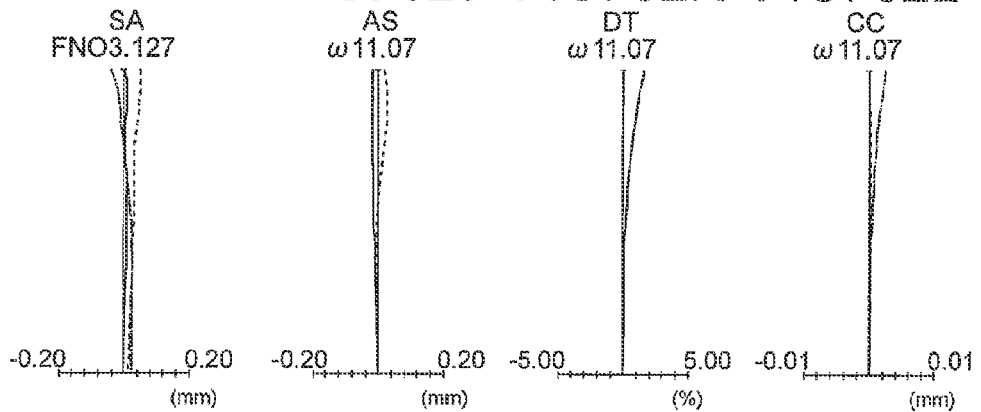

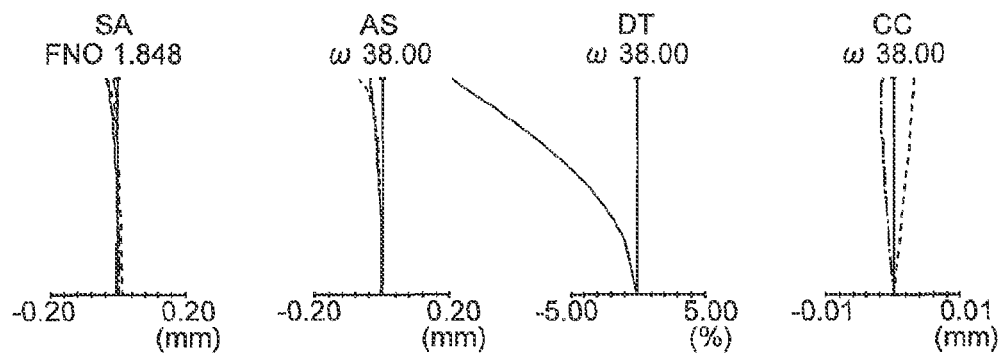
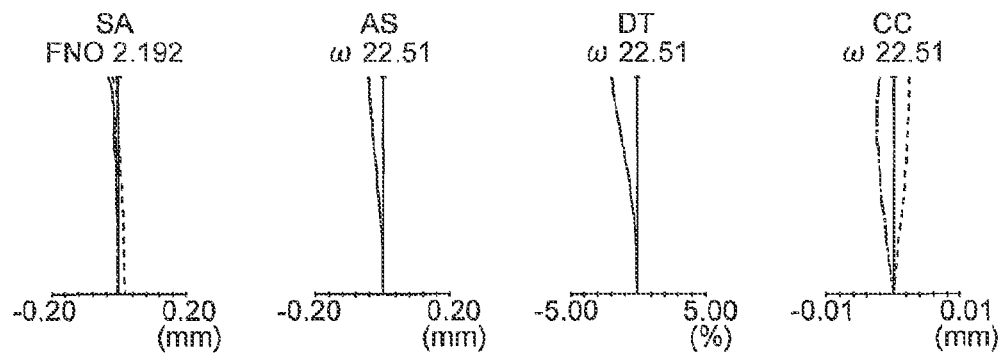
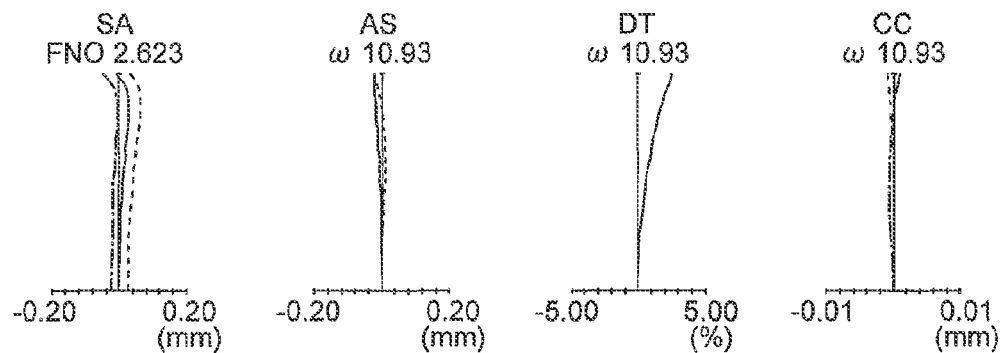

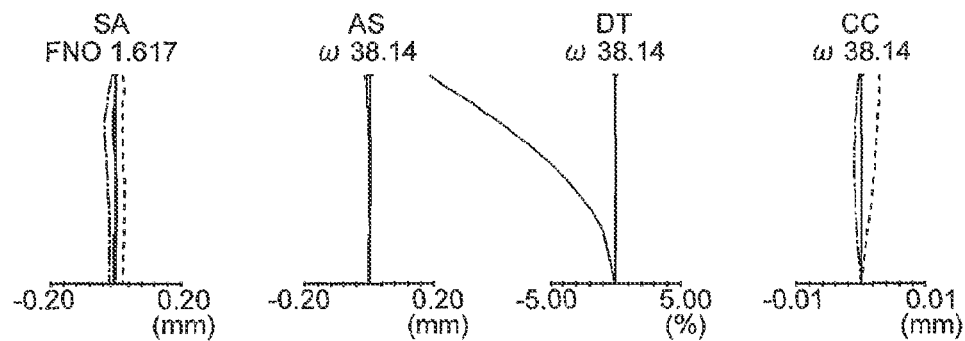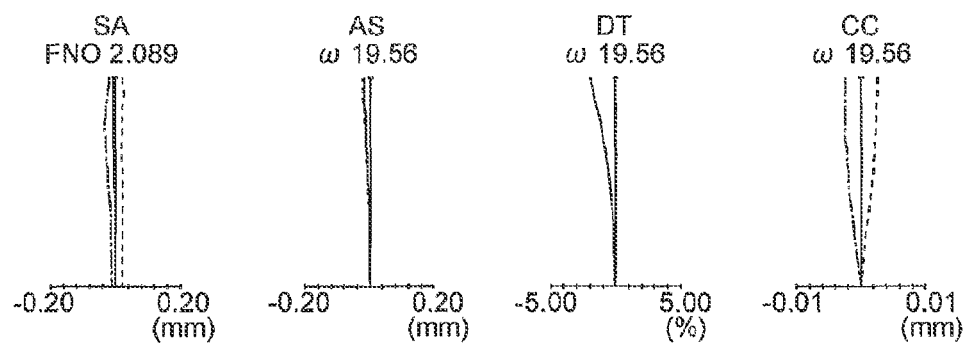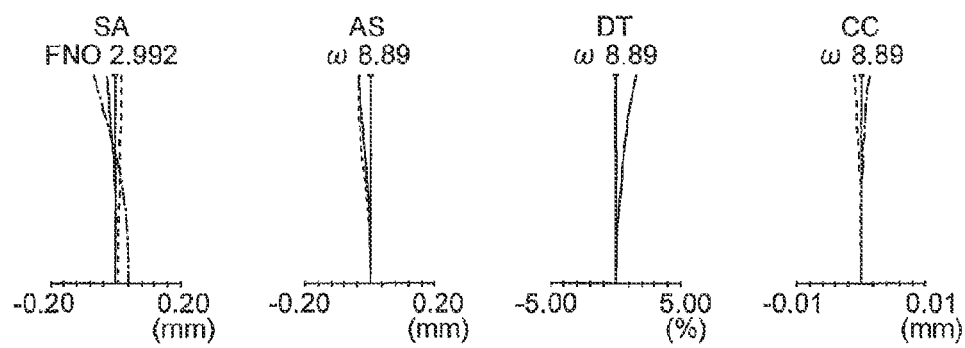

ZOOM LENS AND IMAGE PICKUP APPARATUS USING THE SAME

CROSS-REFERENCE TO RELATED APPLICATION

The present application is based upon and claims the benefit of priority from the prior Japanese Patent Application Nos. 2013-003779 filed on Jan. 11, 2013, 2012-102387 filed on Apr. 27, 2012, 2012-102386 filed on Apr. 27, 2012, and 2012-102385 filed on Apr. 27, 2012; the entire contents of which are incorporated herein by reference

BACKGROUND OF THE INVENTION

1. Field of the Invention

The present invention relates to a zoom lens, and an image pickup apparatus using the zoom lens, and particularly to a zoom lens which is suitable for a compact digital camera.

2. Description of the Related Art

In recent years, digital cameras in which, an arrangement has been made such that, an object is photographed by using a solid image pickup element such as a CCD (Charge Coupled Device) and a CMOS (Complementary Metal Oxide Semiconductor) have been main stream, replacing a silver-salt film camera. Furthermore, such digital cameras have been used in a wide range of categories from a high-functional type for professional use to a portable popular type.

A user of such digital camera of the popular type seeks to enjoy photography by capturing readily various scenes at anytime and anywhere. Therefore, a small-size product, particularly a slim digital camera, which can be accommodated easily in a pocket of clothes or a bag and carried conveniently, has been preferred. Therefore, further small-sizing of a taking lens system has been sought.

Furthermore, in order that capturing can be carried out also with high intensity, a digital camera which carries out image processing such as widening sensitivity area of dynamic range has been proposed, and photography in which, capture conditions are not to be selected has become possible.

In such photography including photography at dark places, electronic correction of intensity is possible to certain extent, and furthermore, by adopting a lens with a large lens aperture, it is possible to deal with photography even at darker places, and it is possible to widen conditions under which, the photography is possible.

In a fast lens with even larger aperture, photography with clarity is possible even with a small quantity of incident light. Therefore, since a large number of options are made available to a photographer such as increasing a shutter speed in continuous capturing of a moving object, to even higher speed, in recent years, a lens with a large lens aperture has been drawing attention.

Moreover, from a point of view of widening of a capture area, the demand for high magnification zoom is still there, and even higher magnification is anticipated.

As a prior art in which, a zoom lens with a comparatively higher zoom ratio and large aperture is formed, a zoom lens which includes in order from an object side, a first lens unit having a positive refractive power, a second lens unit having a negative refractive power, a third lens unit having a positive refractive power, and a fourth lens unit having a positive refractive power, has been disclosed in Japanese Patent Application Laid-open Publication No. 2010-217478.

SUMMARY OF THE INVENTION

A zoom lens according to the present invention includes in order from an object side,
a first lens unit having a positive refractive power,
a second lens unit having a negative refractive power,
a third lens unit having a positive refractive power, and
a fourth lens unit having a positive refractive power, and
at the time of zooming, the first lens unit moves, and
the zoom lens satisfies the following conditional expressions (1-1a), (1-2a), and (1-3a)

$$0.43 < (\beta_{2T}/\beta_{2W})/(\beta_{3T}/\beta_{3W}) < 0.68 \quad (1\text{-}1a)$$

$$0.4 < (\Delta_{1G}/f_1)/(\Delta_{4G}/f_4) < 2.3 \quad (1\text{-}2a)$$

$$2.1 < f_3/f_W < 4.1 \quad (1\text{-}3a)$$

where, $\beta_{2W}$ denotes a lateral magnification at a wide angle end of the second lens unit, $\beta_{2T}$ denotes a lateral magnification at a telephoto end of the second lens unit, $\beta_{3W}$ denotes a lateral magnification at a wide angle end of the third lens unit, $\beta_{3T}$ denotes a lateral magnification at a telephoto end of the third lens unit, $\Delta_{1G}$ denotes an amount of movement of the first lens unit at the time of zooming from the wide angle end to the telephoto end, $\Delta_{4G}$ denotes an amount of movement of the fourth lens unit at the time of zooming from the wide angle end to the telephoto end, $f_1$ denotes a focal length of the first lens unit,
$f_3$ denotes a focal length of the third lens unit,
$f_4$ denotes a focal length of the fourth lens unit, and
$f_W$ denotes a focal length of the overall zoom lens system at the wide angle end.

A zoom lens according to another aspect of the present invention includes in order from an object side,
a first lens unit having a positive refractive power,
a second lens unit having a negative refractive power,
a third lens unit having a positive refractive power, and
a fourth lens unit having a positive refractive power, and
at the time of zooming, the first lens unit moves, and
the first lens unit includes in order from the object side, a first lens having a negative refractive power, and a second lens having a positive refractive power, and
the zoom lens satisfies the following conditional expressions (1-1b) and (1-2b)

$$0.2 < (\beta_{2T}/\beta_{2W})/(\beta_{3T}/\beta_{3W}) < 0.8 \quad (1\text{-}1b)$$

$$0 < (\Delta_{1G}/f_1)/(\Delta_{4G}/f_4) < 1.5 \quad (1\text{-}2b)$$

where, $\beta_{2W}$ denotes a lateral magnification at a wide angle end of the second lens unit, $\beta_{2T}$ denotes a lateral magnification at a telephoto end of the second lens unit, $\beta_{3W}$ denotes a lateral magnification at a wide angle end of the third lens unit, $\beta_{3T}$ denotes a lateral magnification at a telephoto end of the third lens unit, $\Delta_{1G}$ denotes an amount of movement of the first lens unit at the time of zooming from the wide angle end to the telephoto end, $\Delta_{4G}$ denotes an amount of movement of the fourth lens unit at the time of zooming from the wide angle end to the telephoto end, $f_1$ denotes a focal length of the first lens unit, and
$f_4$ denotes a focal length of the fourth lens unit.

A zoom lens according to still another aspect of the present invention includes in order from an object side, a first lens unit having a positive refractive power,
a second lens unit having a negative refractive power, and
a third lens unit having a positive refractive power, and
the third lens unit includes in order from the object side, a first lens having a negative refractive power, and a second lens having a positive refractive power, and
the zoom lens satisfies the following conditional expressions (2-1), (2-2), and (2-3)

$$2 < |f_{3\_2}/f_{3\_1}| < 5 \quad (2\text{-}1)$$

$$0.1 < (\beta_{2T}/\beta_{2W})/(\beta_{3T}/\beta_{3W}) < 0.8 \quad (2\text{-}2)$$

$$Fno(W) < 2.5 \quad (2\text{-}3)$$

where,
$f_{3\_1}$ denotes a focal length of the first lens component having a positive refractive power in the third lens unit,
$f_{3\_2}$ denotes a focal length of the second lens component having a negative refractive power in the third lens unit,
$\beta_{2W}$ denotes a lateral magnification at a wide angle end of the second lens unit,
$\beta_{2T}$ denotes a lateral magnification at a telephoto end of the second lens unit,
$\beta_{3W}$ denotes a lateral magnification at a wide angle end of the third lens unit,
$\beta_{3T}$ denotes a lateral magnification at a telephoto end of the third lens unit, and
Fno(W) denotes an F-number of the zoom lens at the wide angle end.

A zoom lens according to still another aspect of the present invention includes in order from an object side,
a first lens unit having a positive refractive power,
a second lens unit having a negative refractive power,
a third lens unit having a positive refractive power, and
the first lens unit includes in order from the object side, a first lens having a negative refractive power and a second lens having a positive refractive power, and
the third lens unit includes in order from the object side, a first lens component having a positive refractive power, a second lens component having a negative refractive power, and a third lens component, and
the zoom lens satisfies the following conditional expressions (3-1), (3-2), and (3-3)

$$1.3 < |f_{3\_2}/f_{3\_1}| < 5 \quad (3\text{-}1)$$

$$\Sigma d_{3G}/f_T < 0.42 \quad (3\text{-}2)$$

$$Fno(W) < 2.5 \quad (3\text{-}3)$$

where,
$f_{3\_1}$ denotes a focal length of the first lens component having a positive refractive power in the third lens unit,
$f_{3\_2}$ denotes a focal length of the second lens component having a negative refractive power in the third lens unit,
$\Sigma d_{3G}$ denotes a total length of the third lens unit,
$f_T$ denotes a focal length of the overall zoom lens system at the telephoto end, and
Fno(W) denotes an F-number of the zoom lens at the wide angle end.

An image pickup apparatus according to the present invention includes a zoom lens, and an image pickup element which includes an image pickup surface which is disposed on an image side of the zoom lens, and which receives an image formed by the zoom lens, and the zoom lens is one of the abovementioned zoom lenses.

BRIEF DESCRIPTION OF THE DRAWINGS

FIG. 1A shows a state at a wide angle end, FIG. 1B shows an intermediate state, and FIG. 1C shows a state at a telephoto end;

FIG. 2A shows a state at a wide angle end, FIG. 2B shows an intermediate state, and FIG. 2C shows a state at a telephoto end;

FIG. 3A shows a state at a wide angle end, FIG. 3B shows an intermediate state, and FIG. 3C shows a state at a telephoto end;

FIG. 4A shows a state at a wide angle end, FIG. 4B shows an intermediate state, and FIG. 4C shows a state at a telephoto end;

FIG. 5A shows a state at a wide angle end, FIG. 5B shows an intermediate state, and FIG. 5C shows a state at a telephoto end;

FIG. 6A shows a state at a wide angle end, FIG. 6B shows an intermediate state, and FIG. 6C shows a state at a telephoto end;

FIG. 7A shows a state at a wide angle end, FIG. 7B shows an intermediate state, and FIG. 7C shows a state at a telephoto end;

FIG. 8A shows a state at a wide angle end, FIG. 8B shows an intermediate state, and FIG. 8C shows a state at a telephoto end;

FIG. 9A shows a state at a wide angle end, FIG. 9B shows an intermediate state, and FIG. 9C shows a state at a telephoto end;

FIG. 10B shows an intermediate state, and FIG. 10C shows a state at a telephoto end;

FIG. 11A shows a state at a wide angle end, FIG. 11B shows an intermediate state, and FIG. 11C shows a state at a telephoto end;

FIG. 12A shows a state at a wide angle end, FIG. 12B shows an intermediate state, and FIG. 12C shows a state at a telephoto end;

FIG. 13A shows a state at a wide angle end, FIG. 13B shows an intermediate state, and FIG. 13C shows a state at a telephoto end;

FIG. 14A shows a state at a wide angle end, FIG. 14B shows an intermediate state, and FIG. 14C shows a state at a telephoto end;

FIG. 15A shows a state at a wide angle end, FIG. 15B shows an intermediate state, and FIG. 15C shows a state at a telephoto end;

FIG. 16A shows a state at a wide angle end, FIG. 16B shows an intermediate state, and FIG. 16C shows a state at a telephoto end;

FIG. 17A shows a state at a wide angle end, FIG. 17B shows an intermediate state, and FIG. 17C shows a state at a telephoto end;

FIG. 18A, FIG. 18B, FIG. 18C, FIG. 18D, FIG. 18E, FIG. 18F, FIG. 18G, FIG. 18H, FIG. 18I, FIG. 18J, FIG. 18K, and FIG. 18L are aberration diagrams at the time of infinite object point focusing of the example 1;

FIG. 19A, FIG. 19B, FIG. 19C, FIG. 19D, FIG. 19E, FIG. 19F, FIG. 19G, FIG. 19H, FIG. 19I, FIG. 19J, FIG. 19K, and FIG. 19L are aberration diagrams at the time of infinite object point focusing of the example 2;

FIG. 20A, FIG. 20B, FIG. 20C, FIG. 20D, FIG. 20E, FIG. 20F, FIG. 20G, FIG. 20H, FIG. 20I, FIG. 20J, FIG. 20K, and FIG. 20L are aberration diagrams at the time of infinite object point focusing of the example 3;

FIG. 21A, FIG. 21B, FIG. 21C, FIG. 21D, FIG. 21E, FIG. 21F, FIG. 21G, FIG. 21H, FIG. 21I, FIG. 21J, FIG. 21K, and FIG. 21L are aberration diagrams at the time of infinite object point focusing of the example 4;

FIG. 24A, FIG. 24B, FIG. 24C, FIG. 24D, FIG. 24E, FIG. 24F, FIG. 24G, FIG. 24H, FIG. 24I, FIG. 24J, FIG. 24K, and FIG. 24L are aberration diagrams at the time of infinite object point focusing of the example 7;

FIG. 26A, FIG. 26B, FIG. 26C, FIG. 26D, FIG. 26E, FIG. 26F, FIG. 26G, FIG. 26H, FIG. 26I, FIG. 26J, FIG. 26K, and FIG. 26L are aberration diagrams at the time of infinite object point focusing of the example 9;

FIG. 27A, FIG. 27B, FIG. 27C, FIG. 27D, FIG. 27E, FIG. 27F, FIG. 27G, FIG. 27H, FIG. 27I, FIG. 27J, FIG. 27K, and FIG. 27L are aberration diagrams at the time of infinite object point focusing of the example 10;

FIG. 28A, FIG. 28B, FIG. 28C, FIG. 28D, FIG. 28E, FIG. 28F, FIG. 28G, FIG. 28H, FIG. 28I, FIG. 28J, FIG. 28K, and FIG. 28L are aberration diagrams at the time of infinite object point focusing of the example 11;

FIG. 29A, FIG. 29B, FIG. 29C, FIG. 29D, FIG. 29E, FIG. 29F, FIG. 29G, FIG. 29H, FIG. 29I, FIG. 29J, FIG. 29K, and FIG. 29L are aberration diagrams at the time of infinite object point focusing of the example 12;

FIG. 30A, FIG. 30B, FIG. 30C, FIG. 30D, FIG. 30E, FIG. 30F, FIG. 30G, FIG. 30H, FIG. 30I, FIG. 30J, FIG. 30K, and FIG. 30L are aberration diagrams at the time of infinite object point focusing of the example 13;

FIG. 31A, FIG. 31B, FIG. 31C, FIG. 31D, FIG. 31E, FIG. 31F, FIG. 31G, FIG. 31H, FIG. 31I, FIG. 31J, FIG. 31K, and FIG. 31L are aberration diagrams at the time of infinite object point focusing of the example 14;

FIG. 32A, FIG. 32B, FIG. 32C, FIG. 32D, FIG. 32E, FIG. 32F, FIG. 32G, FIG. 32H, FIG. 32I, FIG. 32J, FIG. 32K, and FIG. 32L are aberration diagrams at the time of infinite object point focusing of the example 15;

FIG. 33A, FIG. 33B, FIG. 33C, FIG. 33D, FIG. 33E, FIG. 33F, FIG. 33G, FIG. 33H, FIG. 33I, FIG. 33J, FIG. 33K, and FIG. 33L are aberration diagrams at the time of infinite object point focusing of the example 16;

FIG. 34A, FIG. 34B, FIG. 34C, FIG. 34D, FIG. 34E, FIG. 34F, FIG. 34G, FIG. 34H, FIG. 34I, FIG. 34J, FIG. 34K, and FIG. 34L are aberration diagrams at the time of infinite object point focusing of the example 17;

DETAILED DESCRIPTION OF THE INVENTION

Figure 1A:
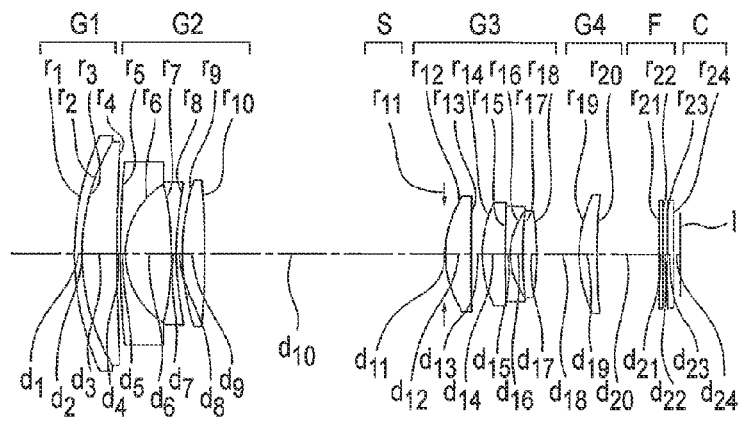
FIG. 1A, FIG. 1B, and FIG. 1C are lens cross-sectional views showing an optical arrangement at the time of infinite object point focusing of a zoom lens according to an example 1 of the present invention, where.

Examples of a zoom lens according to the present invention will be described below in detail by referring to the accompanying diagrams. However, the present invention is not restricted to the examples described below.

A zoom lens according to the present embodiment includes in order from an object side, a first lens unit having a positive refractive power, a second lens unit having a negative refractive power, a third lens unit having a positive refractive power, and a fourth lens unit having a positive refractive power, and at the time of zooming, the first lens unit moves, and the zoom lens satisfies the following conditional expressions (1-1a), (1-2a), and (1-3a).

$$0.43 < (\beta_{2T}/\beta_{2W})/(\beta_{3T}/\beta_{3W}) < 0.68 \quad (1\text{-}1a)$$

$$0.4 < (\Delta_{1G}/f_1)/(\Delta_{4G}/f_4) < 2.3 \quad (1\text{-}2a)$$

$$2.1 < f_3/f_W < 4.1 \quad (1\text{-}3a)$$

where, $\beta_{2W}$ denotes a lateral magnification at a wide angle end of the second lens unit, $\beta_{2T}$ denotes a lateral magnification at a telephoto end of the second lens unit, $\beta_{3W}$ denotes a lateral magnification at a wide angle end of the third lens unit, $\beta_{3T}$ denotes a lateral magnification at a telephoto end of the third lens unit, $\Delta_{1G}$ denotes an amount of movement of the first lens unit at the time of zooming from the wide angle end to the telephoto end, $\Delta_{4G}$ denotes an amount of movement of the fourth lens unit at the time of zooming from the wide angle end to the telephoto end, $f_1$ denotes a focal length of the first lens unit, $f_3$ denotes a focal length of the third lens unit, $f_4$ denotes a focal length of the fourth lens unit, and $f_W$ denotes a focal length of the overall zoom lens system at the wide angle end.

A reason for and an effect of adopting such arrangement will be described below.

An arrangement is let to be such that the zoom lens includes in order from the object side, the first lens unit having a positive refractive power, the second lens unit having a negative refractive power, the third lens unit having a positive refractive power, and the fourth lens unit having a positive refractive power. Accordingly, it is possible to set the number of zooming lens units to be larger than the number of zooming lens unit in a negative-lead type zoom lens, and to reduce load of zooming on each lens unit.

Moreover, since it is possible to suppress fluctuation of F-number to be small, even when a zooming ratio is made high (particularly at the telephoto end), it is easy to design a fast lens, which is advantageous for high zooming ratio.

Conditional expression (1-1a) is an expression in which, the load of zooming on the second lens unit and the load of zooming on the third lens unit from among the lens units which are involved in zooming, is regulated to an appropriate ratio.

Exceeding an upper limit of conditional expression (1-1a), since the zooming load on the second lens unit becomes excessively large, and an occurrence of a curvature of field and a chromatic aberration of magnification at a wide angle end becomes large, it is not preferable.

When a measure such as increasing the number of lenses for suppressing aberration is taken, a load on an optical design increases, and it is disadvantageous for small-sizing.

Moreover, falling below a lower limit value of conditional expression (1-1a), since the load of zooming on the third lens unit becomes excessively large, and an occurrence of various aberrations such as a spherical aberration and a comatic aberration increases, and a fluctuation in a longitudinal chromatic aberration becomes large, it is not preferable.

Moreover, conditional expression (1-2a) is an expression in which, a ratio of an amount of movement of the first lens unit and an amount of movement of the fourth lens unit is regulated, and the ratio is taken upon normalizing by a focal length of each lens unit.

Exceeding an upper limit value of conditional expression (1-2a), a role of the first lens unit as a compensator becomes excessively significant, and the amount of movement of the first lens unit becomes large. Due to this, since a total length of the zoom lens becomes excessively long, and a fluctuation in a chromatic aberration becomes excessively large, it is not preferable.

Falling below a lower limit value of conditional expression (1-2a), a role of the fourth lens unit as a compensator becomes excessively significant, and the amount of movement of the fourth lens unit becomes large. Moreover, since the fluctuation in the chromatic aberration becomes large and an effect of decrease in magnification due to the fourth lens unit becomes large, it is not preferable.

Moreover, conditional expression (1-3a) is an expression in which, the focal length of the third lens unit is regulated, and normalized by the focal length of the overall zoom lens system at the wide angle end.

Exceeding an upper limit of conditional expression (1-3a), a refractive power of the third lens unit becomes excessively small, and an amount of movement of the third lens unit becomes large due to an attempt to have a higher zooming ratio. Accordingly, since the total length of the zoom lens becomes long, it becomes difficult to have a compact structure.

Falling below a lower limit of conditional expression (1-3a), since the refractive power of the third lens unit becomes excessively large, and aberrations such as the spherical aberration and the comatic aberration occur substantially, it is not preferable.

Moreover, a zoom lens according to another embodiment includes in order from an object side, a first lens unit having a positive refractive power, a second lens unit having a negative refractive power, a third lens unit having a positive refractive power, and a fourth lens unit having a positive refractive power, and at the time of zooming, the first lens unit moves, and the first lens unit includes in order from the object side, a first lens having a negative refractive power, and a second lens having a positive refractive power, and the zoom lens satisfies the following conditional expressions (1-1b) and (1-2b).

$$0.2 < (\beta_{2T}/\beta_{2W})/(\beta_{3T}/\beta_{3W}) < 0.8 \quad (1\text{-}1b)$$

$$0 < (\Delta_{1G}/f_1)/(\Delta_{4G}/f_4) < 1.5 \quad (1\text{-}2b)$$

where, $\beta_{2W}$ denotes a lateral magnification at a wide angle end of the second lens unit, $\beta_{2T}$ denotes a lateral magnification at a telephoto end of the second lens unit, $\beta_{3W}$ denotes a lateral magnification at a wide angle end of the third lens unit, $\beta_{3T}$ denotes a lateral magnification at a telephoto end of the third lens unit, $\Delta_{1G}$ denotes an amount of movement of the first lens unit at the time of zooming from the wide angle end to the telephoto end, $\Delta_{4G}$ denotes an amount of movement of the fourth lens unit at the time of zooming from the wide angle end to the telephoto end, $f_1$ denotes a focal length of the first lens unit, and $f_4$ denotes a focal length of the fourth lens unit.

Since adopting the arrangement of lens units as a positive lens unit, a negative lens unit, a positive lens unit, and a positive lens unit in order from the object side, and an effect of conditional expressions (1-1b) and (1-2b) have already being mentioned above, repetitive description thereof is omitted.

Moreover, by letting the first lens unit include in order from the object side, the first lens having a negative refractive power and the second lens having a positive refractive power, it is possible to make the refractive power of the first lens unit large. Accordingly, it is possible to suppress the amount of movement of the first lens unit, and to suppress the total length.

Moreover, it is possible to suppress a fluctuation in the chromatic aberration.

Moreover, in the zoom lens according to the present embodiment, it is desirable that the first lens unit includes a cemented lens.

By letting the first lens unit include the cemented lens, it is possible to make the arrangement compact while correcting the chromatic aberration.

Moreover, it is preferable that the zoom lens according to the present embodiment satisfies the following conditional expression (1-4).

$$0.12 < (\beta_{4T}/\beta_{4W})/\beta_{3T}/\beta_{3W}) < 0.4 \quad (1\text{-}4)$$

where, $\beta_{4W}$ denotes a lateral magnification at a wide angle end of the fourth lens unit, and $\beta_{4T}$ denotes a lateral magnification at a telephoto end of the fourth lens unit.

Conditional expression (1-4) is an expression in which, the load of zooming on the fourth lens unit and the load of zooming on the third unit from among the lens units which are involved in zooming are regulated to an appropriate ratio.

Exceeding an upper limit of conditional expression (1-4), since a role of the fourth lens unit as a compensator becomes less significant, and the total length of the zoom lens becomes large, it is not preferable for having a compact arrangement.

Moreover, falling below a lower limit of conditional expression (1-4), the load of zooming on the third lens unit becomes excessively large, and occurrence of various aberrations such as the spherical aberration and the comatic aberration increases. Also the fluctuation in the longitudinal chromatic aberration becomes large, and therefore it is not preferable.

Moreover, it is preferable that the zoom lens according to the present embodiment satisfies the following conditional expression (1-5).

$$0 < \Delta_{1G}/\Delta_{4G} < 4 \quad (1\text{-}5)$$

where, $\Delta_{1G}$ denotes the amount of movement of the first lens unit at the time of zooming from the wide angle end to the telephoto end, and $\Delta_{4G}$ denotes the amount of movement of the fourth lens unit at the time of zooming from the wide angle end to the telephoto end.

Conditional expression (1-5) is an expression in which, a ratio of the amount of movement of the first lens unit and the amount of movement of the fourth lens unit is regulated.

Exceeding an upper limit of conditional expression (1-5), by the amount of movement of the first lens unit becoming large, the total length of the zoom lens becomes excessively long, and also a fluctuation in the chromatic aberration due to zooming becomes excessively large. Therefore, it is not preferable.

Falling below a lower limit of conditional expression (1-5), by the amount of movement of the fourth lens unit becoming excessively large, the fluctuation in the chromatic aberration due to zooming becomes excessively large, and also since an effect of decrease in magnification due to the fourth lens unit becomes large, it is not preferable.

Moreover, it is preferable that the zoom lens according to the present embodiment satisfies the following conditional expression (1-3b)

$$1.8 < f_3/f_W < 4.1 \quad (1\text{-}3b)$$

where, $f_3$ denotes a focal length of the third lens unit, and $f_W$ denotes a focal length of the overall zoom lens system at the wide angle end.

Furthermore, it is preferable that the zoom lens according to the present embodiment satisfies the following conditional expression (1-6).

$$1.4 < |f_2/f_W| < 3 \quad (1\text{-}6)$$

where, $f_2$ denotes a focal length of the second lens unit, and $f_W$ denotes the focal length of the overall zoom lens system at the wide angle end.

Conditional expression (1-6) is an expression in which, the focal length of the second lens unit is regulated, and normalized by the focal length of the overall zoom lens at the wide angle end.

Exceeding an upper limit of conditional expression (1-6), the refractive power of the second lens unit becomes excessively weak, and the amount of movement of the second lens unit becomes large due to an attempt made to have a higher zooming ratio. Accordingly, since the total length of the zoom lens becomes long, it is difficult to have a compact arrangement.

Moreover, falling below a lower limit of conditional expression (1-6), the refractive power of the second lens unit becomes excessively large, and an occurrence of the curvature of field and the chromatic aberration of magnification at the wide angle end becomes large. Therefore, it is not preferable.

Moreover, it is preferable that the zoom lens according to the present embodiment satisfies the following conditional expression (1-7).

$$0.3 < |f_2/f_3| < 1.5 \quad (1\text{-}7)$$

where, $f_2$ denotes a focal length of the second lens unit, and $f_3$ denotes the focal length of the third lens unit.

Conditional expression (1-7) is an expression in which, a ratio of the focal length of the second lens unit and the focal length of the third lens unit is regulated.

Exceeding an upper limit of conditional expression (7), since the refractive power of the third lens unit becomes excessively large, and the occurrence of the spherical aberration and the comatic aberration becomes large, it is not preferable.

Falling below a lower limit of conditional expression (1-7), since the refractive power of the second lens unit becomes excessively large as compared to the refractive power of the third lens unit, and the occurrence of the curvature of field and the chromatic aberration of magnification at the wide angle end becomes large, it is not preferable.

Moreover, it is preferable that the zoom lens according to the present embodiment satisfies the following conditional expression (1-8).

$$L_T/f_T < 3.3 \quad (1\text{-}8)$$

where, $L_T$ denotes a total length of the overall zoom lens system at the telephoto end, and $f_T$ denotes a focal length of the overall zoom lens system at the telephoto end.

Conditional expression (1-8) is an expression in which, the total length of the overall zoom lens at the telephoto end is regulated, and normalized by the focal length of the overall zoom lens at the telephoto end.

Exceeding an upper limit of conditional expression (1-8), the total length of the zoom lens at the telephoto end becomes excessively long, and it is not suitable for small-sizing.

Moreover, it is preferable that the zoom lens according to the present embodiment satisfies the following conditional expression (1-9).

$$\Sigma d_{3G}/f_T < 0.5 \quad (1\text{-}9)$$

where, $\Sigma d_{3G}$ denotes a total length of the third lens unit, and $f_T$ denotes a focal length of the overall zoom lens system at the telephoto end.

Conditional expression (1-9) is an expression in which, the total length of the third lens unit is regulated, and normalized by the focal length of the overall zoom lens at the telephoto end.

Exceeding an upper limit of conditional expression (1-9), the total length of the third lens unit becomes excessively long, and it is not suitable for small-sizing.

Moreover, it is preferable that the zoom lens according to the present embodiment satisfies the following conditional expression (1-10).

$$3.1 < f_T/f_W < 10 \tag{1-10}$$

where, $f_W$ denotes the focal length of the overall zoom lens system at the wide angle end, and $f_T$ denotes a focal length of the overall zoom lens system at the telephoto end.

Conditional expression (1-10) is an expression in which, the zooming ratio of the zoom lens according to the present embodiment is regulated, and it is necessary that the zoom lens according to the present embodiment, for maintaining a high zooming ratio, takes a value not smaller than a lower limit of conditional expression (1-10).

Moreover, it is preferable that the zoom lens according to the present embodiment satisfies the following conditional expression (1-11).

$$1.3 < |f_{3\_2}/f_{3\_1}| < 5 \tag{1-11}$$

wherein, $f_{3\_1}$ denotes a focal length of a lens component nearest to the object side, from among two or more than two lens components in the third lens unit, and $f_{3\_2}$ denotes a focal length of a lens component on the object side next to the lens component nearest to the object side, from among the two or more than two lens components in the third lens unit.

Conditional expression (1-11) is an expression in which, a ratio of the focal length of the lens component nearest to the object side and the focal length of the lens component on the object side next to the lens component nearest to the object side, from among lens components in the third lens units, is regulated.

Exceeding an upper limit of conditional expression (1-11), since a refractive power of the lens component nearest to the object side, from among the lens components in the third lens unit becomes excessively large, and the occurrence of the spherical aberration and the comatic aberration becomes large, it is not preferable.

Falling below a lower limit of conditional expression (1-11), since a refractive power of the lens component disposed on the object side next to the lens component nearest to the object side, from among the lens components in the third lens unit becomes excessively large, a refractive power of the third lens unit as a whole becomes small.

Moreover, it is preferable that the zoom lens according to the present embodiment satisfies the following conditional expression (1-12).

$$0.6 < f_{3\_1}/f_3 < 1.2 \tag{1-12}$$

where, $f_{3\_1}$ denotes a focal length of a lens component nearest to the object side, from among two or more than two lens components in the third lens unit, and $f_3$ denotes the focal length of the third lens unit.

Conditional expression (1-12) is an expression in which, a refractive power of the lens component nearest to the object side, from among the lens components in the third lens unit, is regulated, and normalized by the focal length of the third lens unit.

Exceeding an upper limit of conditional expression (1-12), the refractive power of the lens component nearest to the object side, from among the lens components in the third lens unit becomes excessively small, and the refractive power of the third lens unit as a whole becomes excessively small. Therefore, it is necessary to make the amount of movement of the third lens unit large for having a high zooming, which is not suitable for small-sizing.

Falling below a lower limit of conditional expression (1-12), since the refractive power of the lens component nearest to the object side, from among the lens components in the third lens unit becomes excessively large, and an amount of occurrence of the spherical aberration becomes large, it is not preferable.

Moreover, it is preferable that the zoom lens according to the present embodiment satisfies the following conditional expression (1-13).

$$0.9 < |f_{3\_2}/f_3| < 4 \tag{1-13}$$

where, $f_{3\_2}$ denotes a focal length of a lens component on the object side next to the lens component nearest to the object side, from among two or more than two lens components in the third lens unit, and $f_3$ denotes the focal length of the third lens unit.

Conditional expression (1-13) is an expression in which, a refractive power of the lens component disposed on the object side next to the lens component nearest to the object side, from among the lens components in the third lens unit is regulated, and normalized by the focal length of the third lens unit.

Falling below an upper limit of conditional expression (1-13), the refractive power of the lens component disposed on the object side next to the lens component nearest to the object side, from among the lens components in the third lens unit becomes excessively large, and correction of a comatic aberration of high order becomes difficult.

Moreover, since a principal point of the third lens unit cannot be brought forward (toward the object side), it becomes difficult to make a lens diameter small, and to have a compact arrangement.

Moreover, falling below a lower limit of conditional expression (1-13), the refractive power of the lens component disposed on the object side next to the lens component nearest to the object side, from among the lens components in the third lens unit becomes excessively large, and the refractive power of the third lens unit is a whole becomes small. Therefore, it is necessary to make the amount of movement of the third lens unit large for achieving high zooming, which is not suitable for small-sizing.

Accordingly, it is possible to achieve an image pickup apparatus in which, a zoom lens having a compact arrangement, with a small F-number, or in other words, with a large aperture, which is a zoom lens with high zooming and favorable aberration performance, in which, a lens diameter and the number of lenses are suppressed to be small, is used.

Moreover, a zoom lens according to the present embodiment includes in order from an object side, a first lens unit having a positive refractive power;
a second lens unit having a negative refractive power; and
a third lens unit having a positive refractive power,
wherein
the third lens unit comprises in order from the object, a first lens component having a positive refractive power and a second lens component having a negative refractive power,
the zoom lens satisfies the following conditional expressions (2-1), (2-2), and (2-3)

$$2 < |f_{3\_2}/f_{3\_1}| < 5 \tag{2-1}$$

$$0.1 < (\beta_{2T}/\beta_{2W})/(\beta_{3T}/\beta_{3W}) < 0.8 \tag{2-2}$$

$$Fno(W) < 2.5 \tag{2-3}$$

where, $f_{3\_1}$ denotes a focal length of the first lens component in the third lens unit, $f_{3\_2}$ denotes a focal length of the second lens component in the third lens unit, $\beta_{2W}$ denotes a lateral magnification at a wide angle end of the second lens unit, $\beta_{2T}$ denotes a lateral magnification at a telephoto end of the second lens unit, $\beta_{3W}$ denotes a lateral magnification at a wide angle end of the third lens unit, $\beta_{3T}$ denotes a lateral magnification at a telephoto end of the third lens unit, $\Delta_{1G}$ denotes an amount of movement of the first lens unit at the time of zooming from the wide angle end to the telephoto end, $\Delta_{4G}$ denotes an amount of movement of the fourth lens unit at the time of zooming from the wide angle end to the telephoto end, and Fno (W) denotes F number at a wide angle end.

In a case of a fast lens, a large pupil diameter and a high aberration performance are sought. Therefore, it is difficult to make a compact arrangement. The zoom lens according to the present embodiment includes in order from the object side, the first lens unit having a positive refractive power, the second lens unit having a negative refractive power, and the third lens unit having a positive refractive power. Moreover, the third lens unit comprises in order from the object, a first lens component having a positive refractive power and a second lens component having a negative refractive power. In this case, by setting the following conditional expressions (2-1), (2-2) and (2-3) appropriately, it is possible to have a compact arrangement with an improved performance.

Conditional expression (2-1) is an expression in which, a ratio of the focal length of the first lens component having a positive refractive power and the focal length of the second lens component having a negative refractive power, from among the lens components in the third lens unit is regulated.

Conditional expression (2-1) is an expression in which, a ratio of the focal length of the first lens component having a positive refractive power and the focal length of the second lens component having a negative refractive power, from among the lens components in the third lens unit is regulated.

Exceeding an upper limit of conditional expression (2-1), since the refractive power of the first lens component becomes excessively large, and the occurrence of aberrations such as the spherical aberration and the comatic aberration becomes large, it is not preferable.

Falling below a lower limit of conditional expression (2-1), the refractive power of the second lens component becomes excessively large, and the refractive power of the third lens unit as a whole becomes small, and it is not possible to make the zooming ratio high. Moreover, when an attempt is made to make the zooming ratio high, the amount of movement of the third lens unit becomes large, and it becomes difficult to adopt a compact arrangement.

Conditional expression (2-2) is an expression in which, the load of zooming on the second lens unit and the load of zooming on the third lens unit from among the lens units which are involved in zooming, is regulated to an appropriate ratio.

Exceeding an upper limit of conditional expression (2-2), since the zooming load on the second lens unit becomes excessively large, and an occurrence of a curvature of field and a chromatic aberration of magnification at a wide angle end becomes large, it is not preferable.

When a measure such as increasing the number of lenses for suppressing aberration is taken, a load on an optical design increases, and it is disadvantageous for small-sizing.

Moreover, falling below a lower limit value of conditional expression (2-2), since the load of zooming on the third lens unit becomes excessively large, and an occurrence of various aberrations such as a spherical aberration and a comatic aberration increases, and a fluctuation in a longitudinal chromatic aberration becomes large, it is not preferable.

Conditional expression (2-3) is an expression in which, F number at a wide angle end is regulated. Exceeding an upper limit of the conditional expression (2-3), F number at a wide angle end becomes large. Thereby, a lens is not fast.

Moreover, it is preferable that the zoom lens according to the present embodiment satisfies the following conditional expression (2-4)

$$1.9 < f_3/f_W < 5 \qquad (2-4)$$

where, $f_3$ denotes a focal length of the third lens unit, and $f_W$ denotes a focal length of the overall zoom lens system at the wide angle end.

Conditional expression (2-4) is an expression in which, the focal length of the third lens unit is regulated, and normalized by the focal length of the overall zoom lens at the wide angle end.

Exceeding an upper limit of conditional expression (2-4), the refractive power of the third lens unit becomes excessively small, and the amount of movement of the third lens unit becomes large due to an attempt made to have a higher zooming ratio. Accordingly, since the total length of the zoom lens becomes long, it is difficult to have a compact arrangement.

Moreover, falling below a lower limit of conditional expression (2-4), the refractive power of the third lens unit becomes excessively large, and an occurrence of the curvature of field and the chromatic aberration of magnification at the wide angle end becomes large. Therefore, it is not preferable.

Moreover, it is preferable that the zoom lens according to the present embodiment satisfies the following conditional expression (2-5)

$$\Sigma d_{3G}/f_T < 0.42 \qquad (2-5)$$

$\Sigma d_{3G}$ denotes a total length of the third lens unit, $f_T$ denotes a focal length of the overall zoom lens system at the telephoto end.

Conditional expression (2-5) is an expression in which, the total length of the third lens unit is regulated, and normalized by the focal length of the overall zoom lens at the telephoto end.

Exceeding an upper limit of conditional expression (2-5), the total length of the third lens unit becomes excessively long, and it is not suitable for small-sizing.

Conditional expression (2-5) is an expression in which, the total length of the third lens unit is regulated, and normalized by the focal length of the overall zoom lens at the telephoto end.

Exceeding an upper limit of conditional expression (2-5), the total length of the third lens unit becomes excessively long, and it is not suitable for small-sizing.

Moreover, it is preferable that the zoom lens according to the present embodiment satisfies the following conditional expression (2-6)

$$0.6 < |f_{3\_1}/f_3| < 1.2 \qquad (2-6)$$

where, $f_{3\_1}$ denotes a focal length of the first lens component in the third lens unit, and $f_3$ denotes the focal length of the third lens unit.

Conditional expression (2-6) is an expression in which, the refractive power of the first lens unit is regulated, and normalized by the focal length of the third lens unit.

Exceeding an upper limit of conditional expression (2-6), the refractive power of the first lens component becomes excessively small, and the refractive power of the third lens unit as a whole becomes excessively small. Therefore, it is necessary to make the amount of movement of the third lens unit large for having a high zooming, which is not suitable for small-sizing.

Falling below a lower limit of conditional expression (2-6), since the refractive power of the first lens component becomes excessively large, and an amount of occurrence of the spherical aberration becomes large, it is not preferable.

Moreover, it is preferable that the zoom lens according to the present embodiment satisfies the following conditional expression (2-7)

$$0.9 < |f_{3\_2}/f_3| < 4 \quad (2\text{-}7)$$

where, $f_{3\_2}$ denotes a focal length of the second lens component in the third lens unit, and $f_3$ denotes the focal length of the third lens unit.

Conditional expression (2-7) is an expression in which, the refractive power of the second lens unit is regulated, and normalized by the focal length of the third lens unit.

Exceeding an upper limit of conditional expression (2-7), the refractive power of the second lens component becomes excessively large, and correction of a comatic aberration of high order becomes difficult.

Moreover, since a principal point of the third lens unit cannot be brought forward (toward the object side), it becomes difficult to make a lens diameter small, and to have a compact arrangement.

Moreover, falling below a lower limit of conditional expression (2-7), the refractive power of the second lens component becomes excessively large, and the refractive power of the third lens unit is a whole becomes small. Therefore, it is necessary to make the amount of movement of the third lens unit large for achieving high zooming, which is not suitable for small-sizing.

Moreover, it is preferable that the zoom lens according to the present embodiment satisfies the following conditional expression (2-7)

$$L_T/f_T < 3.3 \quad (2\text{-}8)$$

where, $L_T$ denotes a total length of the overall zoom lens system at the telephoto end, and $f_T$ denotes a focal length of the overall zoom lens system at the telephoto end.

Conditional expression (2-10) is an expression in which, the total length of the overall zoom lens at the telephoto end is regulated, and normalized by the focal length of the overall zoom lens at the telephoto end.

Exceeding an upper limit of conditional expression (2-10), the total length of the zoom lens at the telephoto end becomes excessively long, and it is not suitable for small-sizing.

Moreover, it is preferable that the zoom lens according to the present embodiment satisfies the following conditional expression (2-7)

$$3.1 < f_T/f_W < 10 \quad (2\text{-}9)$$

where, $f_W$ denotes the focal length of the overall zoom lens system at the wide angle end, and $f_T$ denotes a focal length of the overall zoom lens system at the telephoto end.

Conditional expression (2-9) is an expression in which, the zooming ratio of the zoom lens according to the present embodiment is regulated, and it is necessary that the zoom lens according to the present embodiment, for maintaining a high zooming ratio, takes a value not smaller than a lower limit of conditional expression (2-9).

Moreover, it is preferable that the zoom lens according to the present embodiment satisfies the following conditional expression (2-10)

$$-5 < f_2/f_W < -1.5 \quad (2\text{-}10)$$

where, $f_2$ denotes a focal length of the second lens unit, and $f_W$ denotes a focal length of the overall zoom lens system at the wide angle end.

Conditional expression (2-10) regulates an appropriate ratio of the focal length of the second lens unit and the focal length of the overall zoom lens system at the wide angle end.

Falling below a lower limit of conditional expression (2-10) is, the refractive power of the second lens unit becomes small, and the total length of the zoom lens becomes long. Therefore, the small-sizing of the zoom lens becomes difficult.

Exceeding an upper limit of conditional expression (2-10), the refractive power of the second lens unit becomes large. Therefore, the curvature of field and the chromatic aberration of magnification occur substantially at the wide angle end.

An image pickup apparatus according to the present embodiment includes a zoom lens, and an image pickup element which includes an image pickup surface which is disposed on an image side of the zoom lens, and which receives an image formed by the zoom lens, and the zoom lens is the abovementioned zoom lens.

Moreover, a zoom lens according to the present embodiment includes in order from an object side, a first lens unit having a positive refractive power, a second lens unit having a negative refractive power, and a third lens unit having a positive refractive power, and the first lens unit includes in order from the object side, a first lens having a negative refractive power and a second lens having a positive refractive power, and the third lens unit includes in order from the object side, a first lens component having a positive refractive power, a second lens component having a negative refractive power, and a third lens component, and the zoom lens satisfies the following conditional expressions (3-1), (3-2), and (3-3).

$$1.3 < |f_{3\_2}/f_{3\_1}| < 5 \quad (3\text{-}1)$$

$$\Sigma d_{3G}/f_T < 0.42 \quad (3\text{-}2)$$

$$Fno(W) < 2.5 \quad (3\text{-}3)$$

where, $f_{3\_1}$ denotes a focal length of the first lens component having a positive refractive power in the third lens unit, $f_{3\_2}$ denotes a focal length of the second lens component having a negative refractive power in the third lens unit, $\Sigma d_{3G}$ denotes a total length of the third lens unit, $f_T$ denotes a focal length of the overall zoom lens system at the telephoto end, and Fno(W) denotes an F-number of the zoom lens at the wide angle end.

A reason for and an effect of adopting such arrangement will be described below.

In a case of a fast lens, a large pupil diameter and a high aberration performance are sought. Therefore, it is difficult to make a compact arrangement. The zoom lens according to the present embodiment includes in order from the object side, the first lens unit having a positive refractive power, the second lens unit having a negative refractive power, and the third lens unit having a positive refractive power.

Moreover, the third lens unit includes the first lens component having a positive refractive power, the second lens component having a negative refractive power, and the third lens component. In this case, by setting the following conditional expressions appropriately, it is possible to have a compact arrangement with an improved performance.

Conditional expression (3-1) is an expression in which, a ratio of the focal length of the first lens component having a positive refractive power and the focal length of the second lens component having a negative refractive power, from among the lens components in the third lens unit is regulated.

Exceeding an upper limit of conditional expression (3-1), since the refractive power of the first lens component becomes excessively large, and the occurrence of aberrations such as the spherical aberration and the comatic aberration becomes large, it is not preferable.

Falling below a lower limit of conditional expression (3-1), the refractive power of the second lens component becomes excessively large, and the refractive power of the third lens unit as a whole becomes small, and it is not possible to make the zooming ratio high. Moreover, when an attempt is made to make the zooming ratio high, the amount of movement of the third lens unit becomes large, and it becomes difficult to adopt a compact arrangement.

Conditional expression (3-2) is an expression in which, the total length of the third lens unit is regulated, and normalized by the focal length of the overall zoom lens system at the telephoto end.

Exceeding an upper limit of conditional expression (3-2), the total length of the third lens unit becomes long, which is not suitable for small-sizing.

Conditional expression (3-3) is an expression in which, the F-number at the wide angle end is regulated.

Exceeding an upper limit of conditional expression (3-3), the F-number at the wide angle end becomes large, and the lens ceases to be a fast lens.

Moreover, in the zoom lens according to the present embodiment, it is preferable that the first lens unit includes a cemented lens.

By letting the first lens unit include the cemented lens, it is possible to make the compact arrangement while correcting the chromatic aberration.

Moreover, it is preferable that the zoom lens according to the present embodiment satisfies the following conditional expression (3-4).

$$0.1 < (\beta_{2T}/\beta_{2W})/(\beta_{3T}/\beta_{3W}) < 0.8 \quad (3\text{-}4)$$

where, $\beta_{2W}$ denotes a lateral magnification at a wide angle end of the second lens unit, $\beta_{2T}$ denotes a lateral magnification at a telephoto end of the second lens unit, $\beta_{3W}$ denotes a lateral magnification at a wide angle end of the third lens unit, and $\beta_{3T}$ denotes a lateral magnification at a telephoto end of the third lens unit.

Conditional expression (3-4) is an expression in which, the load of zooming on the second lens unit and the load of zooming on the third lens unit from among the lens units which are involved in zooming is regulated to an appropriate ratio.

Exceeding an upper limit of conditional expression (3-4), since the load of zooming on the second lens unit becomes excessively large, and the occurrence of the curvature of field and the chromatic aberration of magnification at the wide angle end becomes substantial, it is not preferable. Moreover, a load on an optical design such as, increasing the number of lenses for suppressing the aberration becomes large, and it is disadvantageous for small-sizing.

Falling below a lower limit of conditional expression (3-4), the load of zooming on the third lens unit becomes excessively large, and occurrence of various aberrations such as the spherical aberration and the comatic aberration increases. Also, the fluctuation in the longitudinal chromatic aberration becomes large, and therefore, it is not preferable.

Moreover, it is preferable that the zoom lens according to the present embodiment satisfies the following conditional expression (3-5).

$$2 < f_3/f_W < 5 \quad (3\text{-}5)$$

where, $f_3$ denotes a focal length of the third lens unit, and $f_W$ denotes a focal length of the overall zoom lens system at the wide angle end.

Conditional expression (3-5) is an expression in which, the focal length of the third lens unit is regulated, and normalized by the focal length of the overall zoom lens system at the wide angle end.

Exceeding an upper limit of conditional expression (3-5), the refractive power of the third lens unit becomes excessively small. Accordingly, the amount of movement of the third lens unit due to an attempt made to have a higher zooming ratio becomes large, and the total length of the zoom lens becomes long. As a result, it becomes difficult to adopt a compact arrangement.

Moreover, falling below a lower limit of conditional expression (3-5) is, since the refractive power of the third lens unit becomes excessively large, and aberrations such as the spherical aberration and the comatic aberration occur substantially in the third lens unit, it is not preferable.

Moreover, it is preferable that the zoom lens according to the present embodiment satisfies the following conditional expression (3-6).

$$0.6 < f_{3\_1}/f_3 < 1.2 \quad (3\text{-}6)$$

where, $f_{3\_1}$ denotes a focal length of the first lens component in the third lens unit, and $f_3$ denotes the focal length of the third lens unit.

Conditional expression (3-6) is an expression in which, the refractive power of the first lens component is regulated, and normalized by the focal length of the third lens unit.

Exceeding an upper limit of conditional expression (3-6), the refractive power of the first lens component becomes excessively small, and the refractive power of the third lens unit as a whole becomes excessively small. Therefore, for achieving a high zooming ratio, it is necessary to make the amount of movement of the third lens unit large, which is not suitable for small-sizing.

Falling below a lower limit of conditional expression (3-6), since the refractive power of the first lens component becomes excessively large, and an amount of occurrence of the spherical aberration becomes large, it is not preferable.

Moreover, it is preferable that the zoom lens according to the present embodiment satisfies the following conditional expression (3-7).

$$0.9 < |f_{3\_2}/f_3| < 4 \quad (3\text{-}7)$$

where, $f_{3\_2}$ denotes a focal length of the second lens component in the third lens unit, and $f_3$ denotes the focal length of the third lens unit.

Conditional expression (3-7) is an expression in which, the refractive power of the second lens component is regulated, and normalized by the focal length of the third lens unit.

Exceeding an upper limit of conditional expression (3-7), the refractive power of the second lens component becomes excessively small, and correction of the comatic aberration of high order becomes difficult. Moreover, the principal point of the third lens unit cannot be brought forward (toward the object side). Therefore, it becomes difficult to make the lens diameter small, and to adopt a compact arrangement.

Falling below a lower limit of conditional expression (3-7), the refractive power of the second lens component becomes excessively large, and the refractive power of the third lens unit as a whole becomes small. Therefore, for achieving the high zooming ratio, it is necessary to make the amount of movement of the third lens unit large, which is not suitable for small-sizing.

Moreover, it is preferable that the zoom lens according to the present embodiment satisfies the following conditional expression (3-8).

$$L_T/f_T < 3.3 \quad (3\text{-}8)$$

where, $L_T$ denotes a total length of the overall zoom lens system at the telephoto end, and $f_T$ denotes a focal length of the overall zoom lens system at the telephoto end.

Conditional expression (3-8) is an expression in which, the total length of the overall zoom lens system at the telephoto end is regulated, and normalized by the focal length of the overall zoom lens system at the telephoto end.

Exceeding an upper limit of conditional expression (3-8), the total length of the overall zoom lens system at the telephoto end becomes excessively long, which is not suitable for small-sizing.

Moreover, it is preferable that the zoom lens according to the present embodiment satisfies the following conditional expression (3-9).

$$3.1 < f_T/f_W < 10 \quad (3\text{-}9)$$

where, $f_W$ denotes the focal length of the overall zoom lens system at the wide angle end, and $f_T$ denotes a focal length of the overall zoom lens system at the telephoto end.

Conditional expression (3-9) is an expression in which, the zooming ratio of the zoom lens according to the present patent application is regulated, and it is necessary that the zoom lens according to the present patent application, for maintaining a high zooming ratio, takes a value not smaller than a lower limit of conditional expression (3-9).

Moreover, it is preferable that the zoom lens according to the present embodiment satisfies the following conditional expression (3-10).

$$-5 < f_2/f_W < -1.5 \quad (3\text{-}10)$$

where, $f_2$ denotes a focal length of the second lens unit, and $f_W$ denotes a focal length of the overall zoom lens system at the wide angle end.

Conditional expression (3-10) regulates an appropriate ratio of the focal length of the second lens unit and the focal length of the overall zoom lens system at the wide angle end.

Falling below a lower limit of conditional expression (3-10) is, the refractive power of the second lens unit becomes small, and the total length of the zoom lens becomes long. Therefore, the small-sizing of the zoom lens becomes difficult.

Exceeding an upper limit of conditional expression (3-10), the refractive power of the second lens unit becomes large. Therefore, the curvature of field and the chromatic aberration of magnification occur substantially at the wide angle end.

An image pickup apparatus according to the present embodiment includes a zoom lens, and an image pickup element which includes an image pickup surface which is disposed on an image side of the zoom lens, and which receives an image formed by the zoom lens, and the zoom lens is the abovementioned zoom lens.

Accordingly, it is possible to achieve an image pickup apparatus in which, a zoom lens having a compact arrangement, with a small F-number, or in other words, with a large aperture, which is a zoom lens with high zooming, and favorable aberration performance, in which, a lens diameter and the number of lenses are suppressed to be small, is used.

Moreover, for making the functions (action and effect) more assured, it is preferable to let each of the abovementioned expression have an upper limit value and a lower limit value as follow.

For conditional expression (1-1a), it is more preferable to let a lower limit value to be 0.48. Moreover, for conditional expression (1-1a), it is more preferable to let an upper limit value to be 0.66.

For conditional expression (1-2a), it is more preferable to let a lower limit value to be 0.5, and 0.6 is even more preferable. Moreover, for conditional expression (1-2a), it is more preferable to let an upper limit value to be 2, and 1.6 is even more preferable.

For conditional expression (1-3a), it is more preferable to let a lower limit value to be 2.2, and 2.3 is even more preferable. Moreover, for conditional expression (1-3a), it is more preferable to let an upper limit value to be 3.5, and 3 is even more preferable.

For conditional expression (1-1b), it is more preferable to let a lower limit value to be 0.3, and 0.4 is even more preferable. Moreover, for conditional expression (1-1b), it is more preferable to let an upper limit value to be 0.7, and 0.65 is even more preferable.

For conditional expression (1-2b), it is more preferable to let a lower limit value to be 0. Moreover, for conditional expression (1-2b), it is more preferable to let an upper limit value to be 1, and 0.5 is even more preferable.

For conditional expression (1-3b), it is more preferable to let a lower limit value to be 1.85, and 1.9 is even more preferable. Moreover, for conditional expression (1-3b), it is more preferable to let an upper limit value to be 3, and 2.6 is even more preferable.

For conditional expression (1-4), it is more preferable to let a lower limit value to be 0.15. Moreover, for conditional expression (1-4), it is more preferable to let an upper limit value to be 0.35.

For conditional expression (1-5), it is more preferable to let a lower limit value to be 0.5, and 0.6 is even more preferable. Moreover, for conditional expression (1-5), it is more preferable to let an upper limit value to be 3.8, and 3 is even more preferable.

For conditional expression (1-6), it is more preferable to let a lower limit value to be 1.45, and 1.5 is even more preferable. Moreover, for conditional expression (1-6), it is more preferable to let an upper limit value to be 2.5, and 2 is even more preferable.

For conditional expression (1-7), it is more preferable to let a lower limit value to be 0.5, and 0.6 is even more preferable. Moreover, for conditional expression (1-7), it is more preferable to let an upper limit value to be 1, and 0.8 is even more preferable.

For conditional expression (1-8), it is more preferable to let an upper limit value to be 3, and 2.5 is even more preferable.

For conditional expression (1-9), it is more preferable to let an upper limit value to be 0.42, and 0.4 is even more preferable.

For conditional expression (1-10), it is more preferable to let a lower limit value to be 3.5, and 4.5 is even more preferable. Moreover, for conditional expression (1-10), it is more preferable to let an upper limit value to be 8, and 6 is even more preferable.

For conditional expression (1-11), it is more preferable to let a lower limit value to be 1.4, and 1.5 is even more preferable. Moreover, for conditional expression (1-11), it is more preferable to let an upper limit value to be 3.5, and 2.5 is even more preferable.

For conditional expression (1-12), it is more preferable to let a lower limit value to be 0.65. Moreover, for conditional expression (1-12), it is more preferable to let an upper limit value to be 1.1.

For conditional expression (1-13), it is more preferable to let a lower limit value to be 1, and 1.1 is even more preferable. Moreover, for conditional expression (1-13), it is more preferable to let an upper limit value to be 3, and 2.5 is even more preferable.

For conditional expression (2-1), it is more preferable to let an upper limit value to be 3.5, and 3 is even more preferable. Moreover for conditional expression (2-1), it is more preferable to let a lower limit value to be 2.1, and 2.15 is even more preferable.

For conditional expression (2-2), it is more preferable to let an upper limit value to be 0.75, and 0.6 is even more preferable. Moreover for conditional expression (2-1), it is more preferable to let a lower limit value to be 0.3, and 0.35 is even more preferable.

For conditional expression (2-3), it is more preferable to let an upper limit value to be 2.4, and 2.36 is even more preferable.

For conditional expression (2-4), it is more preferable to let an upper limit value to be 4, and 3 is even more preferable, Moreover for conditional expression (2-1), it is more preferable to let a lower limit value to be 2.1, and 2.2 is even more preferable.

For conditional expression (2-5), it is more preferable to let an upper limit value to be 0.35, and 0.3 is even more preferable, For conditional expression (2-6), it is more preferable to let an upper limit value to be 1.1, and 1 is even more preferable. Moreover for conditional expression (2-6), it is more preferable to let a lower limit value to be 0.7, and 0.8 is even more preferable.

For conditional expression (2-7), it is more preferable to let an upper limit value to be 4, and 3.5 is even more preferable. Moreover for conditional expression (2-7), it is more preferable to let a lower limit value to be 1.4, and 1.6 is even more preferable.

For conditional expression (2-8), it is more preferable to let an upper limit value to be 3, and 2.8 is even more preferable.

For conditional expression (2-9), it is more preferable to let an upper limit value to be 8, and 6 is even more preferable. Moreover for conditional expression (2-9), it is more preferable to let a lower limit value to be 3.3, and 3.6 is even more preferable.

For conditional expression (2-10), it is more preferable to let an upper limit value to be −1.52. Moreover for conditional expression (2-10), it is more preferable to let a lower limit value to be −3.

For conditional expression (3-1), it is more preferable to let a lower limit value to be 1.4, and 1.5 is even more preferable. Moreover, for conditional expression (3-1), it is more preferable to let an upper limit value to be 3.5, and 2.5 is even more preferable.

For conditional expression (3-2), it is more preferable to let an upper limit value to be 0.4, and 0.38 is even more preferable.

For conditional expression (3-3), it is more preferable to let an upper limit value to be 2.2, and 2 is even more preferable.

For conditional expression (3-4), it is more preferable to let a lower limit value to be 0.4, and 0.45 is even more preferable. Moreover, for conditional expression (3-4), it is more preferable to let an upper limit value to be 0.75, and 0.7 is even more preferable.

For conditional expression (3-5), it is more preferable to let a lower limit value to be 2.1, and 2.2 is even more preferable. Moreover, for conditional expression (3-5), it is more preferable to let an upper limit value to be 4, and 3 is even more preferable.

For conditional expression (3-6), it is more preferable to let a lower limit value to be 0.65. Moreover, for conditional expression (3-6), it is more preferable to let an upper limit value to be 1.1.

For conditional expression (3-7), it is more preferable to let a lower limit value to be 1, and 1.1 is even more preferable. Moreover, for conditional expression (3-7), it is more preferable to let an upper limit value to be 3, and 2.5 is even more preferable.

For conditional expression (3-8), it is more preferable to let an upper limit value to be 2.9, and 2.6 is even more preferable.

For conditional expression (3-9), it is more preferable to let a lower limit value to be 3.5, and 4.5 is even more preferable. Moreover, for conditional expression (3-9), it is more preferable to let an upper limit value to be 8, and 6 is even more preferable.

For conditional expression (3-10), it is more preferable to let a lower limit value to be −3. Moreover, for conditional expression (3-10), it is more preferable to let an upper limit value to be −1.52.

The abovementioned zoom lens may satisfy the plurality of arrangements simultaneously. Making such an arrangement is preferable for achieving a favorable zoom lens and an image pickup apparatus. Moreover, combinations of preferable arrangements are arbitrary. For each conditional expression, only an upper limit value or a lower limit value of a numerical range of a conditional expression restricted further may be restricted.

Examples from an example 1 to a seventeenth example of the zoom lens according to the present invention will be described below. Lens cross-sectional views at a wide angle end at the time of infinite object point focusing of zoom lenses according to examples from the example 1 to the seventeenth example are shown in FIG. 1A, FIG. 2A, FIG. 3A, FIG. 4A, FIG. 5A, FIG. 6A, FIG. 7A, FIG. 8A, FIG. 9A, FIG. 10A, FIG. 11A, FIG. 12A, FIG. 13A, FIG. 14A, FIG. 15A, FIG. 16A, and FIG. 17A.

Lens cross-sectional views in an intermediate focal length state at the time of infinite object point focusing of zoom lenses according to examples from the example 1 to the seventeenth example are shown in FIG. 1B, FIG. 2B, FIG. 3B, FIG. 4B, FIG. 5B, FIG. 6B, FIG. 7B, FIG. 8B, FIG. 9B, FIG. 10B, FIG. 11B, FIG. 12B, FIG. 13B, FIG. 14B, FIG. 15B, FIG. 16B, and FIG. 17B.

Lens cross-sectional view at a telephoto end of the zoom lenses according to examples from the example 1 to the example 17 are shown in FIG. 1C, FIG. 2C, FIG. 3C, FIG. 4C, FIG. 5C, FIG. 6C, FIG. 7C, FIG. 8C, FIG. 9C, FIG. 10C, FIG. 11C, FIG. 12C, FIG. 13C, FIG. 14C, FIG. 15C, FIG. 16C, and FIG. 17C. In diagrams from FIG. 1A to FIG. 17C, a first lens unit is denoted by G1, a second lens unit is denoted by G2, a third lens unit is denoted by G3, a fourth lens unit is denoted by G4, a fifth lens unit is denoted by G5, an aperture stop is denotes by S, a flat parallel plate which forms a low-pass filter on which, a wavelength region restricting coating which restricts infrared light is applied, is denoted by F, a flat parallel plate of cover glass is denoted by C, and an image plane is denoted by I. A multi-layer film for restricting wavelength region may be applied to a surface of the cover glass C. Moreover, an arrangement may be made to impart an effect a low-pass filter to the cover glass C. The flat parallel plate F may be imparted a function of a low-pass filter. Moreover, even in examples for which, the filter F is not shown in the diagram, the cover glass C also has a function of the filter F.

To cut off unnecessary light such as ghost and flare, a flare aperture may be disposed apart from an aperture stop.

The flare aperture may be disposed between the lens units of the zoom lens or between a zoom lens unit nearest to an object side and an image plane. An arrangement may be made such that flare rays are cut off by a frame member, or another member may be arranged to cut off the flare rays. Moreover, direct printing, a direct coating, or sticking a seal on the optical system may be carried out. A shape thereof may be any shape such as an elliptical shape, a rectangular shape, a polygonal shape, and a range surrounded by a function curve. Moreover, not only harmful light beam, but also a beam such as a coma flare around and image plane may be cut off.

Moreover, the ghost and the flare may be reduced by applying an antireflection coating to each lens. A multi coating is desirable as it enables to reduce the ghost and the flare effectively. Moreover, infrared cut-off coating may be applied to lens surfaces and a cover glass etc.

Moreover, a shading of brightness around an image may be reduced by shifting a micro lens of the CCD. For instance, a design of the micro lens of the CCD may be changed according to an angle of incidence of light rays at each image height. Moreover, an amount of degradation around the image may be corrected by image processing.

For preventing the occurrence of the ghost and the flare, generally, the antireflection coating is applied to a surface of a lens in contact with air. On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases. However, when the antireflection coating is applied positively even to the cemented surface, it is possible to reduce further the ghost and the flare, and to achieve a more favorable image. Particularly, recently, a glass material having a high refractive index has been widely used in an optical system of cameras, for having a significant effect on the aberration correction. However, when the glass material having a high refractive index is used as a cemented lens, a reflection at the cemented surface becomes unignorable. In such a case, applying the antireflection coating on the cemented surface is particularly effective. An effective usage of the cemented surface coating has been disclosed in Japanese Patent Application Laid-open Publication No. Hei 2-27301, No. 2001-324676, No. 2005-2115, and U.S. Pat. No. 7,116,482. In these patent literatures, a cemented lens surface coating in a first lens unit of positive-lead zoom lens has been described, and the same as disclosed in the above-mentioned patent literatures may be implemented for the cemented lens surface in a lens unit nearest to the object side, of the present invention. As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions. Naturally, similar to the coating on the surface of the lens in contact with air, the coating on the cemented surface may also be let be a multilayer coating. By combining appropriately a film thickness and a coating material of number of films not less than in two layers, it is possible to reduce further the reflectance, and to control spectral characteristics and angular characteristics of reflectance. Moreover, it is needless to mention that for the cemented surface of lenses other than the lenses in the lens unit nearest to the object side, it is effective to apply the coating on the cemented surface based on a similar idea.

In the following examples, it is preferable that the focusing is carried out by moving the fourth lens unit G4, and the focusing may also be carried out by the following (B-1), (B-2), and (B-3).

(B-1) Focusing is to be carried out by moving a lens unit other than the fourth lens unit.

(B-2) Focusing is to be carried out by moving a plurality of lens units.

(B-3) Focusing may be carried out by drawing out the whole lens system, or focusing may be carried out by drawing out some of the lenses and by drawing in some of the lenses.

Moreover, in each example, all numerical data is data in a state when focused at an object at an infinite distance. For the numerical data, a unit of length is mm and a unit of angle is ° (degrees). Furthermore, zoom data are values at a wide angle end, in an intermediate focal length state, and at a telephoto end.

Figure 1B:
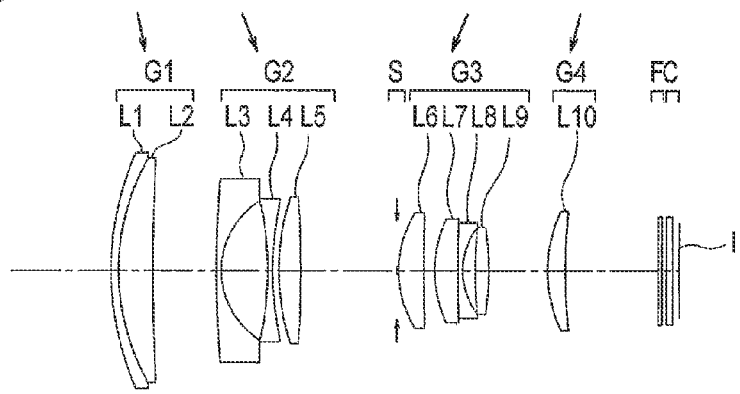
Figure 1C:
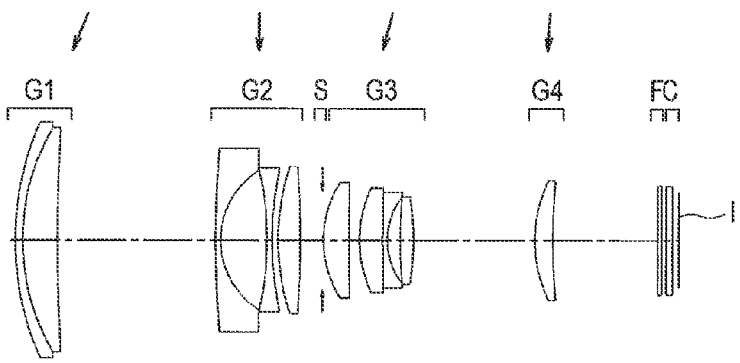

A zoom lens according to the example 1 of the present invention, as shown in FIG. 1A, FIG. 1B, and FIG. 1C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from a wide angle end to a telephoto end, the first lens unit G1, after moving toward an image side, moves toward the object side. The second lens unit G2, after moving toward the image side, is substantially fixed. The third lens unit G3 moves toward the object side. The fourth lens unit G4 moves toward the object side. The aperture stop S moves together with the third lens unit G3.

In order from the object side, the first lens unit G1 includes a cemented lens of a negative meniscus lens L1 having a convex surface directed toward the object side and a positive meniscus lens L2 having a convex surface directed toward the object side. Here, a layer between a second surface and a third surface is a cemented layer.

The second lens unit G2 includes a negative meniscus lens L3 having a convex surface directed toward the object side, a biconcave negative lens L4, and a biconvex positive lens L5.

The third lens unit G3 includes a positive meniscus lens L6 having a convex surface directed toward the object side, a cemented lens of a positive meniscus lens L7 having a convex surface directed toward the object side and a negative meniscus lens L8 having a convex surface directed toward the object side, and a biconvex positive lens L9.

The fourth lens unit G4 includes a positive meniscus lens L10 having a convex surface directed toward the object side.

An aspheric surface is provided to six surfaces namely, both surfaces of the biconvex positive lens L5, both surfaces of the positive meniscus lens L6, an image-side surface of the biconvex positive lens L9, and an object-side surface of the positive meniscus lens L10.

Figure 2A:
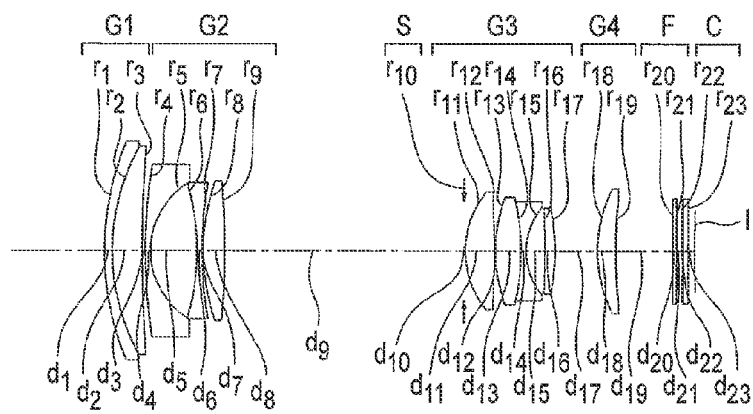
FIG. 2A, FIG. 2B, and FIG. 2C are lens cross-sectional views showing an optical arrangement at the time of infinite object point focusing of a zoom lens according to an example 2 of the present invention, where.
Figure 2B:
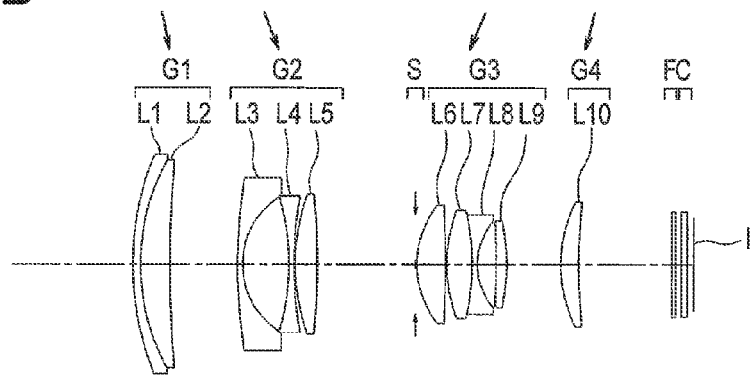
Figure 2C:
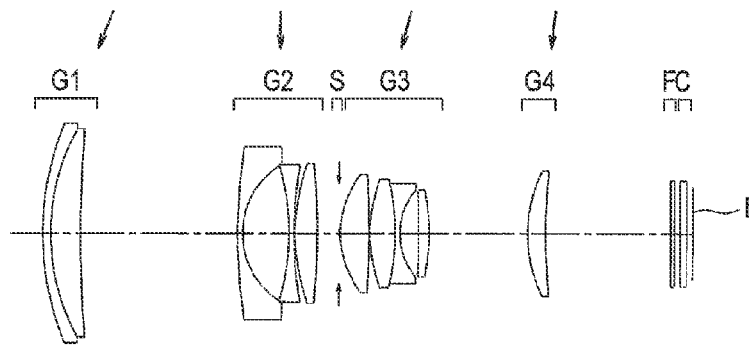

A zoom lens according to the example 2 of the present invention, as shown in FIG. 2A, FIG. 2B, and FIG. 2C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from a wide angle end to a telephoto end, the first lens unit G1, after moving toward an image side, moves toward the object side. The second lens unit G2, after moving toward the image side, is substantially fixed. The third lens unit G3 moves toward the object side. The fourth lens unit G4 moves toward the object side. The aperture stop S moves together with the third lens unit G3.

In order from the object side, the first lens unit G1 includes a cemented lens of a negative meniscus lens L1 having a convex surface directed toward the object side and a positive meniscus lens L2 having a convex surface directed toward the object side.

The second lens unit G2 includes a negative meniscus lens L3 having a convex surface directed toward the object side, a negative meniscus lens L4 having a convex surface directed toward the object side, and a biconvex positive lens L5.

The third lens unit G3 includes a positive meniscus lens L6 having a convex surface directed toward the object side, a cemented lens of a biconvex positive lens L7 and a biconcave negative lens L8, and a positive meniscus lens L9 having a convex surface directed toward the image side.

The fourth lens unit G4 includes a positive meniscus lens L10 having a convex surface directed toward the object side.

An aspheric surface is provided to four surfaces namely, both surfaces of the positive meniscus lens L6, an image-side surface of the positive meniscus lens L9, and an object-side surface of the positive meniscus lens L10.

Figure 3A:
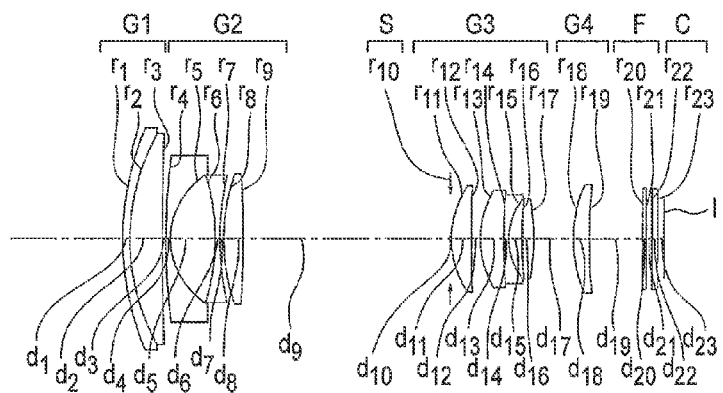
FIG. 3A, FIG. 3B, and FIG. 3C are lens cross-sectional views showing an optical arrangement at the time of infinite object point focusing of a zoom lens according to an example 3 of the present invention, where.
Figure 3B:
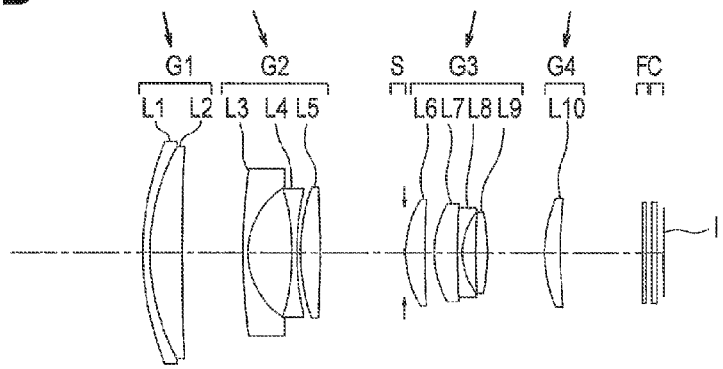
Figure 3C:
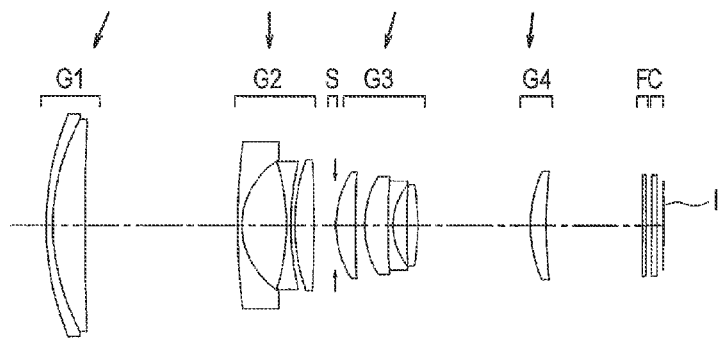

A zoom lens according to the example 3 of the present invention, as shown in FIG. 3A, FIG. 3B, and FIG. 3C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from a wide angle end to a telephoto end, the first lens unit G1, after moving toward an image side, moves toward the object side. The second lens unit G2, after moving toward the image side, is substantially fixed. The third lens unit G3 moves toward the object side. The fourth lens unit G4 moves toward the object side. The aperture stop S moves together with the third lens unit G3.

In order from the object side, the first lens unit G1 includes a cemented lens of a negative meniscus lens L1 having a convex surface directed toward the object side and a positive meniscus lens L2 having a convex surface directed toward the object side.

The second lens unit G2 includes a negative meniscus lens L3 having a convex surface directed toward the object side, a biconcave negative lens L4, and a biconvex positive lens L5.

The third lens unit G3 includes a positive meniscus lens L6 having a convex surface directed toward the object side, a cemented lens of a positive meniscus lens L7 having a convex surface directed toward the object side and a negative meniscus lens L8 having a convex surface directed toward the object side, and a biconvex positive lens L9.

The fourth lens unit G4 includes a positive meniscus lens L10 having a convex surface directed toward the object side.

An aspheric surface is provided to six surfaces namely, both surfaces of the biconcave negative lens L4, both surfaces of the positive meniscus lens L6, an image-side surface of the biconvex positive lens L9, and an object-side surface of the positive meniscus lens L10.

Figure 4A:
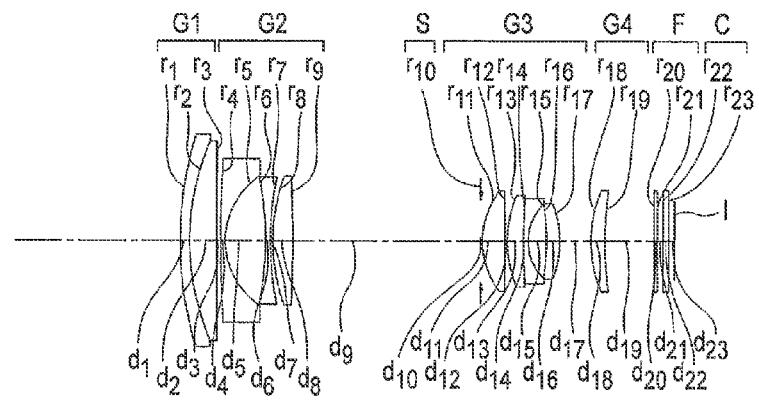
FIG. 4A, FIG. 4B, and FIG. 4C are lens cross-sectional views showing an optical arrangement at the time of infinite object point focusing of a zoom lens according to an example 4 of the present invention, where.
Figure 4B:
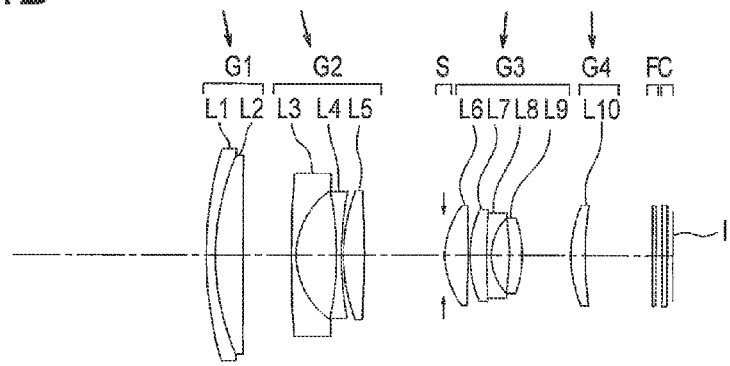
Figure 4C:
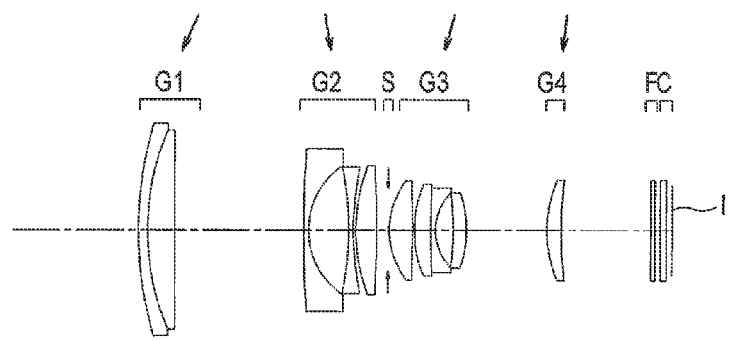

A zoom lens according to the example 4 of the present invention, as shown in FIG. 4A, FIG. 4B, and FIG. 4C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from a wide angle end to a telephoto end, the first lens unit G1, after moving toward an image side, moves toward the object side. The second lens unit G2 moves toward the image side. The third lens unit G3 moves toward the object side. The fourth lens unit G4 moves toward the object side. The aperture stop S moves together with the third lens unit G3.

In order from the object side, the first lens unit G1 includes a cemented lens of a negative meniscus lens L1 having a convex surface directed toward the object side and a positive meniscus lens L2 having a convex surface directed toward the object side.

The second lens unit G2 includes a negative meniscus lens L3 having a convex surface directed toward the object side, a biconcave negative lens L4, and a biconvex positive lens L5.

The third lens unit G3 includes a biconvex positive lens L6, a cemented lens of a positive meniscus lens L7 having a convex surface directed toward the object side and a negative meniscus lens L8 having a convex surface directed toward the object side, and a positive meniscus lens L9 having a convex surface directed toward the image side.

The fourth lens unit G4 includes a positive meniscus lens L10 having a convex surface directed toward the object side.

An aspheric surface is provided to four surfaces namely, both surfaces of the biconvex positive lens L6, an image-side surface of the positive meniscus lens L9, and an object-side surface of the positive meniscus lens L10.

Figure 5A:
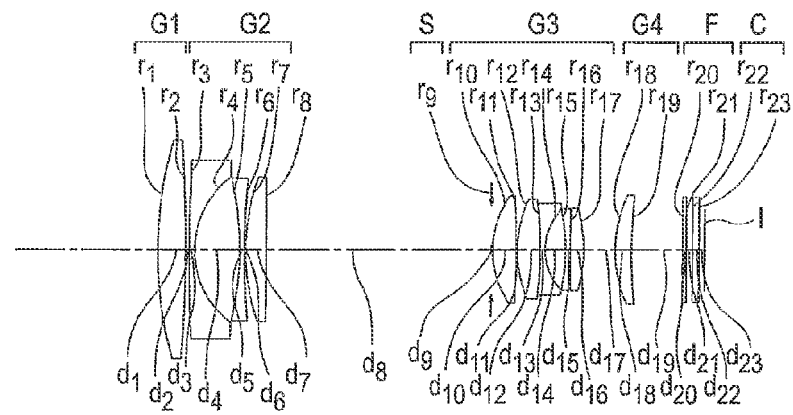
FIG. 5A, FIG. 5B, and FIG. 5C are lens cross-sectional views showing an optical arrangement at the time of infinite object point focusing of a zoom lens according to an example 5 of the present invention, where.
Figure 5B:
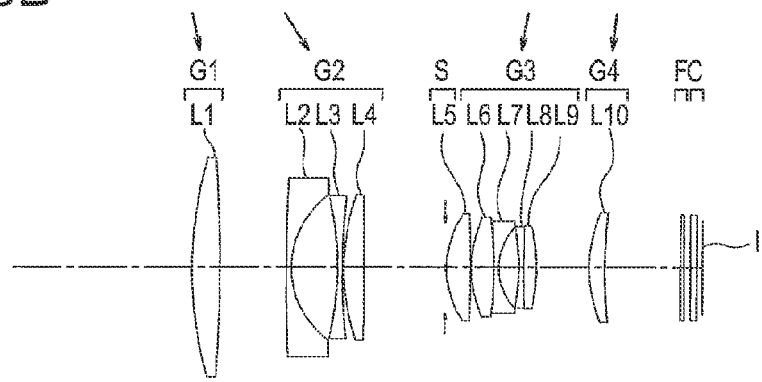
Figure 5C:
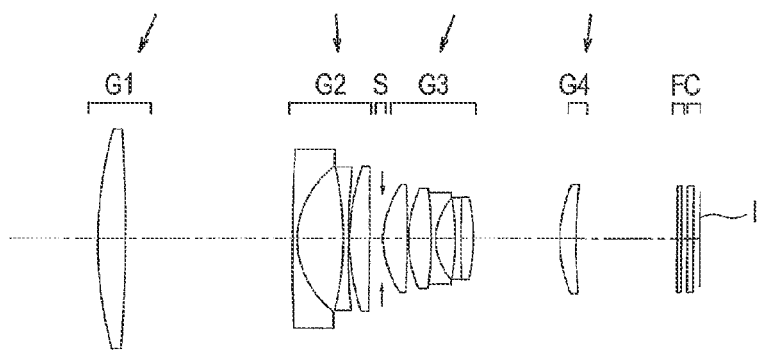

A zoom lens according to the example 5 of the present invention, as shown in FIG. 5A, FIG. 5B, and FIG. 5C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from a wide angle end to a telephoto end, the first lens unit G1, after moving toward an image side, moves toward the object side. The second lens unit G2 moves toward the image side. The third lens unit G3 moves toward the object side. The fourth lens unit G4 moves toward the object side. The aperture stop S moves together with the third lens unit G3.

In order from the object side, the first lens unit G1 includes a biconvex positive lens L1.

The second lens unit G2 includes a negative meniscus lens L2 having a convex surface directed toward the object side, a biconcave negative lens L3, and a biconvex positive lens L4.

The third lens unit G3 includes a biconvex positive lens L5, a cemented lens of a biconvex positive lens L6 and a biconcave negative lens L7, and a cemented lens of a biconcave negative lens L8 and a biconvex positive lens L9.

The fourth lens unit G4 includes a positive meniscus lens L10 having a convex surface directed toward the object side.

An aspheric surface is provided to four surfaces namely, both surfaces of the biconvex positive lens L5, an image-side surface of the biconvex positive lens L9, and an object-side surface of the positive meniscus lens L10.

Figure 6A:
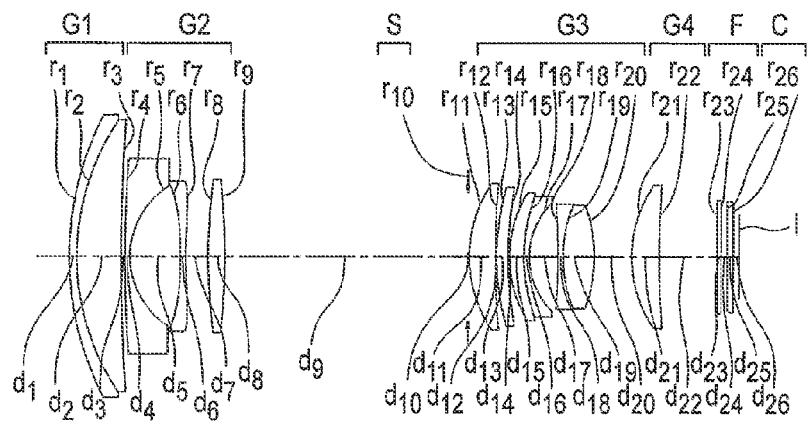
FIG. 6A, FIG. 6B, and FIG. 6C are lens cross-sectional views showing an optical arrangement at the time of infinite object point focusing of a zoom lens according to an example 6 of the present invention, where.
Figure 6B:
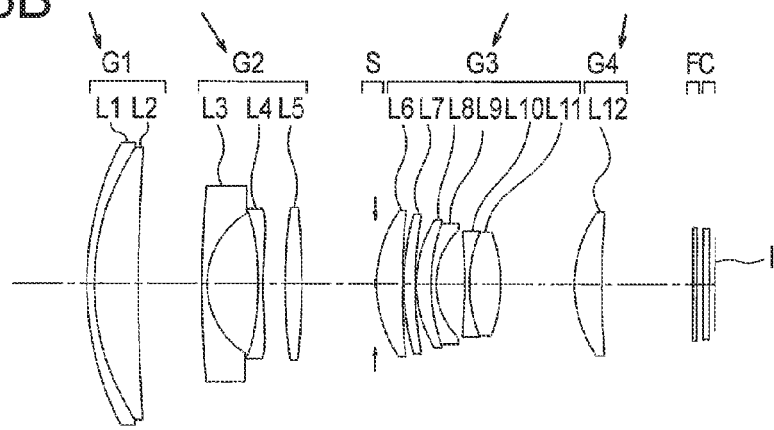
Figure 6C:
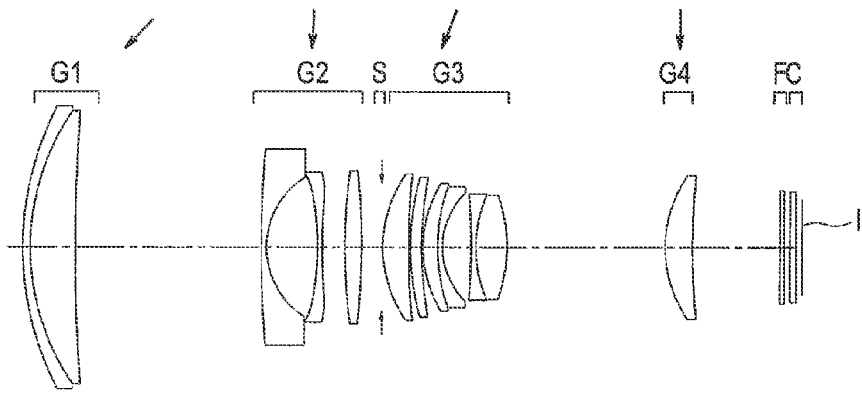

A zoom lens according to the example 6 of the present invention, as shown in FIG. 6A, FIG. 6B, and FIG. 6C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from a wide angle end to a telephoto end, the first lens unit G1, after moving toward an image side, moves toward the object side. The second lens unit G2, after moving toward the image side, moves toward the object side. The third lens unit G3 moves toward the object side. The fourth lens unit G4, after moving toward the object side, moves toward the image side. The aperture stop S moves together with the third lens unit G3.

In order from the object side, the first lens unit G1 includes a cemented lens of a negative meniscus lens L1 having a convex surface directed toward the object side and a positive meniscus lens L2 having a convex surface directed toward the object side.

The second lens unit G2 includes a negative meniscus lens L3 having a convex surface directed toward the object side, a biconcave negative lens L4, and a biconvex positive lens L5.

The third lens unit G3 includes a positive meniscus lens L6 having a convex surface directed toward the object side, a positive meniscus lens L7 having a convex surface directed toward the object side, a cemented lens of a positive meniscus lens L8 having a convex surface directed toward the object side and a negative meniscus lens L9 having a convex surface directed toward the object side, and a cemented lens of a biconcave negative lens L10 and a biconvex positive lens L11.

The fourth lens unit G4 includes a positive meniscus lens L12 having a convex surface directed toward the object side.

An aspheric surface is provided to four surfaces namely, both surfaces of the biconcave negative lens L4, both surfaces of the positive meniscus lens L6, an image-side surface of the biconvex positive lens L11, and an object-side surface of the positive meniscus lens L12.

Figure 7A:
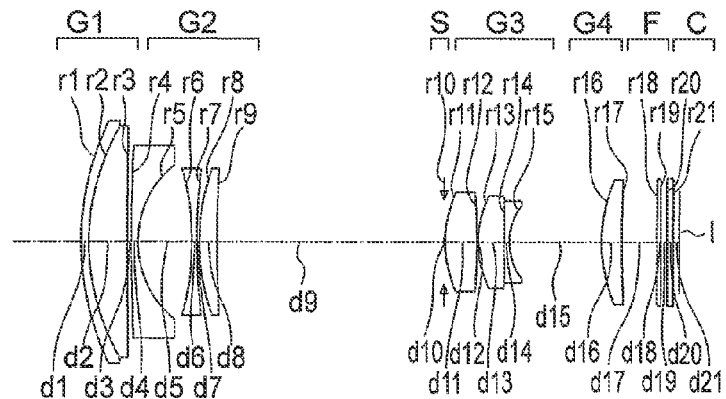
FIG. 7A, FIG. 7B, and FIG. 7C are lens cross-sectional views showing an optical arrangement at the time of infinite object point focusing of a zoom lens according to an example 7 of the present invention, where.
Figure 7B:
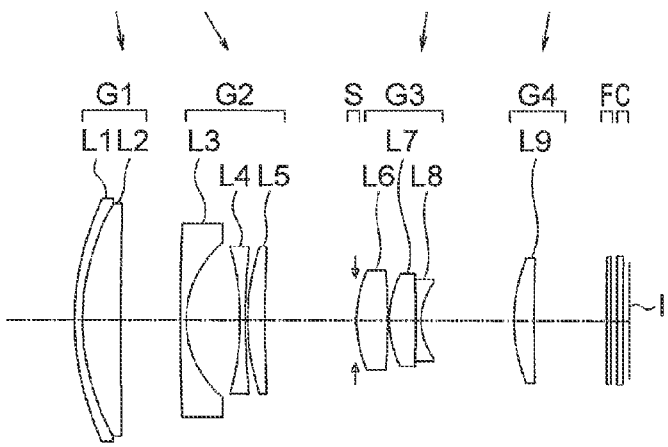
Figure 7C:
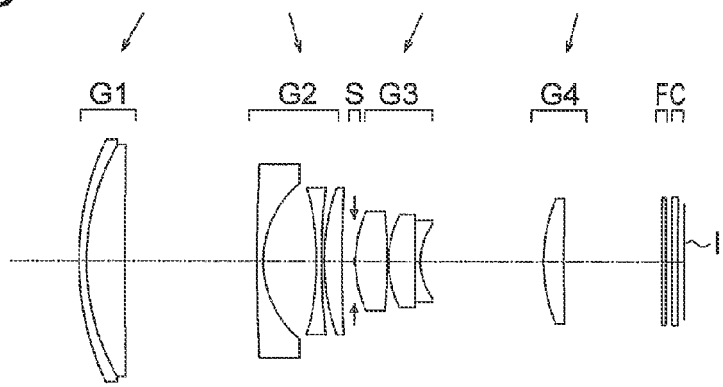

A zoom lens according to the example 7 of the present invention, as shown in FIG. 7A, FIG. 7B, and FIG. 7C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from a wide angle end to a telephoto end, the first lens unit G1, after moving toward an image side, moves toward the object side. The second lens unit G2 moves toward the image side. The third lens unit G3 moves toward the object side. The fourth lens unit G4 moves toward the object side. The aperture stop S moves together with the third lens unit G3.

In order from the object side, the first lens unit G1 includes a cemented lens of a negative meniscus lens L1 having a convex surface directed toward the object side and a positive meniscus lens L2 having a convex surface directed toward the object side.

The second lens unit G2 includes a negative meniscus lens L3 having a convex surface directed toward the object side, a biconcave negative lens L4, and a positive meniscus lens L5 having a convex surface directed toward the object side.

The third lens unit G3 includes a biconvex positive lens L6, and a cemented lens of a biconvex positive lens L7 and a biconcave negative lens L8.

The fourth lens unit G4 includes a positive meniscus lens L9 having a convex surface directed toward the object side.

An aspheric surface is provided to four surfaces namely, a surface on the object side of the biconcave negative lens L4, both surfaces of the biconvex positive lens L6, and a surface on the object side of the positive meniscus lens L9.

Figure 8A:
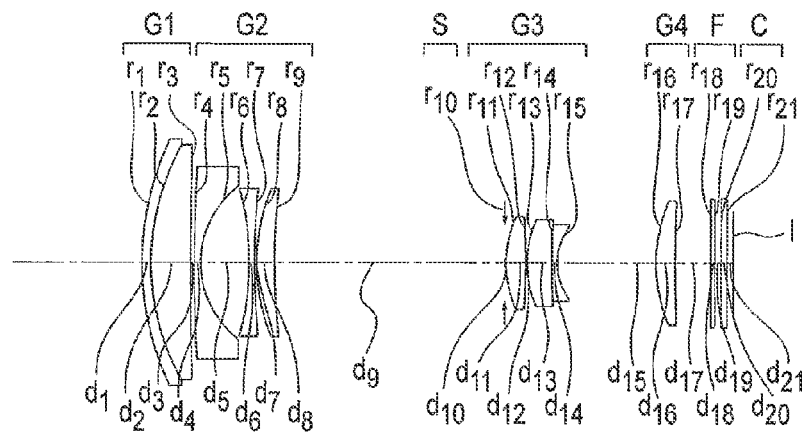
FIG. 8A, FIG. 8B, and FIG. 8C are lens cross-sectional views showing an optical arrangement at the time of infinite object point focusing of a zoom lens according to an example 8 of the present invention, where.
Figure 8B:
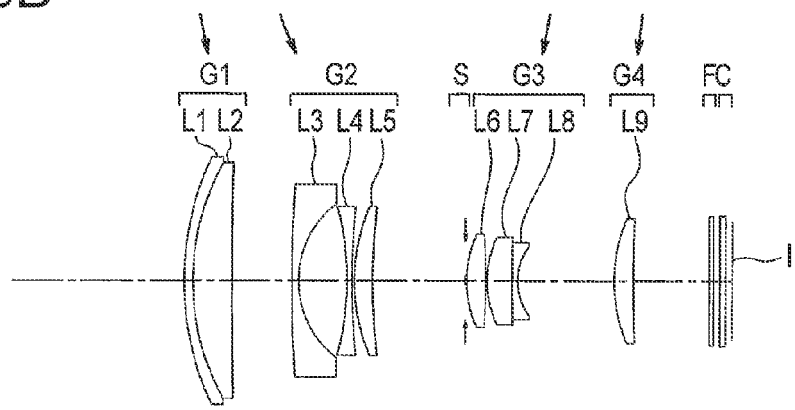
Figure 8C:
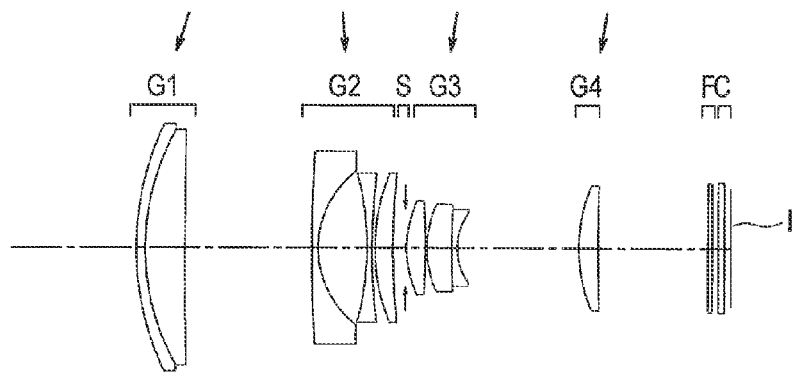

A zoom lens according to the example 8 of the present invention, as shown in FIG. 8A, FIG. 8B, and FIG. 8C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from a wide angle end to a telephoto end, the first lens unit G1, after moving toward an image side, moves toward the object side. The second lens unit G2 moves toward the image side. The third lens unit G3 moves toward the object side. The fourth lens unit G4 moves toward the object side. The aperture stop S moves together with the third lens unit G3.

In order from the object side, the first lens unit G1 includes a cemented lens of a negative meniscus lens L1 having a convex surface directed toward the object side and a positive meniscus lens L2 having a convex surface directed toward the object side.

The second lens unit G2 includes a negative meniscus lens L3 having a convex surface directed toward the object side, a biconcave negative lens L4, and a positive meniscus lens L5 having a convex surface directed toward the object side.

The third lens unit G3 includes a biconvex positive lens L6, and a cemented lens of a positive meniscus lens L7 having a convex surface directed toward the object side and a negative meniscus lens L8 having a convex surface directed toward the object side.

The fourth lens unit G4 includes a positive meniscus lens L9 having a convex surface directed toward the object side.

An aspheric surface is provided to four surfaces namely, a surface on the object side of the biconcave negative lens L4, both surfaces of the biconvex positive lens L6, and a surface on the object side of the positive meniscus lens L9.

Figure 9A:
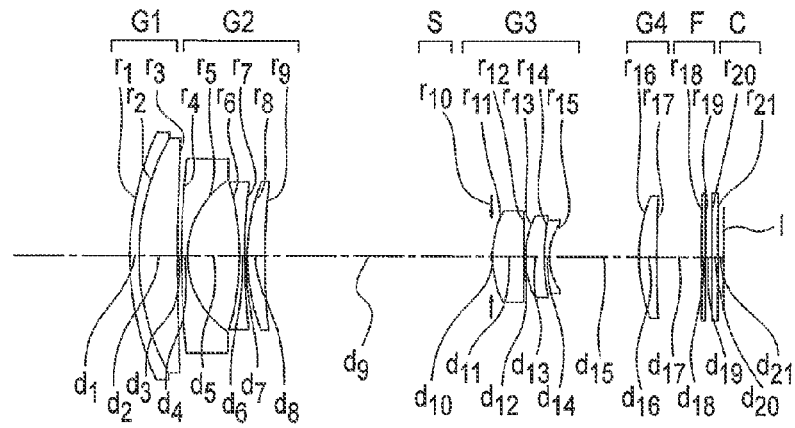
FIG. 9A, FIG. 9B, and FIG. 9C are lens cross-sectional views showing an optical arrangement at the time of infinite object point focusing of a zoom lens according to an example 9 of the present invention, where.
Figure 9B:
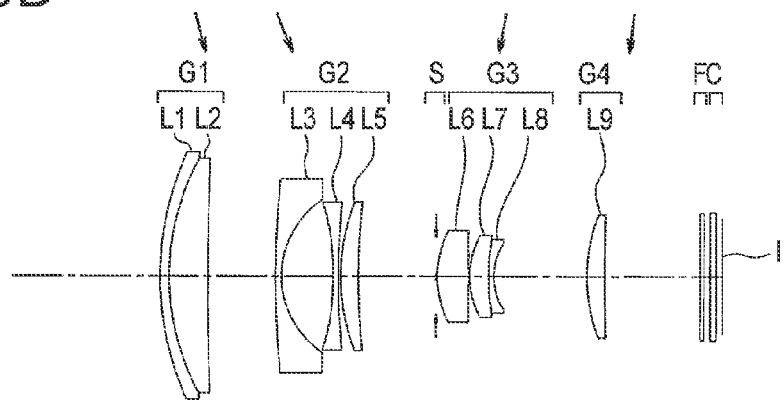
Figure 9C:
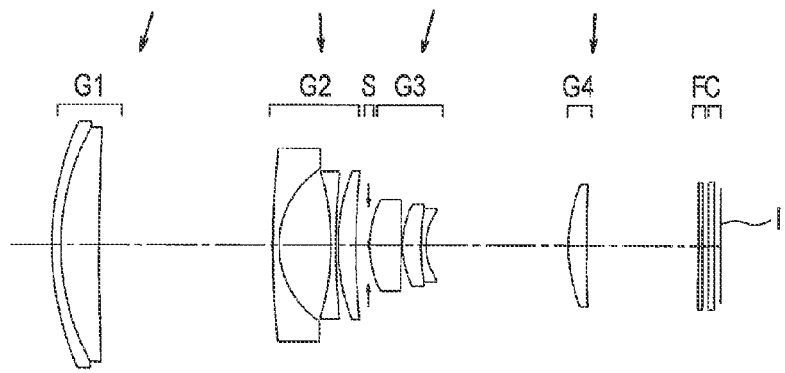

A zoom lens according to the example 9 of the present invention, as shown in FIG. 9A, FIG. 9B, and FIG. 9C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from a wide angle end to a telephoto end, the first lens unit G1, after moving toward an image side, moves toward the object side. The second lens unit G2 moves toward the image side. The third lens unit G3 moves toward the object side. The fourth lens unit G4 moves toward the object side. The aperture stop S moves together with the third lens unit G3.

In order from the object side, the first lens unit G1 includes a cemented lens of a negative meniscus lens L1 having a convex surface directed toward the objet side and a positive meniscus lens L2 having a convex surface directed toward the object side.

The second lens unit G2 includes a negative meniscus lens L3 having a convex surface directed toward the object side, a biconcave negative lens L4, and a positive meniscus lens L5 having a convex surface directed toward the object side.

The third lens unit G3 includes a biconvex positive lens L6, and a cemented lens of a positive meniscus lens L7 having a convex surface directed toward the object side and a negative meniscus lens L8 having a convex surface directed toward the object side.

The fourth lens unit G4 includes a positive meniscus lens L9 having a convex surface directed toward the object side.

An aspheric surface is provided to four surfaces namely, a surface on the object side of the biconcave negative lens L4, both surfaces of the biconvex positive lens L6, and a surface on the object side of the positive meniscus lens L9.

Figure 10A:
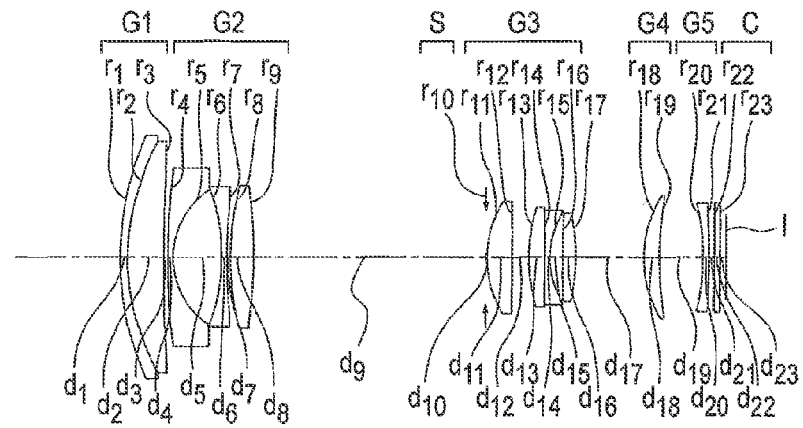
FIG. 10A, FIG. 10B, and FIG. 10C are lens cross-sectional views showing an optical arrangement at the time of infinite object point focusing of a zoom lens according to an example 10 of the present invention, where, 10A shows a state at a wide angle end.
Figure 10B:
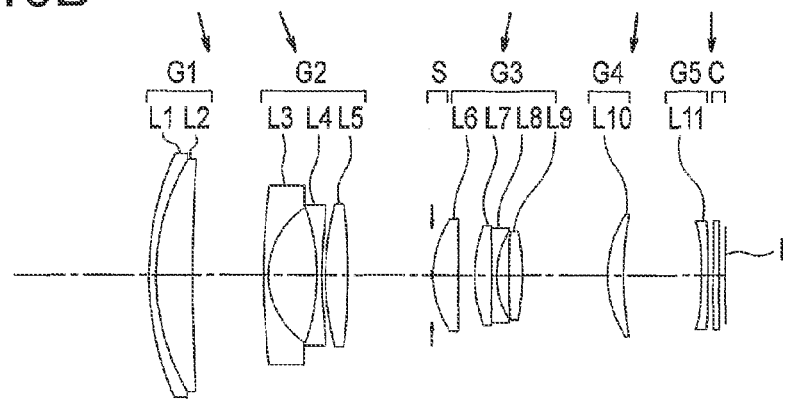
Figure 10C:
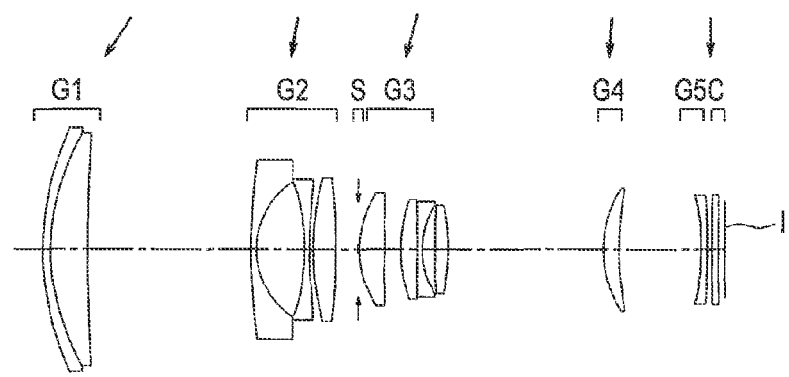

A zoom lens according to the example 10 of the present invention, as shown in FIG. 10A, FIG. 10B, and FIG. 10C includes in order from an object side, a first lens unit G1 having a positive refractive power, a second lens unit G2 having a negative refractive power, an aperture stop S, a third lens unit G3 having a positive refractive power, a fourth lens unit G4 having a positive refractive power, and a fifth lens unit G5 having a negative refractive power.

At the time of zooming from a wide angle end to a telephoto end, the first lens unit G1, after moving toward an image side, moves toward the object side. The second lens unit G2, after moving toward the image side, moves toward the object side. The third lens unit G3 moves toward the object side. The fourth lens unit G4 moves toward the object side. The fifth lens unit G5 is fixed. The aperture stop S moves together with the third lens unit G3.

In order from the object side, the first lens unit G1 includes a cemented lens of a negative meniscus lens L1 having a convex surface directed toward the object side and a positive meniscus lens L2 having a convex surface directed toward the object side.

The second lens unit G2 includes a negative meniscus lens L3 having a convex surface directed toward the object side, a biconcave negative lens L4, and a biconvex positive lens L5.

The third lens unit G3 includes a biconvex positive lens L6, a cemented lens of a biconvex positive lens L7 and a biconcave negative lens L8, and a biconvex positive lens L9.

The fourth lens unit G4 includes a positive meniscus lens L10 having a convex surface directed toward the object side.

The fifth lens unit G5 includes a negative meniscus lens L11 having a convex surface directed toward the object side.

An aspheric surface is provided to seven surfaces namely, both surfaces of the biconcave negative lens L4, both surfaces of the biconvex positive lens L6, a surface on the object side of the biconvex positive lens L9, an image-side surface of the biconvex positive lens L10, and an object-side surface of the negative meniscus lens L11.

Figure 11A:
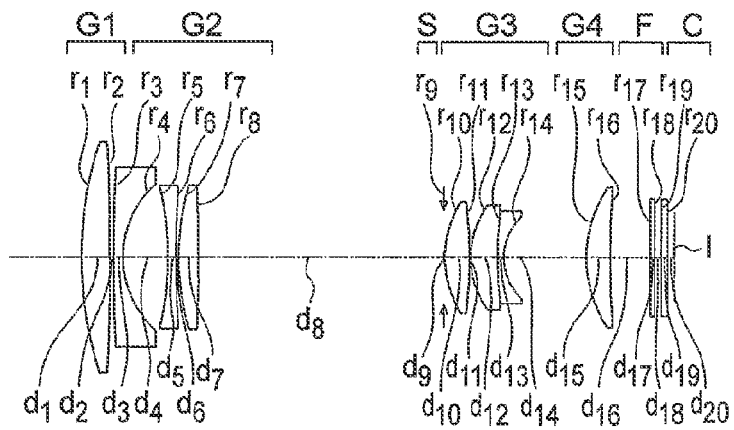
FIG. 11A, FIG. 11B, and FIG. 11C are lens cross-sectional views showing an optical arrangement at the time of infinite object point focusing of a zoom lens according to an example 11 of the present invention, where.
Figure 11B:
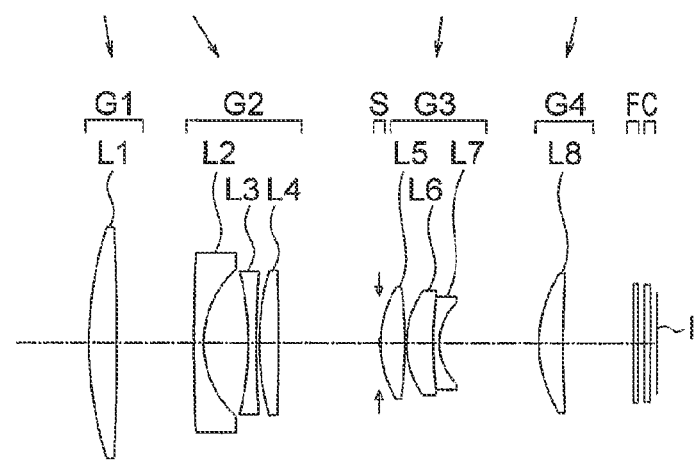
Figure 11C:
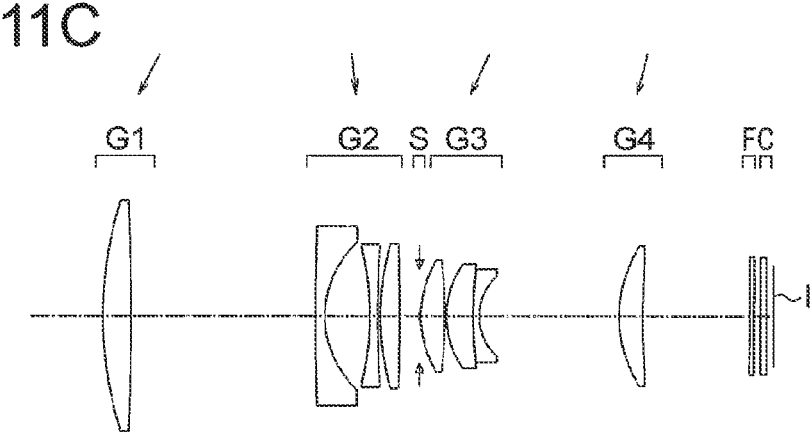

A zoom lens according to the example 11 of the present invention, as shown in FIG. 11A, FIG. 11B, and FIG. 11C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from a wide angle end to a telephoto end, the first lens unit G1, after moving toward an image side, moves toward the object side. The second lens unit G2 moves toward an image side. The third lens unit G3 moves toward the object side. The fourth lens unit G4 moves toward the object side. The aperture stop S moves together with the third lens unit G3.

In order from the object side, the first lens unit G1 includes a biconvex positive lens L1.

The second lens unit G2 includes a negative meniscus lens L2 having a convex surface directed toward the object side, a biconcave negative lens L3, and a biconvex positive lens L4.

The third lens unit G3 includes a biconvex positive lens L5 (a first lens component), a cemented lens of a positive meniscus lens L6 having a convex surface directed toward the object side and a negative meniscus lens L7 having a convex surface directed toward the object side (a second lens component).

The fourth lens unit G4 includes a positive meniscus lens L8 having a convex surface directed toward the object side.

An aspheric surface is provided to three surfaces namely, both surfaces of the biconvex positive lens L5, an object-side surface of the positive meniscus lens L8.

Figure 12A:
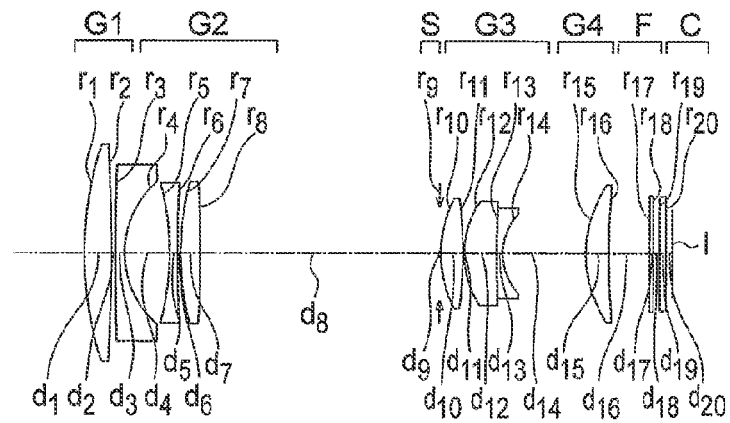
FIG. 12A, FIG. 12B, and FIG. 12C are lens cross-sectional views showing an optical arrangement at the time of infinite object point focusing of a zoom lens according to an example 12 of the present invention, where.
Figure 12B:
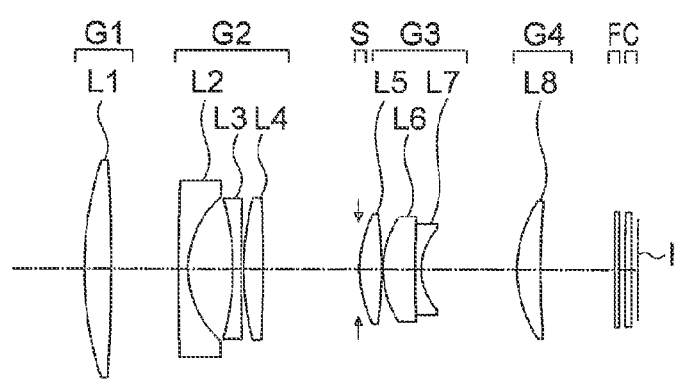
Figure 12C:
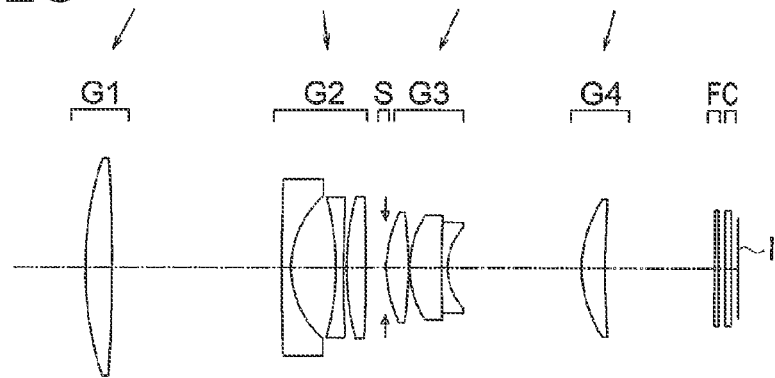

A zoom lens according to the example 12 of the present invention, as shown in FIG. 12A, FIG. 12B, and FIG. 12C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from a wide angle end to a telephoto end, the first lens unit G1, after moving toward an image side, moves toward the object side. The second lens unit G2 moves toward the image side. The third lens unit G3 moves toward the object side. The fourth lens unit G4 moves toward the object side. The aperture stop S moves together with the third lens unit G3.

In order from the object side, the first lens unit G1 includes a biconvex positive lens L1.

The second lens unit G2 includes a negative meniscus lens L2 having a convex surface directed toward the object side, a biconcave negative lens L3, and a biconvex positive lens L4.

The third lens unit G3 includes a biconvex positive lens L5 (a first lens component), a cemented lens (a second lens component) of a positive meniscus lens L6 having a convex surface directed toward the object side and a negative meniscus lens L7 having a convex surface directed toward the object side.

The fourth lens unit G4 includes a positive meniscus lens L8 having a convex surface directed toward the object side.

An aspheric surface is provided to three surfaces namely, both surfaces of the biconvex positive lens L5, an object-side surface of the positive meniscus lens L8.

Figure 13A:
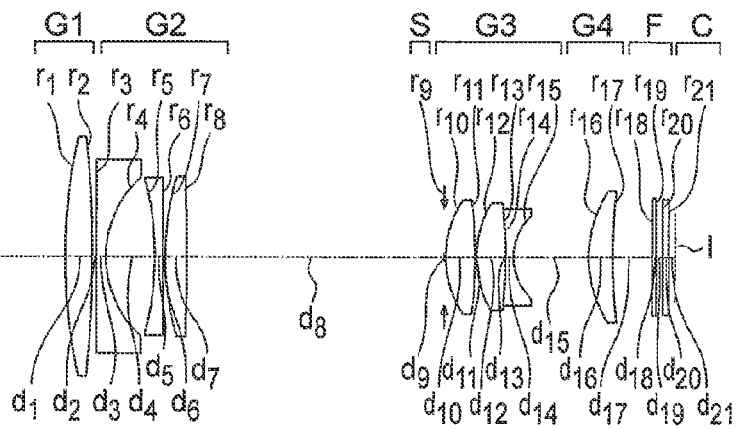
FIG. 13A, FIG. 13B, and FIG. 13C are lens cross-sectional views showing an optical arrangement at the time of infinite object point focusing of a zoom lens according to an example 13 of the present invention, where.
Figure 13B:
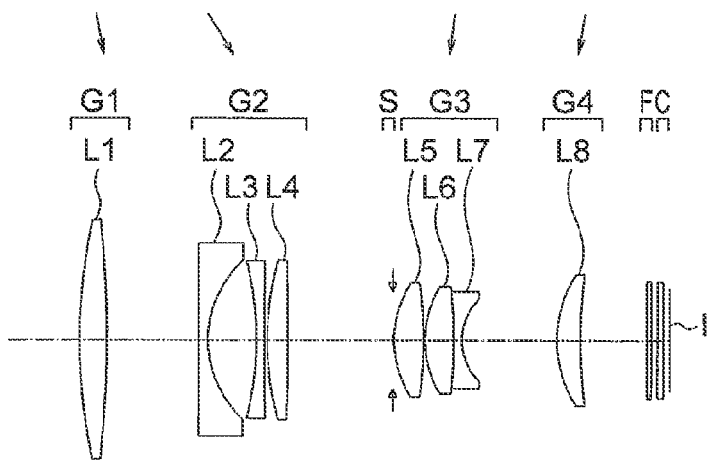
Figure 13C:
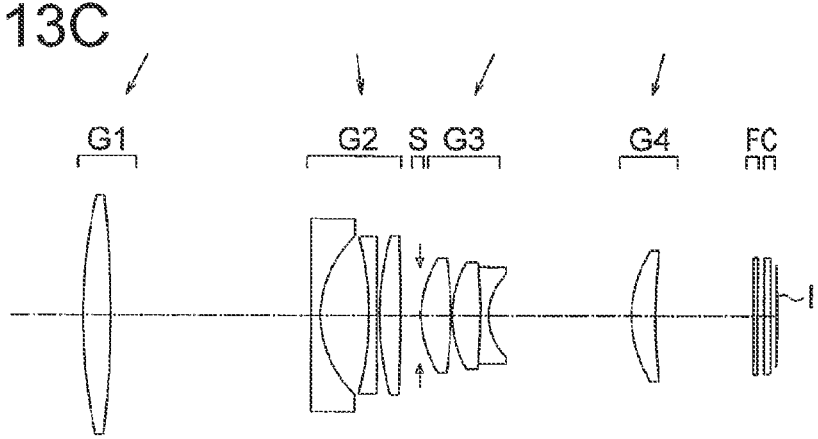

A zoom lens according to the example 13 of the present invention, as shown in FIG. 13A, FIG. 13B, and FIG. 13C, includes in order from an object side, a first lens unit G1 having a positive refractive power, a second lens unit G2 having a negative refractive power, an aperture stop S, a third lens unit G3 having a positive refractive power, and fourth lens unit G4 having a positive refractive power.

At the time of zooming from a wide angle end to a telephoto end, the first lens unit G1, after moving toward an image side, moves toward the object side. The second lens unit G2 moves toward the image side. The third lens unit G3 moves toward the object side. The fourth lens unit G4 moves toward the object side. The aperture stop S moves together with the third lens unit G3.

In order from the object side, the first lens unit G1 includes a biconvex positive lens L1.

The second lens unit G2 includes a biconcave negative lens L2, a biconcave negative lens L3 and a biconvex positive lens L4.

The third lens unit G3 includes a biconvex positive lens L5 (a first lens component), and a cemented lens (a second lens component) of a biconvex positive lens L6 and a biconcave negative lens L7.

The fourth lens unit G4 includes a positive meniscus lens L8 having a convex surface directed toward the object side.

In the example 13, from the 13th surface to 14th surface is a cemented surface.

An aspheric surface is provided to three surfaces namely, both surfaces of the biconvex positive lens L5, and an object-side surface of the positive meniscus lens L8.

Figure 14A:
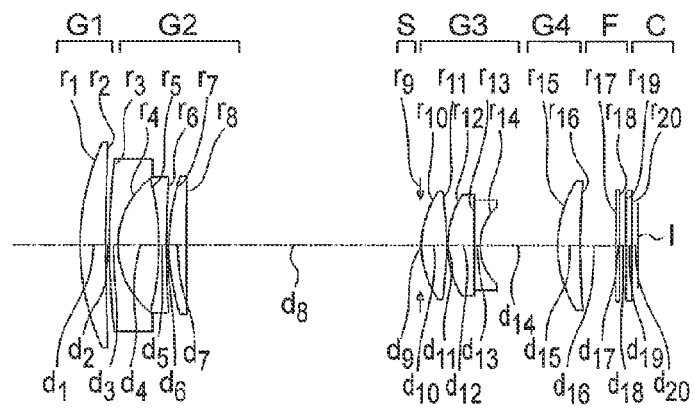
FIG. 14A, FIG. 14B, and FIG. 14C are lens cross-sectional views showing an optical arrangement at the time of infinite object point focusing of a zoom lens according to an example 14 of the present invention, where.
Figure 14B:
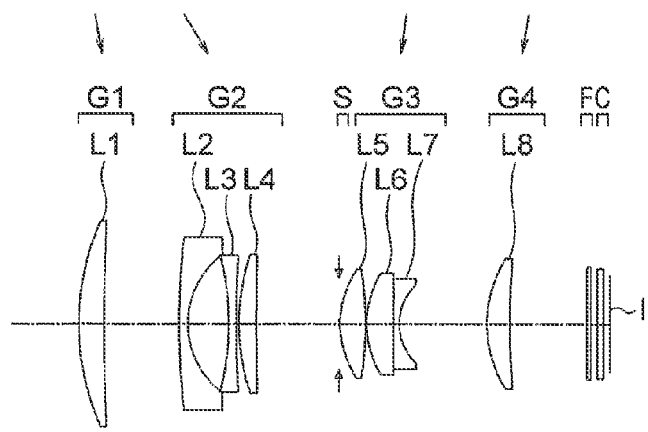
Figure 14C:
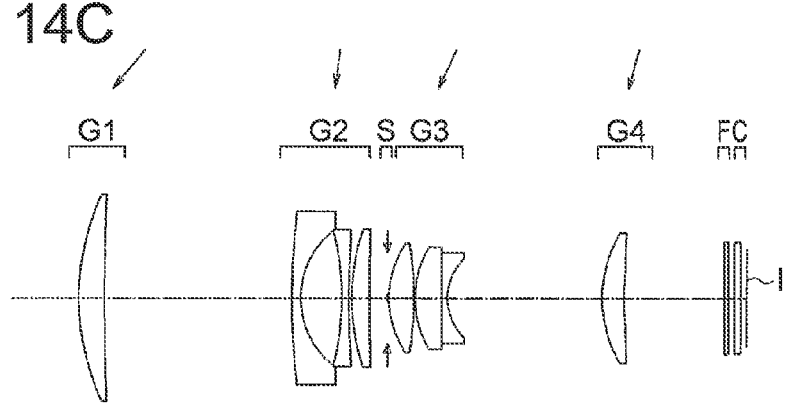

A zoom lens according to the example 14 of the present invention, as shown in FIG. 14A, FIG. 14B, and FIG. 14C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from a wide angle end to a telephoto end, the first lens unit G1, after moving toward an image side, moves toward the object side. The second lens unit G2, after moving toward an image side, moves toward the object side. The third lens unit G3 moves toward the object side. The fourth lens unit G4 moves toward the object side. The aperture stop S moves together with the third lens unit G3.

In order from the object side, the first lens unit G1 includes a positive meniscus lens L1 having a convex surface directed toward the object side.

The second lens unit G2 includes a negative meniscus lens L2 having a convex surface directed toward the object side, a biconcave negative lens L3 and a biconvex positive lens L4 having a convex surface directed toward the object side.

The third lens unit G3 includes a biconvex positive lens L5 (a first lens component), a cemented lens (a second lens component) of a positive meniscus lens L6 having a convex surface directed toward the object side and a negative meniscus lens L7 having a convex surface directed toward the object side.

The fourth lens unit G4 includes a positive meniscus lens L8 having a convex surface directed toward the object side.

An aspheric surface is provided to four surfaces namely, both surfaces of the biconvex positive lens L6, an image-side surface of the positive meniscus lens L9, and an object-side surface of the positive meniscus lens L10.

Figure 15A:
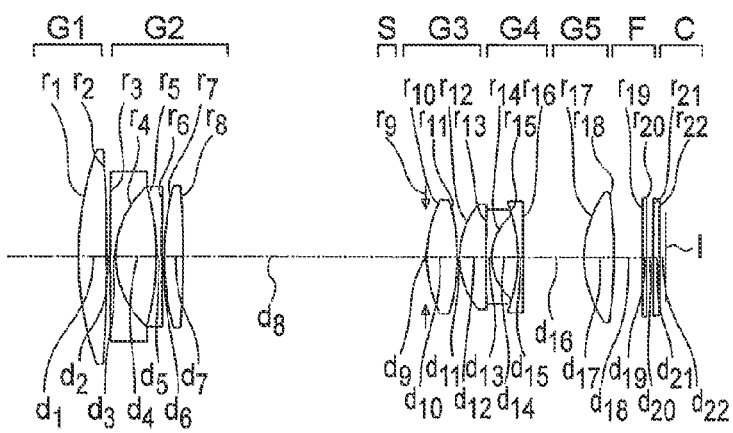
FIG. 15A, FIG. 15B, and FIG. 15C are lens cross-sectional views showing an optical arrangement at the time of infinite object point focusing of a zoom lens according to an example 15 of the present invention, where.
Figure 15B:
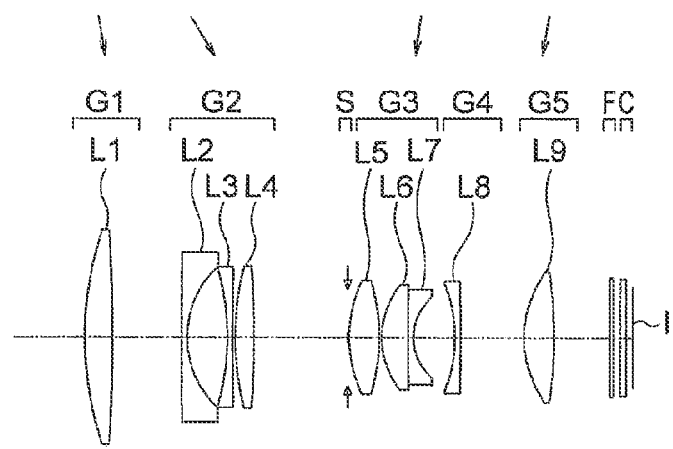
Figure 15C:
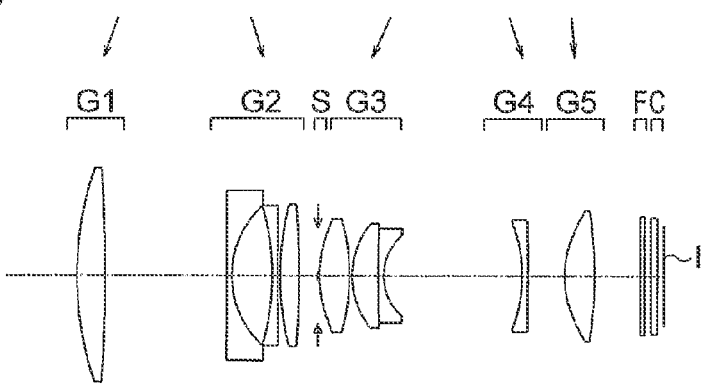

A zoom lens according to the example 15 of the present invention, as shown in FIG. 15A, FIG. 15B, and FIG. 15C, includes in order from an object side, a first lens unit G1 having a positive refractive power, a second lens unit G2 having a negative refractive power, an aperture stop S, a third lens unit G3 having a positive refractive power, a fourth lens unit G4 having a negative refractive power and a fifth lens unit G5 having a positive refractive power.

At the time of zooming from a wide angle end to a telephoto end, the first lens unit G1, after moving toward an image side, moves toward the object side. The second lens unit G2 moves toward an image side. The third lens unit G3 moves toward the object side. The fourth lens unit G4, after moving toward an object side, moves toward the image side. The fifth lens unit G5, after moving toward an object side, moves toward the image side.

In order from the object side, the first lens unit G1 includes a biconvex positive lens L1.

The second lens unit G2 includes a negative meniscus lens L2 having a convex surface directed toward the object side, a biconcave negative lens L3, and a biconvex positive lens L4.

The third lens unit G3 includes a biconvex positive lens L5 (a first lens component) and a cemented lens (a second lens component) of a positive meniscus lens L6 having a convex surface directed toward the object side and a negative meniscus lens L7 having a convex surface directed toward the object side.

The fourth lens unit G4 includes a negative meniscus lens L8 having a convex surface directed toward the object side.

The fifth lens unit G5 includes a biconvex positive lens L9.

An aspheric surface is provided to four surfaces namely, both surfaces of the biconvex positive lens L5, an object-side surface of the negative meniscus lens L8 and an object-side surface of the biconvex positive lens L9.

Figure 16A:
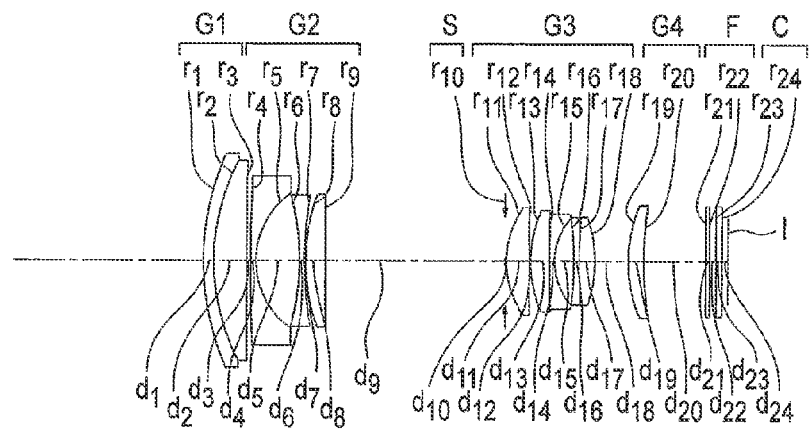
FIG. 16A, FIG. 16B, and FIG. 16C are lens cross-sectional views showing an optical arrangement at the time of infinite object point focusing of a zoom lens according to an example 16 of the present invention, where.
Figure 16B:
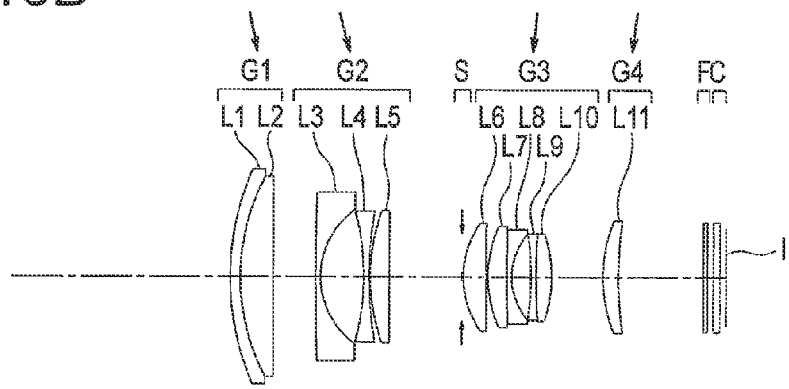
Figure 16C:
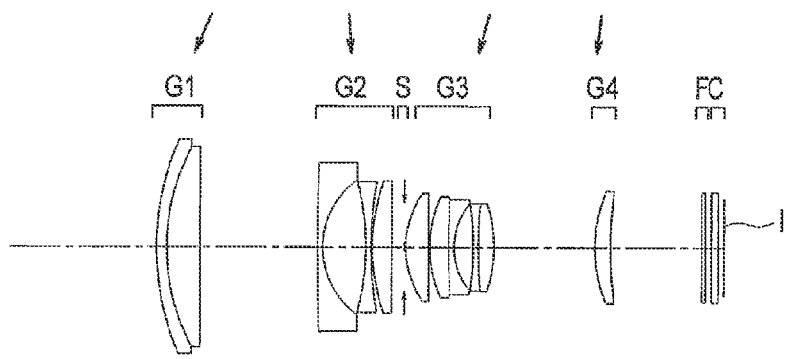

A zoom lens according to the example 16 of the present invention, as shown in FIG. 16A, FIG. 16B, and FIG. 16C, includes in order from an object side, a first lens unit G1 having a positive refractive power, a second lens unit G2 having a negative refractive power, an aperture stop S, a third lens unit G3 having a positive refractive power, a fourth lens unit G4 having a positive refractive power.

At the time of zooming from a wide angle end to a telephoto end, the first lens unit G1, after moving toward an image side, moves toward the object side. The second lens unit G2, after moving toward the image side, is substantially fixed. The third lens unit G3 moves toward the object side. The fourth lens unit G4 moves toward the object side. The aperture stop moves together with the third lens unit G3.

In order from the object side, the first lens unit G1 includes a cemented lens of a negative meniscus lens L1 having a convex surface directed toward the object side and a positive meniscus lens L2 having a convex surface directed toward the object side.

The second lens unit G2 includes a negative meniscus lens L3 having a convex surface directed toward the object side, a biconcave negative lens L4, and a biconvex positive lens L5.

The third lens unit G3 includes a biconvex positive lens L6, a cemented lens of a positive meniscus lens L7 having a convex surface directed toward the object side and a negative meniscus lens L8 having a convex surface directed toward the object side, and a cemented lens of a biconcave negative lens L9 and a biconvex positive lens L10.

The fourth lens unit G4 includes a positive meniscus lens L11 having a convex surface directed toward the object side.

An aspheric surface is provided to four surfaces namely, both surfaces of the biconvex positive lens L6, an image-side surface of the biconvex positive lens L10, an object-side surface of the positive meniscus lens L11.

Figure 17A:
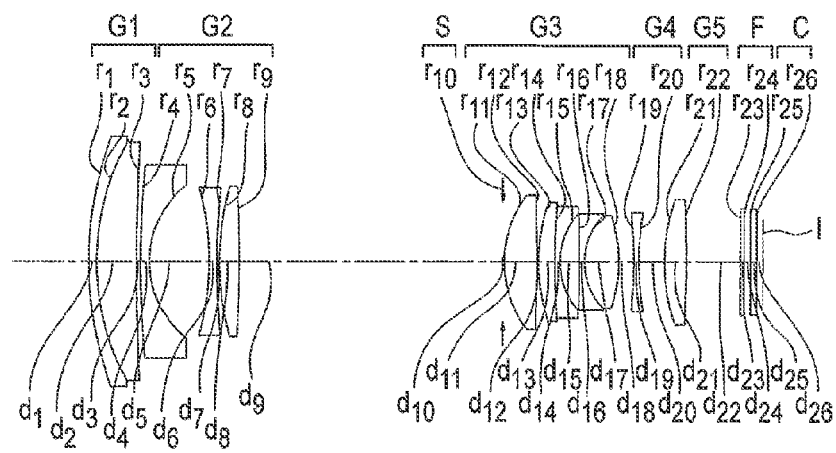
FIG. 17A, FIG. 17B, and FIG. 17C are lens-cross sectional views showing an optical arrangement at the time of infinite object point focusing of a zoom lens according to an example 17 of the present invention, where.
Figure 17B:
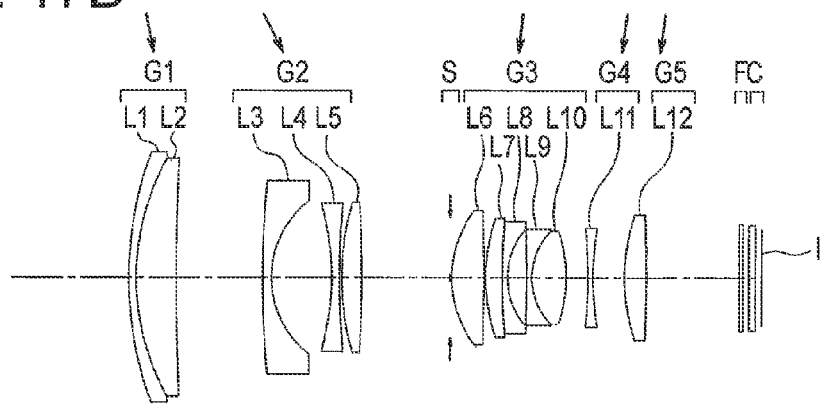
Figure 17C:
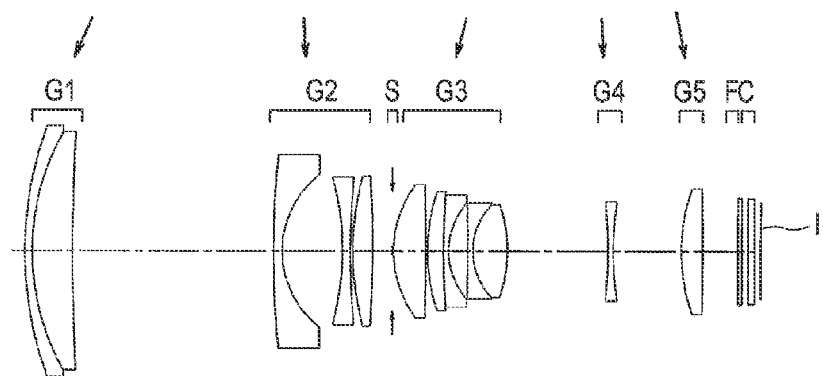
Figures 22A, 22B, 22C, 22D:
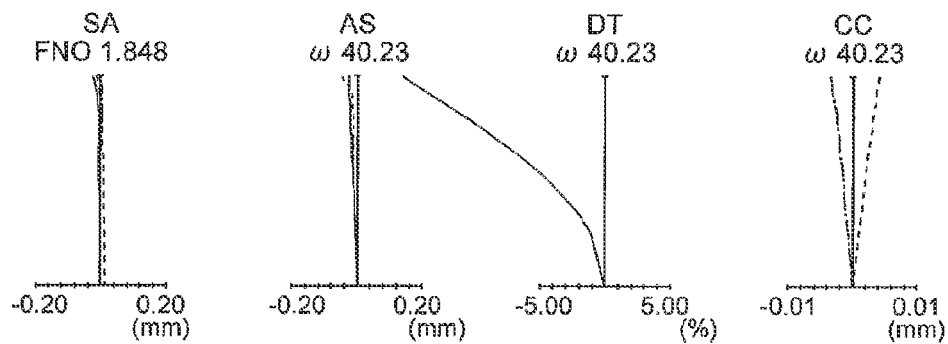
FIG. 22A, FIG. 22B, FIG. 22C, FIG. 22D, FIG. 22E, FIG. 22F, FIG. 22G, FIG. 22H, FIG. 22I, FIG. 22J, FIG. 22K, and FIG. 22L are aberration diagrams at the time of infinite object point focusing of the example 5.
Figures 22E, 22F, 22G, 22H:
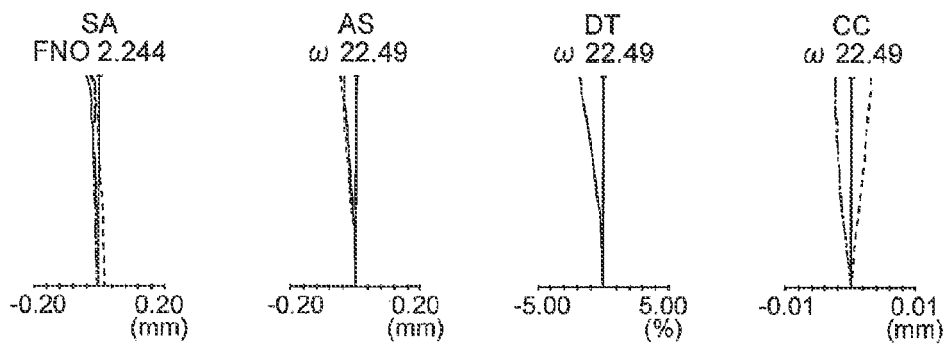
Figures 22I, 22J, 22K, 22L:
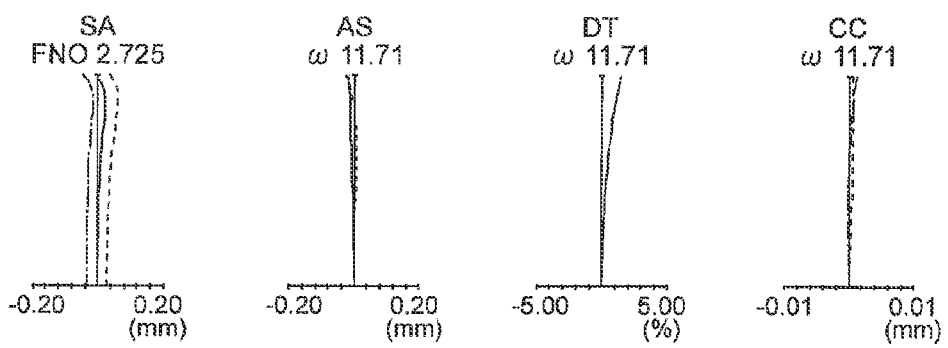
Figures 23A, 23B, 23C, 23D:
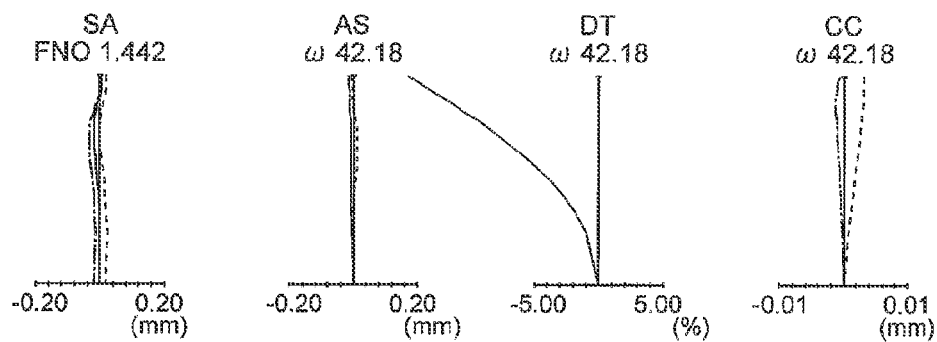
FIG. 23A, FIG. 23B, FIG. 23C, FIG. 23D, FIG. 23E, FIG. 23F, FIG. 23G, FIG. 23H, FIG. 23I, FIG. 23J, FIG. 23K, and FIG. 23L are aberration diagrams at the time of infinite object point focusing of the example 6.
Figures 23E, 23F, 23G, 23H:
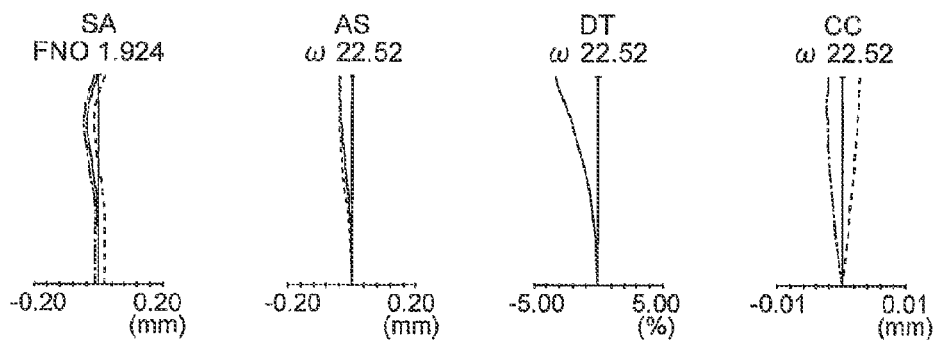
Figures 23I, 23J, 23K, 23L:
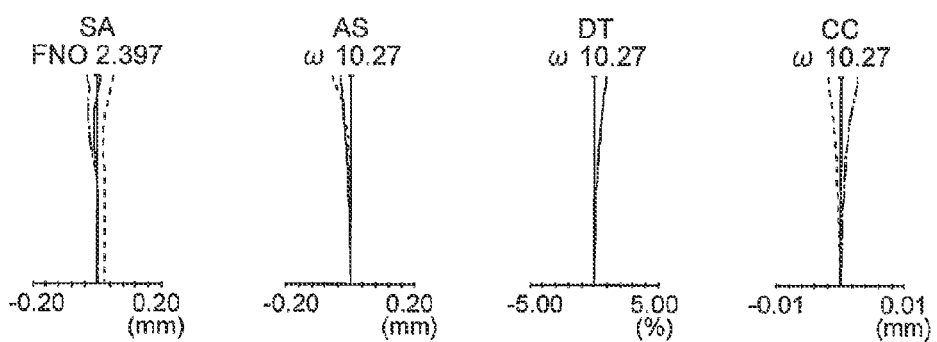
Figures 25A, 25B, 25C, 25D:
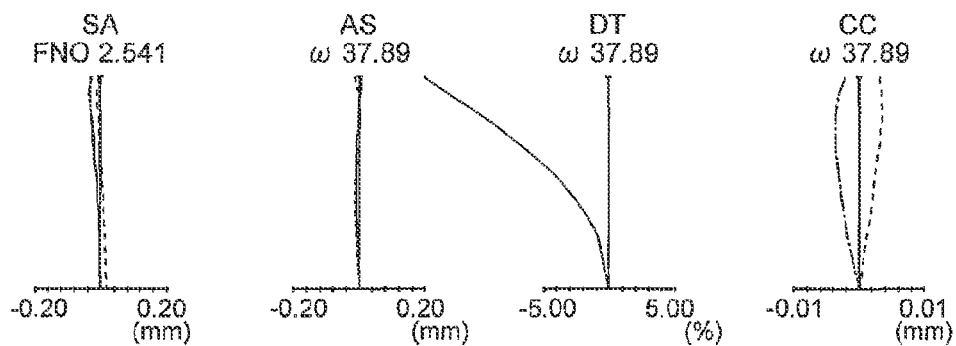
FIG. 25A, FIG. 25B, FIG. 25C, FIG. 25D, FIG. 25E, FIG. 25F, FIG. 25G, FIG. 25H, FIG. 25I, FIG. 25J, FIG. 25K, and FIG. 25L are aberration diagrams at the time of infinite object point focusing of the example 8.
Figures 25E, 25F, 25G, 25H:
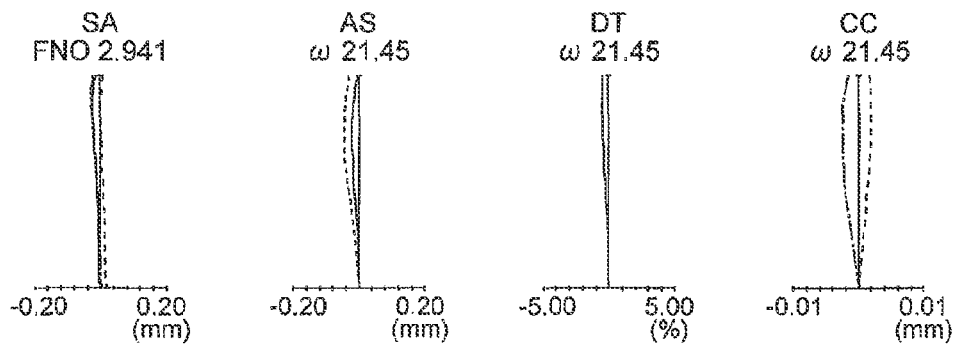
Figures 25I, 25J, 25K, 25L:
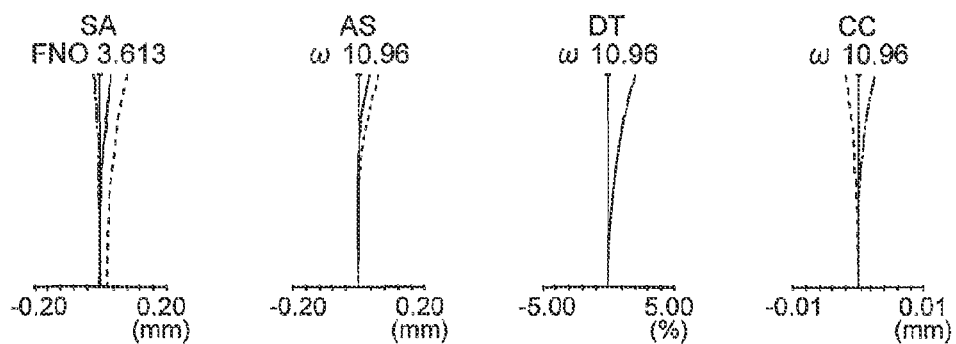

A zoom lens according to the example 17 of the present invention, as shown in FIG. 17A, FIG. 17B, and FIG. 17C, includes in order from an object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

At the time of zooming from a wide angle end to a telephoto end, the first lens unit G1, after moving toward an image side, moves toward the object side. The second lens unit G2, after moving toward the image side, is substantially fixed. The third lens unit G3 moves toward the object side. The fourth lens unit G4, after moving toward the object side, moves toward the image side. The fifth lens unit G5, after moving toward the object side, moves toward the image side. The aperture stop S moves together with the third lens unit G3.

In order from the object side, the first lens unit G1 includes a cemented lens of a negative meniscus lens L1 having a convex surface directed toward the object side and a positive meniscus lens L2 having a convex surface directed toward the object side.

The second lens unit G2 includes a negative meniscus lens L3 having a convex surface directed toward the object side, a biconcave negative lens L4, and a biconvex positive lens L5.

The third lens unit G3 includes a biconvex positive lens L6, a cemented lens of a positive meniscus lens L7 having a convex surface directed toward the object side and a negative meniscus lens L8 having a convex surface directed toward the object side, and a cemented lens of a biconcave negative lens L9 and a biconvex positive lens L10.

The fourth lens unit G4 includes a biconcave negative lens L11.

The fifth lens unit G5 includes a biconvex positive lens L12.

An aspheric surface is provided to five surfaces namely, both surfaces of the biconvex positive lens L6, an image-side surface of the biconvex positive lens L10, an image-side surface of the biconcave negative lens L11, and an object-side surface of the biconvex positive lens L12.

Numerical data of each example described above is shown below. Apart from symbols described above, fb denotes back focus, f1, f2 ... denotes a focal length of each lens unit, $F_{NO}$ denotes an F number, ω denotes a half angle of field, each of r denotes radius of curvature of each lens surface, each of d denotes a distance between two lenses, each of nd denotes a refractive index of each lens for a d-line, each of vd denotes an Abbe constant for each lens. Further, * denotes an aspheric data, The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When Z is let to be an optical axis with a direction of traveling of light as a positive (direction), and y is let to be in a direction orthogonal to the optical axis, a shape of the aspheric surface is described by the following expression.

$$Z=(y^2/r)/[1+\{1-(K+1)(y/r)^2\}^{1/2}]+A4y^4+A6y^6+A8y^8+A10y^{10}+A12y^{12}$$

where, r denotes a paraxial radius of curvature, K denotes a conical coefficient, A4, A6, A8, A10, and A12 denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Example 1

Unit mm

Surface data

| Surface no. | r | d | nd | vd |
|---|---|---|---|---|
| Object plane | ∞ | ∞ | | |
| 1 | 23.767 | 0.60 | 1.94595 | 17.98 |
| 2 | 18.379 | 0.01 | 1.56384 | 60.67 |
| 3 | 18.379 | 2.79 | 1.80400 | 46.58 |
| 4 | 162.345 | Variable | | |
| 5 | 86.970 | 0.40 | 1.91082 | 35.25 |
| 6 | 6.745 | 3.73 | | |
| 7* | −27.629 | 0.40 | 1.80610 | 40.88 |
| 8* | 23.484 | 0.49 | | |
| 9 | 19.296 | 1.80 | 1.94595 | 17.98 |
| 10 | −82.786 | Variable | | |
| 11 (stop) | ∞ | 0.10 | | |
| 12* | 8.464 | 2.06 | 1.74320 | 49.29 |
| 13* | 366.703 | 0.89 | | |
| 14 | 10.086 | 1.84 | 1.74320 | 49.34 |
| 15 | 103.649 | 0.40 | 1.80810 | 22.76 |
| 16 | 5.864 | 1.02 | | |
| 17 | 40.235 | 1.09 | 1.49700 | 81.54 |
| 18* | −23.177 | Variable | | |
| 19* | 10.855 | 1.45 | 1.53071 | 55.69 |
| 20 | 47.619 | Variable | | |
| 21 | ∞ | 0.30 | 1.51633 | 64.14 |
| 22 | ∞ | 0.40 | | |
| 23 | ∞ | 0.50 | 1.51633 | 64.14 |
| 24 | ∞ | 0.53 | | |
| Image plane (Image pickup surface) | ∞ | | | |

Aspherical surface data

7th surface

K = 0.000
A4 = −5.35819e−05, A6 = 1.60135e−06, A8 = −3.41455e−08

8th surface

K = 0.000
A4 = −1.10676e−04, A6 = 1.28240e−06, A8 = −5.21188e−08

12th surface

K = 0.000
A4 = −1.02456e−04, A6 = −2.69926e−06, A8 = 1.12185e−07, A10 = −5.00000e−09, A12 = −1.00000e−10

13th surface

K = 0.000
A4 = 1.05785e−04, A6 = −1.68222e−06, A8 = 9.33808e−08, A10 = −8.24415e−09

18th surface

K = 0.000
A4 = −2.39779e−05, A6 = −1.15333e−06, A8 = 4.59298e−07

19th surface

K = 0.000
A4 = −1.18432e−04, A6 = 2.82205e−07, A8 = 9.00876e−09

Zoom data

| | Wide angle | Intermediate | Telephoto |
|---|---|---|---|
| Focal length | 4.79 | 10.00 | 23.00 |
| Fno. | 1.85 | 2.22 | 2.83 |
| Angle of field 2ω | 78.25 | 42.71 | 18.75 |
| fb (in air) | 6.51 | 8.97 | 9.95 |
| Lens total length (in air) | 48.66 | 45.67 | 53.33 |
| d4 | 0.30 | 5.14 | 12.79 |
| d10 | 19.38 | 7.81 | 1.80 |
| d18 | 3.40 | 4.69 | 9.73 |
| d20 | 5.03 | 7.48 | 8.48 |

Unit focal length

| f1 = 36.33 | f2 = −8.35 | f3 = 12.84 | f4 = 26.13 |
|---|---|---|---|

Example 2

Unit mm

Surface data

| Surface no. | r | d | nd | vd |
|---|---|---|---|---|
| Object plane | ∞ | ∞ | | |
| 1 | 24.131 | 0.65 | 1.94595 | 17.98 |
| 2 | 18.303 | 2.45 | 1.83481 | 42.71 |
| 3 | 103.980 | Variable | | |
| 4 | 48.744 | 0.40 | 1.91082 | 35.25 |
| 5 | 6.739 | 3.85 | | |
| 6 | −19.902 | 0.40 | 1.91082 | 35.25 |
| 7 | 33.143 | 0.10 | | |
| 8 | 17.537 | 1.80 | 1.94595 | 17.98 |
| 9 | −64.614 | Variable | | |
| 10 (stop) | ∞ | 0.10 | | |
| 11* | 7.700 | 2.37 | 1.74320 | 49.34 |
| 12* | −56.358 | 0.10 | | |
| 13 | 13.167 | 2.09 | 1.71999 | 50.23 |
| 14 | −19.231 | 0.40 | 1.76182 | 26.52 |
| 15 | 5.673 | 1.55 | | |
| 16 | −83.333 | 0.85 | 1.49700 | 81.54 |
| 17* | −17.125 | Variable | | |
| 18* | 11.423 | 1.50 | 1.52542 | 55.78 |
| 19 | 47.619 | Variable | | |
| 20 | ∞ | 0.30 | 1.51633 | 64.14 |
| 21 | ∞ | 0.50 | | |
| 22 | ∞ | 0.50 | 1.51633 | 64.14 |
| 23 | ∞ | 0.50 | | |
| Image plane (Image pickup surface) | ∞ | | | |

-continued

| Unit mm |
|---|
| Aspherical surface data |

11th surface

K = 0.000
A4 = −1.27878e−04, A6 = −2.89838e−06, A8 = 1.98668e−08
12th surface

K = 0.000
A4 = 2.56500e−04, A6 = −5.47367e−06, A8 = 1.01305e−07
17th surface

K = 0.000
A4 = −6.63319e−05, A6 = 6.86659e−06, A8 = 7.38835e−07
18th surface

K = 0.000
A4 = −7.92162e−05, A6 = 9.75416e−07

| Zoom data | | | |
|---|---|---|---|
| | Wide angle | Intermediate | Telephoto |
| Focal length | 5.04 | 10.70 | 24.20 |
| Fno. | 1.85 | 2.24 | 2.85 |
| Angle of field 2ω | 75.22 | 40.42 | 18.14 |
| fb (in air) | 6.26 | 9.21 | 11.86 |
| Lens total length (in air) | 48.39 | 45.98 | 53.31 |
| d3 | 0.30 | 5.57 | 12.98 |
| d9 | 19.72 | 8.15 | 1.80 |
| d17 | 3.50 | 4.44 | 8.05 |
| d19 | 4.70 | 7.68 | 10.34 |

| Unit focal length | | | |
|---|---|---|---|
| f1 = 39.00 | f2 = −8.50 | f3 = 12.60 | f4 = 28.20 |

Example 3

| Unit mm | | | | |
|---|---|---|---|---|
| Surface data | | | | |
| Surface no. | r | d | nd | vd |
| Object plane | ∞ | ∞ | | |
| 1 | 25.660 | 0.60 | 1.94595 | 17.98 |
| 2 | 19.604 | 2.76 | 1.80400 | 46.57 |
| 3 | 250.000 | Variable | | |
| 4 | 58.125 | 0.40 | 1.91082 | 35.25 |
| 5 | 6.699 | 3.84 | | |
| 6* | −21.122 | 0.40 | 1.80610 | 40.88 |
| 7* | 23.022 | 0.34 | | |
| 8 | 17.315 | 1.69 | 1.94595 | 17.98 |
| 9 | −98.092 | Variable | | |
| 10 (stop) | ∞ | 0.10 | | |
| 11* | 8.731 | 1.68 | 1.74320 | 49.34 |
| 12* | 246.865 | 0.79 | | |
| 13 | 8.537 | 2.00 | 1.74320 | 49.34 |
| 14 | 63.403 | 0.40 | 1.80810 | 22.76 |
| 15 | 5.608 | 1.18 | | |
| 16 | 49.163 | 0.96 | 1.49700 | 81.54 |
| 17* | −20.321 | Variable | | |
| 18* | 11.313 | 1.35 | 1.52542 | 55.78 |
| 19 | 45.455 | Variable | | |
| 20 | ∞ | 0.30 | 1.51633 | 64.14 |
| 21 | ∞ | 0.50 | | |
| 22 | ∞ | 0.50 | 1.51633 | 64.14 |
| 23 | ∞ | 0.50 | | |
| Image plane (Image pickup surface) | ∞ | | | |

-continued

| Unit mm |
|---|
| Aspherical surface data |

6th surface

K = 0.000
A4 = −5.93545e−05, A6 = 2.86778e−07, A8 = −2.74981e−08
7th surface

K = 0.000
A4 = −6.00000e−05
11th surface

K = 0.000
A4 = −1.86680e−05, A6 = −5.50076e−06, A8 = 2.53509e−07
12th surface

K = 0.000
A4 = 1.79442e−04, A6 = −5.24506e−06, A8 = 2.66353e−07
17th surface

K = 0.000
A4 = 3.58709e−05, A6 = 1.71231e−06, A8 = 3.87569e−07
18th surface

A4 = −1.28657e−04, A6 = 5.07538e−07

| Zoom data | | | |
|---|---|---|---|
| | Wide angle | Intermediate | Telephoto |
| Focal length | 4.73 | 10.00 | 22.74 |
| Fno. | 1.85 | 2.25 | 2.85 |
| Angle of field 2ω | 78.86 | 42.36 | 18.81 |
| fb (in air) | 6.20 | 8.64 | 9.79 |
| Lens total length (in air) | 46.26 | 44.56 | 52.79 |
| d3 | 0.30 | 5.30 | 13.06 |
| d9 | 17.88 | 7.24 | 1.80 |
| d17 | 3.40 | 4.90 | 9.65 |
| d19 | 4.65 | 7.10 | 8.29 |

| Unit focal length | | | |
|---|---|---|---|
| f1 = 37.49 | f2 = −7.97 | f3 = 11.96 | f4 = 28.28 |

Example 4

| Unit mm | | | | |
|---|---|---|---|---|
| Surface data | | | | |
| Surface no. | r | d | nd | vd |
| Object plane | ∞ | ∞ | | |
| 1 | 31.973 | 0.80 | 1.92286 | 18.90 |
| 2 | 22.117 | 2.32 | 1.83481 | 42.71 |
| 3 | 1672.968 | Variable | | |
| 4 | 104.014 | 0.40 | 1.88300 | 40.76 |
| 5 | 6.725 | 3.47 | | |
| 6 | −27.333 | 0.40 | 1.91082 | 35.25 |
| 7 | 27.766 | 0.20 | | |
| 8 | 15.706 | 1.76 | 1.92286 | 18.90 |
| 9 | −110.264 | Variable | | |
| 10 (stop) | ∞ | 0.10 | | |
| 11* | 6.684 | 1.97 | 1.74320 | 49.29 |
| 12* | −67.290 | 0.15 | | |
| 13 | 10.215 | 1.41 | 1.88300 | 40.76 |
| 14 | 67.982 | 0.40 | 1.80810 | 22.76 |
| 15 | 4.668 | 1.52 | | |
| 16 | −22.324 | 1.13 | 1.49700 | 81.54 |
| 17* | −9.783 | Variable | | |
| 18* | 10.621 | 1.21 | 1.52542 | 55.78 |
| 19 | 32.348 | Variable | | |

-continued

Unit mm

| | | | | |
|---|---|---|---|---|
| 20 | ∞ | 0.30 | 1.51633 | 64.14 |
| 21 | ∞ | 0.50 | | |
| 22 | ∞ | 0.50 | 1.51633 | 64.14 |
| 23 | ∞ | 0.50 | | |
| Image plane (Image pickup surface) | ∞ | | | |

Aspherical surface data

11th surface

K = 0.000
A4 = −2.59888e−04, A6 = −5.49558e−06
12th surface

K = 0.000
A4 = 3.38578e−04, A6 = −7.18624e−06, A8 = 1.68226e−07
17th surface

K = 0.000
A4 = −1.76790e−04, A6 = 5.43670e−06
18th surface

K = 0.000
A4 = −1.49136e−04, A6 = 1.75767e−06

Zoom data

| | Wide angle | Intermediate | Telephoto |
|---|---|---|---|
| Focal length | 4.70 | 8.80 | 18.14 |
| Fno. | 1.85 | 2.20 | 2.74 |
| Angle of field 2ω | 79.87 | 47.97 | 23.62 |
| fb (in air) | 5.71 | 7.24 | 9.16 |
| Lens total length (in air) | 41.86 | 39.55 | 45.25 |
| d3 | 0.30 | 4.19 | 11.04 |
| d9 | 16.02 | 6.77 | 1.00 |
| d17 | 2.60 | 4.12 | 6.81 |
| d19 | 4.18 | 5.71 | 7.64 |

Unit focal length

| f1 = 40.90 | f2 = −8.62 | f3 = 10.91 | f4 = 29.53 |
|---|---|---|---|

Example 5

Unit mm

Surface data

| Surface no. | r | d | nd | vd |
|---|---|---|---|---|
| Object plane | ∞ | ∞ | | |
| 1 | 33.163 | 2.30 | 1.49700 | 81.54 |
| 2 | −131.721 | Variable | | |
| 3 | 156.850 | 0.40 | 1.88300 | 40.76 |
| 4 | 7.583 | 3.70 | | |
| 5 | −26.034 | 0.40 | 1.83481 | 42.71 |
| 6 | 62.130 | 0.10 | | |
| 7 | 18.528 | 1.65 | 1.92286 | 18.90 |
| 8 | −692.164 | Variable | | |
| 9 (stop) | ∞ | 0.10 | | |
| 10* | 7.397 | 1.94 | 1.74320 | 49.29 |
| 11* | −68.383 | 0.10 | | |
| 12 | 10.119 | 1.86 | 1.88300 | 40.76 |
| 13 | −35.413 | 0.40 | 1.84666 | 23.78 |
| 14 | 4.965 | 1.65 | | |
| 15 | −17.359 | 0.40 | 1.52518 | 61.10 |
| 16 | 84.091 | 1.04 | 1.74320 | 49.29 |
| 17* | −14.821 | Variable | | |
| 18* | 10.692 | 1.31 | 1.52542 | 55.78 |

-continued

Unit mm

| | | | | |
|---|---|---|---|---|
| 19 | 43.348 | Variable | | |
| 20 | ∞ | 0.30 | 1.51633 | 64.14 |
| 21 | ∞ | 0.50 | | |
| 22 | ∞ | 0.50 | 1.51633 | 64.14 |
| 23 | ∞ | 0.50 | | |
| Image plane (Image pickup surface) | ∞ | | | |

Aspherical surface data

10th surface

K = 0.000
A4 = −2.03129e−04, A6 = −2.79476e−06, A8 = −9.51950e−08
11th surface

K = 0.000
A4 = 2.12250e−04, A6 = −4.25624e−06
17th surface

K = 0.000
A4 = −7.90100e−05, A6 = 7.01948e−06
18th surface

K = 0.000
A4 = −1.55276e−04, A6 = 1.37635e−06, A8 = 8.00882e−09

Zoom data

| | Wide angle | Intermediate | Telephoto |
|---|---|---|---|
| Focal length | 4.76 | 9.50 | 18.36 |
| Fno. | 1.85 | 2.24 | 2.72 |
| Angle of field 2ω | 80.46 | 44.98 | 23.43 |
| fb (in air) | 5.68 | 7.69 | 9.79 |
| Lens total length (in air) | 44.22 | 41.30 | 48.82 |
| d2 | 0.30 | 5.38 | 13.61 |
| d8 | 18.29 | 6.66 | 1.00 |
| d17 | 2.60 | 4.22 | 7.07 |
| d19 | 4.16 | 6.15 | 8.26 |

Unit focal length

| f1 = 53.55 | f2 = −9.96 | f3 = 11.71 | f4 = 26.64 |
|---|---|---|---|

Example 6

Unit mm

Surface data

| Surface no. | r | d | nd | vd |
|---|---|---|---|---|
| Object plane | ∞ | ∞ | | |
| 1 | 25.293 | 0.60 | 1.94595 | 17.98 |
| 2 | 20.000 | 3.54 | 1.77250 | 49.60 |
| 3 | 158.452 | Variable | | |
| 4 | 99.461 | 0.40 | 1.88300 | 40.76 |
| 5 | 6.737 | 4.06 | | |
| 6* | −31.770 | 0.40 | 1.74320 | 49.34 |
| 7* | 32.347 | 1.79 | | |
| 8 | 45.949 | 1.35 | 1.94595 | 17.98 |
| 9 | −58.493 | Variable | | |
| 10 (stop) | ∞ | 0.10 | | |
| 11* | 10.236 | 2.13 | 1.85135 | 40.10 |
| 12* | 138.581 | 0.10 | | |
| 13 | 21.486 | 0.89 | 1.61800 | 63.33 |
| 14 | 31.876 | 0.10 | | |
| 15 | 9.914 | 1.18 | 1.88300 | 40.76 |
| 16 | 14.798 | 0.40 | 1.80810 | 22.76 |
| 17 | 6.255 | 2.28 | | |

-continued

Unit mm

| | | | | |
|---|---|---|---|---|
| 18 | −58.054 | 0.40 | 1.80518 | 25.42 |
| 19 | 10.950 | 2.50 | 1.58313 | 59.38 |
| 20* | −12.289 | Variable | | |
| 21* | 10.010 | 2.20 | 1.49700 | 81.54 |
| 22 | 70.000 | Variable | | |
| 23 | ∞ | 0.30 | 1.51633 | 64.14 |
| 24 | ∞ | 0.50 | | |
| 25 | ∞ | 0.50 | 1.51633 | 64.14 |
| 26 | ∞ | 0.50 | | |
| Image plane (Image pickup surface) | ∞ | | | |

Aspherical surface data

6th surface

K = 0.000
A4 = −3.84113e−04, A6 = 1.07108e−05, A8 = −1.79993e−07, A10 = −1.90529e−09

7th surface

K = 0.000
A4 = −5.39129e−04, A6 = 1.41688e−05, A8 = −3.91232e−07, A10 = 1.88868e−09

11th surface

K = 0.000
A4 = −6.89492e−05, A6 = 1.39060e−06, A8 = −2.84601e−08, A10 = 3.16070e−10

12th surface

K = 0.000
A4 = 8.86529e−05, A6 = 1.43992e−06, A8 = −1.35507e−08

20th surface

K = 0.000
A4 = 9.99836e−06, A6 = −6.11239e−07, A8 = 2.19352e−08

21th surface

K = 0.000
A4 = −5.80993e−05, A6 = −2.61814e−07, A8 = 1.12095e−09

Zoom data

| | Wide angle | Intermediate | Telephoto |
|---|---|---|---|
| Focal length | 4.40 | 9.64 | 21.12 |
| Fno. | 1.44 | 1.92 | 2.40 |
| Angle of field 2ω | 84.35 | 45.04 | 20.53 |
| fb (in air) | 6.20 | 8.84 | 8.53 |
| Lens total length (in air) | 53.35 | 50.05 | 62.05 |
| d3 | 0.30 | 5.08 | 14.86 |
| d9 | 19.47 | 5.87 | 1.62 |
| d20 | 2.96 | 5.84 | 12.62 |
| d22 | 4.67 | 7.31 | 7.00 |

Unit focal length

| | | | |
|---|---|---|---|
| f1 = 41.17 | f2 = −8.23 | f3 = 14.12 | f4 = 23.22 |

Example 7

Unit mm

Surface data

| Surface no. | r | d | nd | vd |
|---|---|---|---|---|
| Object plane | ∞ | ∞ | | |
| 1 | 23.117 | 0.60 | 1.92286 | 18.90 |
| 2 | 19.000 | 3.04 | 1.69680 | 55.53 |

-continued

Unit mm

| | | | | |
|---|---|---|---|---|
| 3 | 567.677 | Variable | | |
| 4 | 158.228 | 0.50 | 1.88300 | 40.76 |
| 5 | 8.057 | 4.30 | | |
| 6* | −23.534 | 0.40 | 1.74320 | 49.34 |
| 7 | 52.059 | 0.20 | | |
| 8 | 17.996 | 1.40 | 1.92286 | 18.90 |
| 9 | 108.881 | Variable | | |
| 10 (stop) | ∞ | 0.10 | | |
| 11* | 9.561 | 2.49 | 1.74320 | 49.29 |
| 12* | −42.664 | 0.10 | | |
| 13 | 8.376 | 2.09 | 1.88300 | 40.76 |
| 14 | −261.069 | 0.40 | 1.80810 | 22.76 |
| 15 | 4.980 | Variable | | |
| 16* | 12.097 | 1.60 | 1.52542 | 55.78 |
| 17 | 107.953 | Variable | | |
| 18 | ∞ | 0.30 | 1.51633 | 64.14 |
| 19 | ∞ | 0.50 | | |
| 20 | ∞ | 0.50 | 1.51633 | 64.14 |
| 21 | ∞ | 0.50 | | |
| Image plane (Image pickup surface) | ∞ | | | |

Aspherical surface data

6th surface

K = 0.000
A4 = −1.51119e−05, A6 = −1.33372e−06, A8 = 2.50393e−08, A10 = −3.94915e−10

11th surface

K = 0.000
A4 = −1.38545e−04, A6 = −5.62868e−07, A8 = 4.99891e−08

12th surface

K = 0.000
A4 = 7.32966e−05, A6 = 5.50415e−07, A8 = 4.47338e−08

16th surface

K = 0.000
A4 = −1.54731e−04, A6 = 4.07330e−07, A8 = 3.77271e−09

Zoom data

| | Wide angle | Intermediate | Telephoto |
|---|---|---|---|
| Focal length | 6.10 | 11.83 | 23.42 |
| Fno. | 2.35 | 2.72 | 3.26 |
| Angle of field 2ω | 75.78 | 42.83 | 21.79 |
| fb (in air) | 4.33 | 7.31 | 9.34 |
| Lens total length (in air) | 47.13 | 43.69 | 47.73 |
| d3 | 0.30 | 4.70 | 10.45 |
| d9 | 18.00 | 7.11 | 1.00 |
| d15 | 7.29 | 7.35 | 9.71 |
| d17 | 2.80 | 5.79 | 7.81 |

Unit focal length

| | | | |
|---|---|---|---|
| f1 = 37.00 | f2 = −9.40 | f3 = 11.96 | f4 = 25.76 |

Example 8

Unit mm

Surface data

| Surface no. | r | d | nd | vd |
|---|---|---|---|---|
| Object plane | ∞ | ∞ | | |
| 1 | 22.833 | 0.70 | 1.92286 | 18.90 |
| 2 | 19.156 | 3.08 | 1.69680 | 55.53 |

|  |  | Unit mm |  |  |
|---|---|---|---|---|
| 3 | 410.928 | Variable |  |  |
| 4 | 119.057 | 0.50 | 1.88300 | 40.76 |
| 5 | 7.639 | 3.80 |  |  |
| 6* | −24.997 | 0.40 | 1.74320 | 49.34 |
| 7 | 54.868 | 0.20 |  |  |
| 8 | 15.504 | 1.40 | 1.92286 | 18.90 |
| 9 | 53.275 | Variable |  |  |
| 10 (stop) | ∞ | 0.10 |  |  |
| 11* | 8.577 | 1.51 | 1.74320 | 49.29 |
| 12* | −49.185 | 0.10 |  |  |
| 13 | 8.243 | 1.97 | 1.88300 | 40.76 |
| 14 | 105.591 | 0.40 | 1.80810 | 22.76 |
| 15 | 4.721 | Variable |  |  |
| 16* | 11.790 | 1.50 | 1.52542 | 55.78 |
| 17 | 107.953 | Variable |  |  |
| 18 | ∞ | 0.30 | 1.51633 | 64.14 |
| 19 | ∞ | 0.50 |  |  |
| 20 | ∞ | 0.50 | 1.51633 | 64.14 |
| 21 | ∞ | 0.50 |  |  |
| Image plane (Image pickup surface) | ∞ |  |  |  |

Aspherical surface data

6th surface

K = 0.000
A4 = −2.49352e−05, A6 = −1.76219e−06, A8 = 4.15814e−08, A10 = −7.50001e−10

11th surface

K = 0.000
A4 = −1.74611e−04, A6 = −8.07580e−07, A8 = 9.33392e−08

12th surface

K = 0.000
A4 = 7.53822e−05, A6 = 6.28749e−07, A8 = 1.02456e−07

16th surface

K = 0.000
A4 = −1.64910e−04, A6 = 1.37895e−07, A8 = 1.17931e−08

Zoom data

|  | Wide angle | Intermediate | Telephoto |
|---|---|---|---|
| Focal length | 6.10 | 11.83 | 23.42 |
| Fno. | 2.54 | 2.94 | 3.61 |
| Angle of field 2ω | 75.78 | 42.90 | 21.92 |
| fb (in air) | 4.33 | 7.46 | 10.13 |
| Lens total length (in air) | 45.96 | 42.60 | 46.23 |
| d3 | 0.30 | 4.70 | 9.99 |
| d9 | 18.00 | 7.26 | 1.00 |
| d15 | 7.68 | 7.52 | 9.46 |
| d17 | 2.80 | 5.94 | 8.60 |

Unit focal length

| f1 = 36.75 | f2 = −9.25 | f3 = 11.83 | f4 = 25.06 |
|---|---|---|---|

Example 9

|  |  | Unit mm |  |  |
|---|---|---|---|---|
|  |  | Surface data |  |  |
| Surface no. | r | d | nd | vd |
| Object plane | ∞ | ∞ |  |  |
| 1 | 24.285 | 0.70 | 1.92286 | 18.90 |
| 2 | 19.500 | 3.08 | 1.72916 | 54.68 |

|  |  | Unit mm |  |  |
|---|---|---|---|---|
| 3 | 227.353 | Variable |  |  |
| 4 | 74.293 | 0.50 | 1.88300 | 40.76 |
| 5 | 7.402 | 4.10 |  |  |
| 6* | −22.919 | 0.40 | 1.74320 | 49.34 |
| 7 | 53.882 | 0.20 |  |  |
| 8 | 16.288 | 1.40 | 1.94595 | 17.98 |
| 9 | 60.308 | Variable |  |  |
| 10 (stop) | ∞ | 0.10 |  |  |
| 11* | 8.262 | 2.50 | 1.74320 | 49.29 |
| 12* | −66.482 | 0.10 |  |  |
| 13 | 7.052 | 1.49 | 1.88300 | 40.76 |
| 14 | 17.757 | 0.40 | 1.92286 | 20.88 |
| 15 | 4.803 | Variable |  |  |
| 16* | 12.667 | 1.40 | 1.52542 | 55.78 |
| 17 | 107.953 | Variable |  |  |
| 18 | ∞ | 0.30 | 1.51633 | 64.14 |
| 19 | ∞ | 0.50 |  |  |
| 20 | ∞ | 0.50 | 1.51633 | 64.14 |
| 21 | ∞ | 0.50 |  |  |
| Image plane (Image pickup surface) | ∞ |  |  |  |

Aspherical surface data

6th surface

K = 0.000
A4 = −1.81414e−05, A6 = −1.43485e−06, A8 = 2.68348e−08, A10 = −5.55413e−10

11th surface

K = 0.000
A4 = −1.45898e−05, A6 = 3.03000e−06, A8 = 5.19464e−07

12th surface

K = 0.000
A4 = 3.00160e−04, A6 = 5.34465e−06, A8 = 7.73346e−07

16th surface

K = 0.000
A4 = −1.48328e−04, A6 = 9.66244e−07, A8 = −1.64796e−08

Zoom data

|  | Wide angle | Intermediate | Telephoto |
|---|---|---|---|
| Focal length | 5.91 | 12.94 | 28.36 |
| Fno. | 2.58 | 3.29 | 4.03 |
| Angle of field 2ω | 77.61 | 39.56 | 18.03 |
| fb (in air) | 5.13 | 9.09 | 10.40 |
| Lens total length (in air) | 46.80 | 44.28 | 52.73 |
| d3 | 0.30 | 5.33 | 13.71 |
| d9 | 18.00 | 6.19 | 1.00 |
| d15 | 7.01 | 7.31 | 11.26 |
| d17 | 3.60 | 7.57 | 8.87 |

Unit focal length

| f1 = 39.68 | f2 = −9.01 | f3 = 11.98 | f4 = 27.18 |
|---|---|---|---|

Example 10

|  |  | Unit mm |  |  |
|---|---|---|---|---|
|  |  | Surface data |  |  |
| Surface no. | r | d | nd | vd |
| Object plane | ∞ | ∞ |  |  |
| 1 | 24.312 | 0.60 | 1.94595 | 17.98 |
| 2 | 19.000 | 2.87 | 1.80400 | 46.57 |

-continued

Unit mm

| | | | | |
|---|---|---|---|---|
| 3 | 170.948 | Variable | | |
| 4 | 60.000 | 0.40 | 1.91082 | 35.25 |
| 5 | 6.500 | 3.85 | | |
| 6* | −17.476 | 0.40 | 1.80610 | 40.92 |
| 7* | 35.984 | 0.30 | | |
| 8 | 23.144 | 1.80 | 1.94595 | 17.98 |
| 9 | −47.000 | Variable | | |
| 10 (stop) | ∞ | 0.10 | | |
| 11* | 8.395 | 2.00 | 1.74320 | 49.34 |
| 12* | −104.289 | 1.28 | | |
| 13 | 12.960 | 1.30 | 1.74320 | 49.34 |
| 14 | −185.847 | 0.40 | 1.80810 | 22.76 |
| 15 | 6.953 | 1.00 | | |
| 16 | 155.749 | 1.01 | 1.49700 | 81.54 |
| 17* | −16.453 | Variable | | |
| 18* | 9.203 | 1.25 | 1.52542 | 55.78 |
| 19 | 30.000 | Variable | | |
| 20* | −29.000 | 0.50 | 1.52542 | 55.78 |
| 21 | −63.709 | 0.40 | | |
| 22 | ∞ | 0.50 | 1.51633 | 64.14 |
| 23 | ∞ | 0.50 | | |
| Image plane (Image pickup surface) | ∞ | | | |

Aspherical surface data

6th surface

K = 0.000
A4 = 4.41465e−05, A6 = −7.15645e−06, A8 = 1.70017e−07,
A10 = −3.54562e−09

7th surface

K = 0.000
A4 = −3.13273e−05, A6 = −5.80335e−06, A8 = 9.38249e−08,
A10 = −1.34702e−09

11th surface

K = 0.000
A4 = −5.32267e−05, A6 = 1.38711e−06, A8 = −1.22321e−07,
A10 = −8.75101e−10

12th surface

K = 0.000
A4 = 2.51071e−04, A6 = −3.49406e−08, A8 = −1.79863e−07

17th surface

K = 0.000
A4 = 4.13729e−05, A6 = 4.26591e−06, A8 = 9.35627e−07

18th surface

K = 0.000
A4 = −7.25152e−05, A6 = −1.54743e−06, A8 = 1.31128e−07,
A10 = −1.94310e−09

20th surface

K = 0.000
A4 = −1.04341e−03, A6 = 6.83789e−05, A8 = −2.33834e−06

Zoom data

| | Wide angle | Intermediate | Telephoto |
|---|---|---|---|
| Focal length | 4.70 | 10.29 | 22.46 |
| Fno. | 1.95 | 2.32 | 2.89 |
| Angle of field 2ω | 78.09 | 40.96 | 18.88 |
| fb (in air) | 1.23 | 1.23 | 1.23 |
| Lens total length (in air) | 47.86 | 45.52 | 53.78 |
| d3 | 0.30 | 5.60 | 12.94 |
| d9 | 18.43 | 6.66 | 1.80 |
| d17 | 5.38 | 6.75 | 12.25 |
| d19 | 3.45 | 6.22 | 6.50 |

-continued

Unit mm

Unit focal length f1 = 36.88   f2 = −7.89   f3 = 12.11   f4 = 24.75   f5 = −101.81

Example 11

Unit mm

Surface data

| Surface no. | r | d | nd | νd |
|---|---|---|---|---|
| Object plane | ∞ | ∞ | | |
| 1 | 29.118 | 2.12 | 1.49700 | 81.54 |
| 2 | −185.547 | Variable | | |
| 3 | 158.650 | 0.70 | 1.88300 | 40.76 |
| 4 | 7.484 | 3.39 | | |
| 5 | −23.072 | 0.60 | 1.88300 | 40.76 |
| 6 | 81.972 | 0.20 | | |
| 7 | 19.828 | 1.47 | 1.92286 | 18.90 |
| 8 | −140.176 | Variable | | |
| 9 (stop) | ∞ | 0.10 | | |
| 10* | 7.800 | 1.83 | 1.58313 | 59.38 |
| 11* | −32.444 | 0.10 | | |
| 12 | 6.925 | 2.00 | 1.88300 | 40.76 |
| 13 | 31.679 | 0.45 | 1.80810 | 22.76 |
| 14 | 4.235 | Variable | | |
| 15* | 9.220 | 1.80 | 1.52542 | 55.78 |
| 16 | 70.000 | Variable | | |
| 17 | ∞ | 0.30 | 1.51633 | 64.14 |
| 18 | ∞ | 0.50 | | |
| 19 | ∞ | 0.50 | 1.51633 | 64.14 |
| 20 | ∞ | 0.50 | | |
| Image plane (Image pickup surface) | ∞ | | | |

Aspherical surface data

10th surface

K = 0.000
A4 = −2.30165e−04, A6 = −1.15925e−06, A8 = −2.79567e−08

11th surface

K = 0.000
A4 = 9.05424e−05, A6 = 5.46552e−07

15th surface

K = 0.000
A4 = −1.77126e−04, A6 = 9.17940e−07

Zoom data

| | Wide angle | Intermediate | Telephoto |
|---|---|---|---|
| Focal length | 5.06 | 9.82 | 19.43 |
| Fno. | 2.05 | 2.44 | 2.98 |
| Angle of field 2ω | 76.02 | 43.77 | 22.44 |
| fb (in air) | 4.53 | 6.80 | 9.52 |
| Lens total length (in air) | 44.12 | 42.31 | 49.93 |
| d2 | 0.30 | 5.80 | 13.79 |
| d8 | 18.35 | 7.50 | 1.45 |
| d14 | 6.19 | 7.45 | 10.41 |
| d16 | 3.00 | 5.28 | 7.99 |

-continued

Unit mm

Unit focal length

| f1 = 50.81 | f2 = −9.82 | f3 = 11.92 | f4 = 20.01 |

Example 12

Unit mm

Surface data

| Surface no. | r | d | nd | vd |
|---|---|---|---|---|
| Object plane | ∞ | ∞ | | |
| 1 | 27.257 | 2.06 | 1.49700 | 81.54 |
| 2 | −143.042 | Variable | | |
| 3 | 218.088 | 0.70 | 1.88300 | 40.76 |
| 4 | 7.353 | 3.45 | | |
| 5 | −20.320 | 0.60 | 1.88300 | 40.76 |
| 6 | 171.432 | 0.20 | | |
| 7 | 21.069 | 1.50 | 1.92286 | 18.90 |
| 8 | −109.751 | Variable | | |
| 9 (Stop) | ∞ | 0.10 | | |
| 10* | 8.911 | 1.69 | 1.58313 | 59.38 |
| 11* | −30.393 | 0.10 | | |
| 12 | 7.410 | 2.45 | 1.88300 | 40.76 |
| 13 | 86.809 | 0.45 | 1.80810 | 22.76 |
| 14 | 4.576 | Variable | | |
| 15* | 8.914 | 1.80 | 1.52542 | 55.78 |
| 16 | 70.000 | Variable | | |
| 17 | ∞ | 0.30 | 1.51633 | 64.14 |
| 18 | ∞ | 0.50 | | |
| 19 | ∞ | 0.50 | 1.51633 | 64.14 |
| 20 | ∞ | 0.50 | | |
| Image plane (Image pickup surface) | ∞ | | | |

Aspherical surface data

10th surface

K = 0.000
A4 = −2.03812e−04, A6 = 3.89448e−07, A8 = −5.60558e−09

11th surface

K = 0.000
A4 = 4.54452e−05, A6 = 1.51240e−06

15th surface

K = 0.000
A4 = −2.02610e−04, A6 = −4.57528e−07

Zoom data

| | Wide angle | Intermediate | Telephoto |
|---|---|---|---|
| Focal length | 5.06 | 9.82 | 19.43 |
| Fno. | 2.05 | 2.43 | 2.97 |
| Angle of field 2ω | 76.15 | 43.79 | 22.32 |
| fb (in air) | 4.63 | 7.22 | 9.87 |
| Lens total length (in air) | 44.59 | 42.00 | 49.49 |
| d2 | 0.30 | 5.20 | 12.92 |
| d8 | 18.32 | 7.29 | 1.45 |
| d14 | 6.25 | 7.20 | 10.16 |
| d16 | 3.10 | 5.69 | 8.34 |

Unit focal length

| f1 = 46.25 | f2 = −9.48 | f3 = 12.12 | f4 = 19.24 |

Example 13

Unit mm

Surface data

| Surface no. | r | d | nd | vd |
|---|---|---|---|---|
| Object plane | ∞ | ∞ | | |
| 1 | 42.186 | 2.07 | 1.49700 | 81.54 |
| 2 | −87.337 | Variable | | |
| 3 | −4069.895 | 0.70 | 1.88300 | 40.76 |
| 4 | 8.235 | 3.69 | | |
| 5 | −23.719 | 0.60 | 1.88300 | 40.76 |
| 6 | 394.297 | 0.20 | | |
| 7 | 22.297 | 1.59 | 1.92286 | 18.90 |
| 8 | −183.777 | Variable | | |
| 9 (Stop) | ∞ | 0.10 | | |
| 10* | 7.434 | 2.22 | 1.58313 | 59.38 |
| 11* | −30.784 | 0.10 | | |
| 12 | 8.159 | 2.15 | 1.88300 | 40.76 |
| 13 | −42.052 | 0.01 | 1.56384 | 60.67 |
| 14 | −42.052 | 0.60 | 1.80518 | 25.42 |
| 15 | 4.407 | Variable | | |
| 16* | 8.807 | 1.80 | 1.52542 | 55.78 |
| 17 | 43.392 | Variable | | |
| 18 | ∞ | 0.30 | 1.54771 | 62.90 |
| 19 | ∞ | 0.50 | | |
| 20 | ∞ | 0.50 | 1.51633 | 64.10 |
| 21 | ∞ | 0.50 | | |
| Image plane (Image pickup surface) | ∞ | | | |

Aspherical surface data

10th surface

K = 0.000
A4 = −2.92208e−04, A6 = −4.61047e−06, A8 = −7.55152e−08

11th surface

K = 0.000
A4 = 1.13948e−04, A6 = −3.51648e−06

16th surface

K = 0.000
A4 = −1.69962e−04

Zoom data

| | Wide angle | Intermediate | Telephoto |
|---|---|---|---|
| Focal length | 5.05 | 9.89 | 19.43 |
| Fno. | 2.00 | 2.41 | 2.99 |
| Angle of field 2ω | 76.66 | 42.82 | 22.19 |
| fb (in air) | 4.49 | 6.49 | 8.88 |
| Lens total length (in air) | 45.64 | 44.17 | 51.93 |
| d2 | 0.30 | 6.91 | 15.10 |
| d8 | 19.42 | 7.87 | 1.45 |
| d15 | 5.61 | 7.09 | 10.68 |
| d17 | 3.00 | 5.00 | 7.39 |

Unit focal length

| f1 = 57.54 | f2 = −10.69 | f3 = 12.13 | f4 = 20.66 |

Example 14

Unit mm

Surface data

| Surface no. | r | d | nd | vd |
|---|---|---|---|---|
| Object plane | ∞ | ∞ | | |
| 1 | 20.051 | 2.02 | 1.49700 | 81.54 |
| 2 | 187.279 | Variable | | |
| 3 | 60.222 | 0.70 | 1.88300 | 40.76 |

-continued

Unit mm

| | | | | |
|---|---|---|---|---|
| 4 | 6.923 | 3.26 | | |
| 5 | −21.750 | 0.60 | 1.88300 | 40.76 |
| 6 | 96.915 | 0.20 | | |
| 7 | 17.396 | 1.39 | 1.92286 | 18.90 |
| 8 | 211.623 | Variable | | |
| 9 (Stop) | ∞ | 0.10 | | |
| 10* | 7.347 | 1.99 | 1.58313 | 59.38 |
| 11* | −26.375 | 0.10 | | |
| 12 | 7.950 | 2.12 | 1.91082 | 35.25 |
| 13 | 1794.936 | 0.45 | 1.80810 | 22.76 |
| 14 | 4.350 | Variable | | |
| 15* | 9.728 | 1.80 | 1.52542 | 55.78 |
| 16 | 70.000 | Variable | | |
| 17 | ∞ | 0.30 | 1.51633 | 64.14 |
| 18 | ∞ | 0.50 | | |
| 19 | ∞ | 0.50 | 1.51633 | 64.14 |
| 20 | ∞ | 0.50 | | |
| Image plane (Image pickup surface) | ∞ | | | |

Aspherical surface data

10th surface

K = 0.000
A4 = −3.40623e−04, A6 = −1.06642e−06, A8 = −4.53670e−08

11th surface

K = 0.000
A4 = 9.85056e−05, A6 = 1.32195e−06

15th surface

K = 0.000
A4 = −1.04711e−04, A6 = 1.04972e−06

Zoom data

| | Wide angle | Intermediate | Telephoto |
|---|---|---|---|
| Focal length | 5.06 | 11.08 | 24.29 |
| Fno. | 2.01 | 2.48 | 3.13 |
| Angle of field 2ω | 76.27 | 39.63 | 18.27 |
| fb (in air) | 4.33 | 7.65 | 9.44 |
| Lens total length (in air) | 44.04 | 41.88 | 52.73 |
| d2 | 0.30 | 5.96 | 14.87 |
| d8 | 18.53 | 6.55 | 1.45 |
| d14 | 6.16 | 6.99 | 12.25 |
| d16 | 2.80 | 6.12 | 7.91 |

Unit focal length

| f1 = 45.00 | f2 = −9.09 | f3 = 11.55 | f4 = 21.29 |

Example 15

Unit mm

Surface data

| Surface no. | r | d | nd | vd |
|---|---|---|---|---|
| Object plane | ∞ | ∞ | | |
| 1 | 26.721 | 2.10 | 1.49700 | 81.54 |
| 2 | −124.956 | Variable | | |
| 3 | 1203.804 | 0.40 | 1.88300 | 40.76 |
| 4 | 7.349 | 3.10 | | |
| 5 | −19.235 | 0.40 | 1.88300 | 40.76 |
| 6 | 299.582 | 0.20 | | |
| 7 | 22.220 | 1.45 | 1.92286 | 18.90 |
| 8 | −69.837 | Variable | | |
| 9 (Stop) | ∞ | 0.10 | | |
| 10* | 9.000 | 2.30 | 1.58313 | 59.38 |

-continued

Unit mm

| | | | | |
|---|---|---|---|---|
| 11* | −15.837 | 0.20 | | |
| 12 | 6.500 | 2.00 | 1.88300 | 40.76 |
| 13 | 146.230 | 0.40 | 1.80810 | 22.76 |
| 14 | 4.124 | Variable | | |
| 15* | −10.683 | 0.40 | 1.49700 | 81.54 |
| 16 | −288.659 | Variable | | |
| 17* | 7.732 | 2.30 | 1.52542 | 55.78 |
| 18 | −32.661 | Variable | | |
| 19 | ∞ | 0.30 | 1.51633 | 64.14 |
| 20 | ∞ | 0.50 | | |
| 21 | ∞ | 0.50 | 1.51633 | 64.14 |
| 22 | ∞ | 0.50 | | |
| Image plane (Image pickup surface) | ∞ | | | |

Aspherical surface data

10th surface

K = 0.000
A4 = −3.04097e−04, A6 = 2.44348e−06, A8 = −3.88587e−07

11th surface

K = 0.000
A4 = 5.83875e−05, A6 = 2.41183e−06, A8 = −3.46382e−07

15th surface

K = 0.000
A4 = 2.16233e−04, A6 = −6.69265e−06, A8 = 3.07916e−07

17th surface

K = 0.000
A4 = −4.34037e−04, A6 = 1.05542e−06, A8 = −6.59403e−08

Zoom data

| | Wide angle | Intermediate | Telephoto |
|---|---|---|---|
| Focal length | 5.06 | 9.82 | 19.43 |
| Fno. | 2.00 | 2.31 | 3.13 |
| Angle of field 2ω | 76.14 | 43.44 | 22.13 |
| fb (in air) | 3.70 | 5.75 | 5.03 |
| Lens total length (in air) | 44.43 | 41.47 | 44.43 |
| d2 | 0.30 | 5.30 | 9.32 |
| d8 | 18.48 | 7.11 | 1.44 |
| d14 | 2.00 | 3.14 | 10.49 |
| d16 | 4.59 | 4.82 | 2.80 |
| d18 | 2.18 | 4.22 | 3.50 |

Unit focal length

| f1 = 44.50 | f2 = −9.43 | f3 = 10.05 | f4 = −22.33 | f5 = 12.14 |

Example 16

Unit mm

Surface data

| Surface no. | r | d | nd | vd |
|---|---|---|---|---|
| Object plane | ∞ | ∞ | | |
| 1 | 21.779 | 0.80 | 1.92286 | 18.90 |
| 2 | 17.411 | 2.61 | 1.72916 | 54.68 |
| 3 | 1672.968 | Variable | | |
| 4 | 198.060 | 0.40 | 1.88300 | 40.76 |
| 5 | 6.616 | 3.44 | | |
| 6 | −20.344 | 0.40 | 1.72916 | 54.68 |
| 7 | 29.684 | 0.10 | | |
| 8 | 15.786 | 1.54 | 1.92286 | 18.90 |
| 9 | ∞ | Variable | | |
| 10 (stop) | ∞ | 0.10 | | |

-continued

Unit mm

| | | | | |
|---|---|---|---|---|
| 11* | 7.373 | 1.82 | 1.74320 | 49.29 |
| 12* | −125.121 | 0.10 | | |
| 13 | 10.127 | 1.48 | 1.88300 | 40.76 |
| 14 | 140.547 | 0.40 | 1.84666 | 23.78 |
| 15 | 5.398 | 1.51 | | |
| 16 | −26.519 | 0.40 | 1.72825 | 28.46 |
| 17 | 42.093 | 1.21 | 1.74320 | 49.34 |
| 18* | −11.553 | Variable | | |
| 19* | 11.201 | 1.22 | 1.52542 | 55.78 |
| 20 | 33.333 | Variable | | |
| 21 | ∞ | 0.30 | 1.51633 | 64.14 |
| 22 | ∞ | 0.50 | | |
| 23 | ∞ | 0.50 | 1.51633 | 64.14 |
| 24 | ∞ | 0.50 | | |
| Image plane (Image pickup surface) | ∞ | | | |

Aspherical surface data

11th surface

K = 0.000
A4 = −1.63530e−04, A6 = −1.51457e−06, A8 = −4.19498e−08
12th surface

K = 0.000
A4 = 3.18502e−04, A6 = −2.91289e−06
18th surface

K = 0.000
A4 = −1.10803e−04, A6 = 4.21876e−06
19th surface

K = 0.000
A4 = −1.77167e−04, A6 = 1.46061e−06, A8 = −2.52604e−08

Zoom data

| | Wide angle | Intermediate | Telephoto |
|---|---|---|---|
| Focal length | 5.05 | 9.50 | 19.49 |
| Fno. | 1.85 | 2.19 | 2.62 |
| Angle of field 2ω | 75.99 | 45.03 | 21.87 |
| fb (in air) | 6.43 | 8.26 | 8.72 |
| Lens total length(in air) | 41.03 | 38.78 | 44.42 |
| d3 | 0.30 | 3.32 | 9.28 |
| d9 | 14.17 | 5.69 | 1.00 |
| d18 | 2.60 | 3.97 | 7.89 |
| d20 | 4.91 | 6.73 | 7.19 |

Unit focal length

| f1 = 32.22 | f3 = −7.75 | f3 = 10.91 | f4 = 31.51 |
|---|---|---|---|

Example 17

Unit mm

Surface data

| Surface no. | r | d | nd | vd |
|---|---|---|---|---|
| Object plane | ∞ | ∞ | | |
| 1 | 29.141 | 0.60 | 1.84666 | 23.78 |
| 2 | 20.000 | 3.14 | 1.72916 | 54.68 |
| 3 | 191.094 | Variable | | |
| 4 | 79.229 | 0.70 | 1.88300 | 40.76 |
| 5 | 7.818 | 4.72 | | |
| 6 | −21.697 | 0.60 | 1.88300 | 40.76 |
| 7 | 62.560 | 0.20 | | |
| 8 | 22.812 | 1.58 | 1.92286 | 18.90 |
| 9 | −99.983 | Variable | | |

-continued

Unit mm

| | | | | |
|---|---|---|---|---|
| 10 (stop) | ∞ | 0.10 | | |
| 11* | 8.463 | 2.59 | 1.85135 | 40.10 |
| 12* | −55.738 | 0.10 | | |
| 13 | 14.654 | 1.30 | 2.00069 | 25.46 |
| 14 | 64.279 | 0.40 | 1.80810 | 22.76 |
| 15 | 5.962 | 1.51 | | |
| 16 | −148.603 | 0.40 | 1.68893 | 31.07 |
| 17 | 5.349 | 2.70 | 1.61800 | 63.40 |
| 18* | −11.901 | Variable | | |
| 19 | −39.047 | 0.40 | 1.49700 | 81.54 |
| 20* | 24.202 | Variable | | |
| 21* | 15.551 | 1.70 | 1.58313 | 59.38 |
| 22 | −151.761 | Variable | | |
| 23 | ∞ | 0.30 | 1.51633 | 64.14 |
| 24 | ∞ | 0.50 | | |
| 25 | ∞ | 0.50 | 1.51633 | 64.14 |
| 26 | ∞ | 0.50 | | |
| Image plane (Image pickup surface) | ∞ | | | |

Aspherical surface data

11th surface

K = 0.000
A4 = −1.72419e−04, A6 = 7.44613e−07, A8 = −1.93173e−08
12th surface

K = 0.000
A4 = 1.99335e−04, A6 = 4.95530e−07, A8 = −9.19351e−09
18th surface

K = 0.000
A4 = −7.90096e−05, A6 = 7.42629e−07, A8 = −8.75389e−08
20th surface

K = 0.000
A4 = 2.84071e−05, A6 = 5.68977e−06, A8 = −4.57314e−07
21st surface

K = 0.000
A4 = −1.66922e−06, A6 = 2.92808e−06, A8 = −8.46943e−08,
A10 = −4.15537e−10

Zoom data

| | Wide angle | Intermediate | Telephoto |
|---|---|---|---|
| Focal length | 5.06 | 11.08 | 24.29 |
| Fno. | 1.62 | 2.09 | 2.89 |
| Angle of field 2ω | 76.28 | 39.11 | 17.79 |
| fb (in air) | 5.75 | 8.81 | 4.27 |
| Lens total length(in air) | 52.74 | 49.54 | 57.56 |
| d3 | 0.30 | 6.80 | 15.76 |
| d9 | 20.74 | 7.00 | 1.53 |
| d18 | 1.20 | 1.70 | 7.91 |
| d20 | 2.00 | 2.49 | 5.36 |
| d22 | 4.23 | 7.28 | 2.74 |

Unit focal length

| f1 = 50.98 | f2 = −9.58 | f3 = 11.31 | f4 = −30.00 | f5 = 24.28 |
|---|---|---|---|---|

Aberration diagrams at the time of infinite object point focusing of the abovementioned examples from the example 1 to the example 17 are shown in FIG. 18A to FIG. 34L. In the aberration diagrams, the following diagrams shown by diagram numbers ending with alphabets A, B, C, and D indicate spherical aberration (SA), astigmatism (AS), distortion (DT), and chromatic aberration of magnification (CC) respectively, at a wide angle end.

FIG. 18A, FIG. 18B, FIG. 18C, FIG. 18D,
FIG. 19A, FIG. 19B, FIG. 19C, FIG. 19D,
FIG. 20A, FIG. 20B, FIG. 20C, FIG. 20D,

FIG. 21A, FIG. 21B, FIG. 21C, FIG. 21C,
FIG. 22A, FIG. 22B, FIG. 22C, FIG. 22D,
FIG. 23A, FIG. 23B, FIG. 23C, FIG. 23D,
FIG. 24A, FIG. 24B, FIG. 24C, FIG. 24D,
FIG. 25A, FIG. 25B, FIG. 25C, FIG. 25D,
FIG. 26A, FIG. 26B, FIG. 26C, FIG. 26D,
FIG. 27A, FIG. 27B, FIG. 27C, FIG. 27D,
FIG. 28A, FIG. 28B, FIG. 28C, FIG. 28D,
FIG. 29A, FIG. 29B, FIG. 29C, FIG. 29D,
FIG. 30A, FIG. 30B, FIG. 30C, FIG. 30D,
FIG. 31A, FIG. 31B, FIG. 31C, FIG. 31D,
FIG. 32A, FIG. 32B, FIG. 32C, FIG. 32D,
FIG. 33A, FIG. 33B, FIG. 33C, FIG. 33D, and
FIG. 34A, FIG. 34B, FIG. 34C, FIG. 34D.

In the aberration diagrams, the following diagrams shown by diagram numbers ending with alphabets E, F, G, and H indicate spherical aberration (SA), astigmatism (AS), distortion (DT), and chromatic aberration of magnification (CC) respectively, in an intermediate focal length state.
FIG. 18E, FIG. 18F, FIG. 18G, FIG. 18H,
FIG. 19E, FIG. 19F, FIG. 19G, FIG. 19H,
FIG. 20E, FIG. 20F, FIG. 20G, FIG. 20H,
FIG. 21E, FIG. 21F, FIG. 21G, FIG. 21H,
FIG. 22E, FIG. 22F, FIG. 22G, FIG. 22H,
FIG. 23E, FIG. 23F, FIG. 23G, FIG. 23H,
FIG. 24E, FIG. 24F, FIG. 24G, FIG. 24H,
FIG. 25E, FIG. 25F, FIG. 25G, FIG. 25H,
FIG. 26E, FIG. 26F, FIG. 26G, FIG. 26H,
FIG. 27E, FIG. 27F, FIG. 27G, FIG. 27H,
FIG. 28E, FIG. 28F, FIG. 28G, FIG. 28H,
FIG. 29E, FIG. 29F, FIG. 29G, FIG. 29H,
FIG. 30E, FIG. 30F, FIG. 30G, FIG. 30H,
FIG. 31E, FIG. 31F, FIG. 31G, FIG. 31H,
FIG. 32E, FIG. 32F, FIG. 32G, FIG. 32H,
FIG. 33E, FIG. 33F, FIG. 33G, FIG. 33H, and
FIG. 34E, FIG. 34F, FIG. 34G, FIG. 34H.

In the aberration diagrams, the following diagrams shown by diagram numbers ending with alphabets I, J, K, and L indicate spherical aberration (SA), astigmatism (AS), distortion (DT), and chromatic aberration of magnification (CC) respectively, at a telephoto end.
FIG. 18I, FIG. 18J, FIG. 18K, FIG. 18L,
FIG. 19I, FIG. 19J, FIG. 19K, FIG. 19L,
FIG. 20I, FIG. 20J, FIG. 20K, FIG. 20L,
FIG. 21I, FIG. 21J, FIG. 21K, FIG. 21L,
FIG. 22I, FIG. 22J, FIG. 22K, FIG. 22L,
FIG. 23I, FIG. 23J, FIG. 23K, FIG. 23L,
FIG. 24I, FIG. 24J, FIG. 24K, FIG. 24L,
FIG. 25I, FIG. 25J, FIG. 25K, FIG. 25L,
FIG. 26I, FIG. 26J, FIG. 26K, FIG. 26L,
FIG. 27I, FIG. 27J, FIG. 27K, FIG. 27L,
FIG. 28I, FIG. 28J, FIG. 28K, FIG. 28L,
FIG. 29I, FIG. 29J, FIG. 29K, FIG. 29L,
FIG. 30I, FIG. 30J, FIG. 30K, FIG. 30L,
FIG. 31I, FIG. 31J, FIG. 31K, FIG. 31L,
FIG. 32I, FIG. 32J, FIG. 32K, FIG. 32L,
FIG. 33I, FIG. 33J, FIG. 33K, FIG. 33L, and
FIG. 34I, FIG. 34J, FIG. 34K, FIG. 34L.
In each diagram, 'ω' denotes a half angle of view.

| Conditional expressions | |
|---|---|
| (1-1a) | $(\beta_{2T}/\beta_{2W})/(\beta_{3T}/\beta_{3W})$ |
| (1-2a) | $(\Delta_{1G}/f_1)/(\Delta_{4G}/f_4)$ |
| (1-3a) | $f_3/f_w$ |
| (1-1b) | $(\beta_{2T}/\beta_{2W})/(\beta_{3T}/\beta_{3W})$ |
| (1-2b) | $(\Delta_{1G}/f_1)/(\Delta_{4G}/f_4)$ |
| (1-3b) | $f_3/f_w$ |
| (1-4) | $(\beta_{4T}/\beta_{4W})/(\beta_{3T}/\beta_{3W})$ |
| (1-5) | $\Delta_{1G}/\Delta_{4G}$ |
| (1-6) | $|f_2/f_w|$ |
| (1-7) | $|f_2/f_3|$ |
| (1-8) | $L_T/f_T$ |
| (1-9) | $\Sigma d_{3G}/f_T$ |
| (1-10) | $f_T/f_w$ |
| (1-11) | $|f_{3\_2}/f_{3\_1}|$ |
| (1-12) | $f_{3\_1}/f_3$ |
| (1-13) | $|f_{3\_2}/f_3|$ |

| | Example 1 | Example 2 | Example 3 | Example 4 | Example 5 |
|---|---|---|---|---|---|
| (1-1a) | 0.65 | 0.51 | 0.62 | 0.53 | 0.44 |
| (1-2a) | 0.98 | 0.63 | 1.37 | 0.71 | 0.56 |
| (1-3a) | 2.68 | 2.50 | 2.53 | 2.32 | 2.46 |
| (1-1b) | 0.65 | 0.51 | 0.62 | 0.53 | 0.44 |
| (1-2b) | 0.98 | 0.63 | 1.37 | 0.71 | 0.56 |
| (1-3b) | 2.68 | 2.50 | 2.53 | 2.32 | 2.46 |
| (1-4) | 0.27 | 0.20 | 0.27 | 0.29 | 0.24 |
| (1-5) | 1.36 | 0.88 | 1.82 | 0.98 | 1.12 |
| (1-6) | 1.74 | 1.69 | 1.69 | 1.83 | 2.09 |
| (1-7) | 0.65 | 0.67 | 0.67 | 0.79 | 0.85 |
| (1-8) | 2.32 | 2.20 | 2.32 | 2.49 | 2.66 |
| (1-9) | 0.32 | 0.30 | 0.31 | 0.36 | 0.40 |
| (1-10) | 4.80 | 4.81 | 4.81 | 3.86 | 3.86 |
| (1-11) | 1.70 | 1.52 | 2.12 | 1.65 | 1.71 |
| (1-12) | 0.91 | 0.73 | 1.02 | 0.76 | 0.78 |
| (1-13) | 1.54 | 1.12 | 2.15 | 1.25 | 1.33 |

| | Example 6 | Example 7 | Example 8 | Example 9 | Example 10 |
|---|---|---|---|---|---|
| (1-1a) | 0.67 | 0.57 | 0.50 | 0.60 | 0.65 |
| (1-2a) | 2.10 | 0.08 | 0.03 | 0.77 | 1.30 |
| (1-3a) | 3.21 | 1.96 | 1.94 | 2.03 | 2.58 |
| (1-1b) | 0.67 | 0.57 | 0.50 | 0.60 | 0.65 |
| (1-2b) | 2.10 | 0.08 | 0.03 | 0.77 | 1.30 |
| (1-3b) | 3.21 | 1.96 | 1.94 | 2.03 | 2.58 |
| (1-4) | 0.29 | 0.25 | 0.21 | 0.23 | 0.28 |
| (1-5) | 3.72 | 0.12 | 0.05 | 1.13 | 1.94 |
| (1-6) | 1.87 | 1.54 | 1.52 | 1.52 | 1.68 |
| (1-7) | 0.58 | 0.79 | 0.78 | 0.75 | 0.65 |
| (1-8) | 2.94 | 2.04 | 1.97 | 1.86 | 2.39 |
| (1-9) | 0.47 | 0.22 | 0.17 | 0.16 | 0.31 |
| (1-10) | 4.80 | 3.84 | 3.84 | 4.80 | 4.78 |
| (1-11) | 0.47 | 2.75 | 2.42 | 2.44 | 1.80 |
| (1-12) | 1.94 | 0.90 | 0.84 | 0.84 | 0.87 |
| (1-13) | 0.91 | 2.46 | 2.04 | 2.05 | 1.56 |

| Conditional expressions | |
|---|---|
| (2-1) | $|f_{3\_2}/f_{3\_1}|$ |
| (2-2) | $(\beta_{2T}/\beta_{2W})/(\beta_{3T}/\beta_{3W})$ |
| (2-3) | Fno(W) |
| (2-4) | $f_3/f_w$ |
| (2-5) | $\Sigma d_{3G}/f_T$ |
| (2-6) | $f_{3\_1}/f_3$ |
| (2-7) | $|f_{3\_2}/f_3|$ |
| (2-8) | $L_T/f_T$ |
| (2-9) | $f_T/f_w$ |
| (2-10) | $f_2/f_w$ |

| | Example 11 | Example 12 | Example 13 | Example 14 | Example 15 |
|---|---|---|---|---|---|
| (2-1) | 2.72 | 3.25 | 2.19 | 2.34 | 3.72 |
| (2-2) | 0.39 | 0.38 | 0.40 | 0.43 | 0.43 |
| (2-3) | 2.05 | 2.05 | 2.00 | 2.01 | 2.00 |
| (2-4) | 2.36 | 2.40 | 2.40 | 2.28 | 1.99 |
| (2-5) | 0.23 | 0.24 | 0.26 | 0.19 | 0.25 |
| (2-6) | 0.92 | 0.99 | 0.87 | 0.87 | 1.01 |
| (2-7) | 2.50 | 3.22 | 1.89 | 2.46 | 3.77 |
| (2-8) | 2.57 | 2.55 | 2.67 | 2.17 | 2.29 |
| (2-9) | 3.84 | 3.84 | 3.85 | 4.80 | 3.84 |
| (2-10) | −1.94 | −1.87 | −2.12 | −1.80 | −1.86 |

-continued

| Conditional expressions | | Example 16 | Example 17 |
|---|---|---|---|
| (3-1) | $\|f_{3\_2}/f_{3\_1}\|$ | 1.89 | 1.83 |
| (3-2) | $\Sigma d_{3G}/f_T$ | 0.35 | 0.37 |
| (3-3) | Fno(W) | 1.85 | 1.62 |
| (3-4) | $(\beta_{2T}/\beta_{2W})/(\beta_{3T}/\beta_{3W})$ | 0.67 | 0.65 |
| (3-5) | $f_3/f_w$ | 2.16 | 2.24 |
| (3-6) | $f_{3\_1}/f_3$ | 0.86 | 0.78 |
| (3-7) | $\|f_{3\_2}/f_3\|$ | 1.63 | 1.42 |
| (3-8) | $L_T/f_T$ | 2.28 | 2.37 |
| (3-9) | $f_T/f_w$ | 3.86 | 4.80 |
| (3-10) | $f_2/f_w$ | −1.54 | −1.89 |

(Correction of Distortion)

Incidentally, when the zoom lens system of the present invention is used, a digital correction of distortion of an image is carried out electrically. A basic concept for the digital correction of the distortion of an image will be described below.

Figure 35:
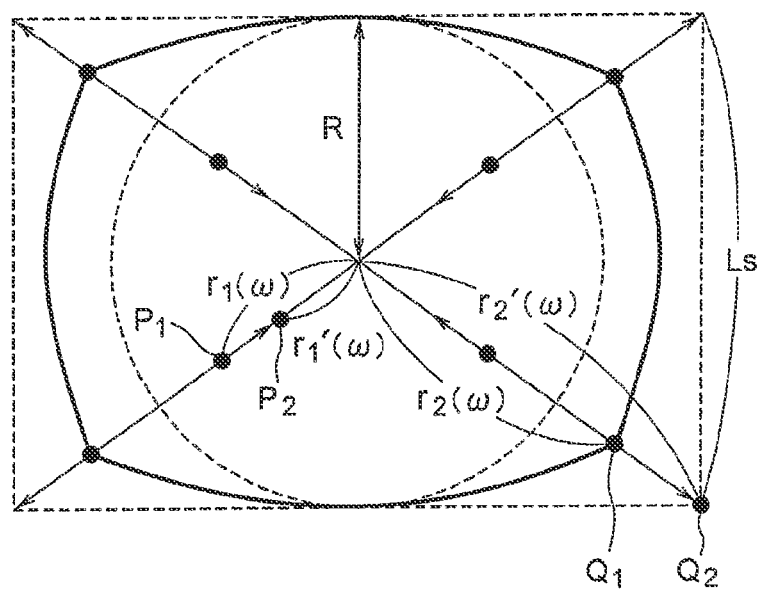
FIG. 35 is a diagram describing a correction of distortion.

For example, as shown in FIG. 35, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius $r(\omega)$ other than the radius R is moved in a substantial direction of radiation, and the correction is carried out by moving on a concentric circle such that the radius becomes $r'(\omega)$.

For example, in FIG. 35, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, $r'(\omega)$ can be expressed as follows.

$$r'(\omega) = \alpha \cdot f \cdot \tan \omega \quad (0 \leq \alpha \leq 1)$$

where, $\omega$ is a half angle of field of an object and f is a focal length of an imaging optical system (the zoom lens system in the present invention).

Here, when an ideal image height corresponding to a circle (image height) of radius R is let to be Y, then $$\alpha = R/Y = R/(f \cdot \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius $r(\omega)$ other than the radius R in a substantial direction of radiation, and moving on a concentric circle such that the radius becomes $r'(\omega)$, it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount $r'(\omega) - r(\omega)$, an arrangement may be made such that a relationship between $r(\omega)$, in other words, half angle of field and the image height, or a relationship between a real image height r and an ideal image height $r'/\alpha$ is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6 Ls$$

where, Ls is a length of a short side of the effective image pickup surface.

It is preferable that the radius R satisfies the following conditional expression.

$$0.3 Ls \leq R \leq 0.6\ Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \cdot \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega)=\alpha \cdot f \cdot \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y/\tan \omega$$

holds.

Here, y denotes a height (image height) of an image point from the optical axis, f denotes a focal length of an imaging system (zoom lens system in the present invention), and ω denotes an angle (object half angle of field) with respect to the optical axis in an object point direction corresponding to image points connecting from a center on an image pickup plane up to a position of y.

When there is a barrel-shape distortion in the imaging system, the relationship becomes $$f > y/\tan \omega.$$

In other words, when the focal length f of the imaging system, and the image height y are let to be fixed, a value of ω becomes large.

(Digital Camera)

Figure 36:
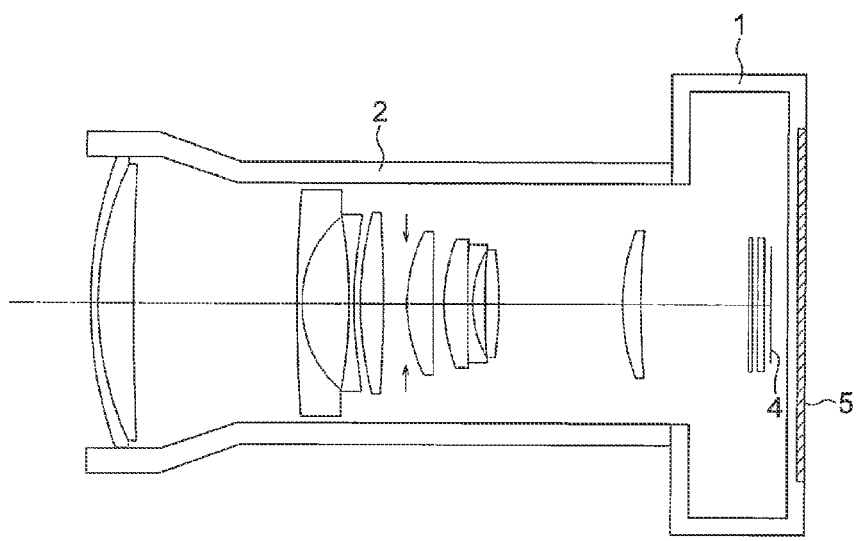
FIG. 36 is a cross-sectional view of a compact camera as an image pickup apparatus in which, a zoom lens according to the present invention is used, and a small-size CCD or CMOS is used as an image pickup element.

FIG. 36 is a cross-sectional view of a compact camera 1 as an image pickup apparatus in which, the zoom lens according to the present invention is used, and a small-size CCD or CMOS is used as an image pickup element. An image pickup lens system 2 is disposed inside a lens barrel of the compact camera 1, and an image pickup element surface 4 and a back monitor 5 are disposed inside a body of the compact camera 1.

Here, by providing a mounting portion to the lens barrel, it is also possible to let the image pickup lens system 2 to be detachable from the body of a single-lens mirrorless camera. For the mounting portion, a mounting of a screw-type or a bayonet type is to be used.

As the image pickup lens system 2 of the compact camera 1 having such an arrangement, a zoom lens according to the present invention disclosed in examples from the example 1 to the sixth example is to be used.

Figure 37:
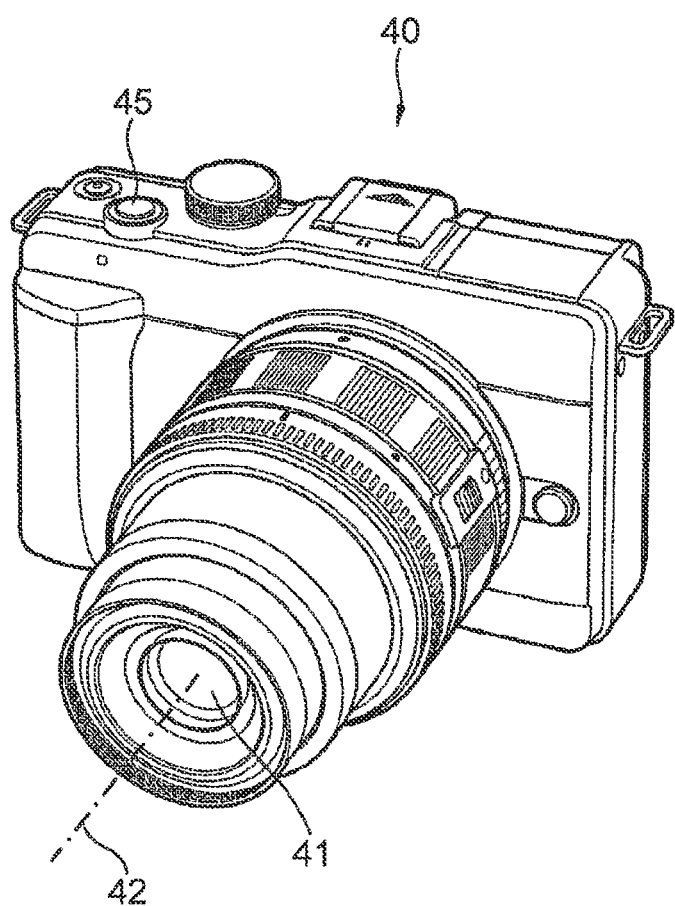
FIG. 37 is a front perspective view showing an appearance of a digital camera as an image pickup apparatus.
Figure 38:
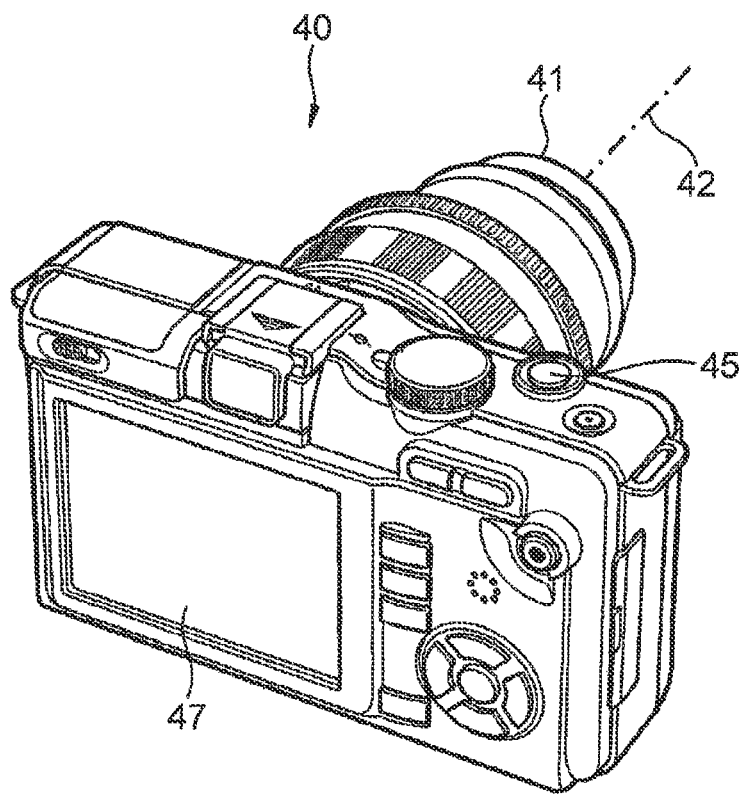
FIG. 38 is a rear perspective view showing an appearance of the digital camera as an image pickup apparatus.

FIG. 37 and FIG. 38 show conceptual diagrams of an arrangement of the image pickup apparatus according to the present invention, in which, the zoom lens is incorporated in an image pickup optical system 41. FIG. 37 is a front perspective view showing an appearance of a digital camera 40 as the image pickup apparatus, and FIG. 38 is a rear perspective view showing an appearance of the digital camera 40 as the image pickup apparatus.

The digital camera 40 according to the present invention includes components such as a photographic optical system 41 positioned in a photographic optical path 42, a shutter button 45, and a liquid-crystal display monitor 47. As the shutter button 45 disposed on an upper portion of the digital camera 40 is pressed, in conjunction with pressing of the shutter button 45, a photograph is taken through the photographic optical system 41 such as the zoom lens according to the example 1. An object image which has been formed by the photographic optical system 41 is formed on an image pickup element (opto-electric conversion surface) provided near an image forming surface. The object image which has been received by the image pickup element is displayed as an electronic image on the liquid-crystal display monitor 47 provided on a rear surface of the digital camera 40, by a processing unit. Moreover, it is possible to record the electronic image which has been captured in a recording unit.

(Internal Circuit Structure)

Figure 39:
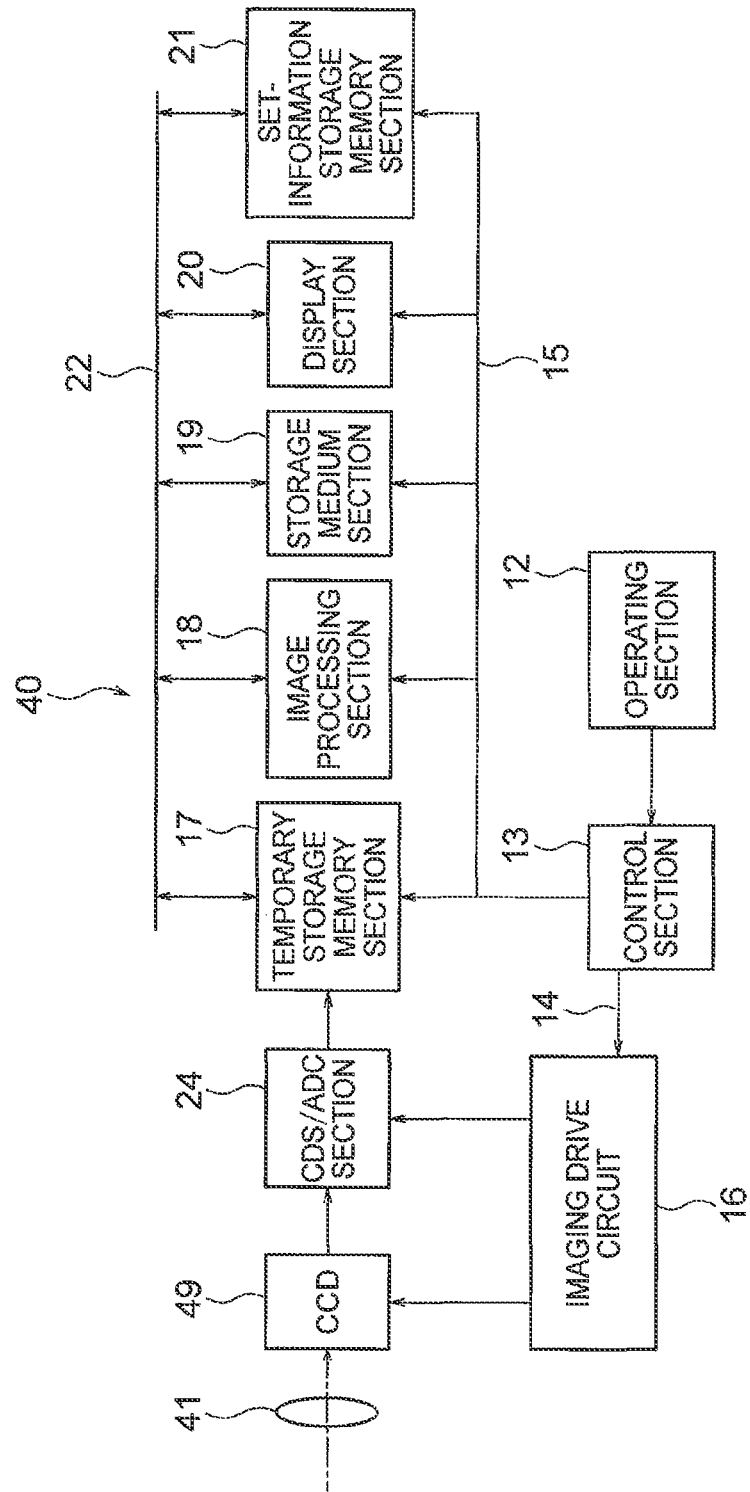
FIG. 39 is a block diagram showing an internal circuit of main components of the digital camera.

FIG. 39 is a structural block diagram of an internal circuit of main components of the digital camera 40. In the following description, the processing means described above includes for instance, a CDS/ADC section 24, a temporary storage memory 17, and an image processing section 18, and a storage means consists of a storage medium section for example.

As shown in FIG. 39, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 116.

The operating section 12 includes various input buttons and switches, and is a circuit which informs the control section 13, event information which is input from outside (by a user of the digital camera) via these input buttons and switches.

The control section 13 is a central processing unit (CPU), and has a built-in computer program memory which is not shown in the diagram. The control section 13 is a circuit which controls the entire digital camera 40 upon receiving instructions and commands input by the user of the camera via the operating section 112, according to a computer program stored in this computer program memory.

The CCD 49 receives as light an object image which is formed via the taking optical system 41 according to the present invention. The CCD 49 is an image pickup element which is driven and controlled by the imaging drive circuit 16, and which converts an amount of light for each pixel of the object image to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 is a control circuit of a device in which, the RAW data transferred from the temporary storage memory 17 and image data subjected to image processing in the image processing section 18 are recorded and maintained in the card flash memory and the stick flash memory.

The display section 20 includes the liquid-crystal display monitor 47 which displays RAW data, image data and operation menu on the liquid-crystal display monitor 47. The set-information storage memory section 21 includes a ROM section in which various image quality parameters are stored in advance, and a RAM section which stores image quality parameters which are selected by an input operation on the operating section 12, from among the image quality parameters which are read from the ROM section.

The digital camera 40 structured in such manner has the taking optical system 41, according to the present invention, which could perform a zooming operation and which could set a first mode and a second mode. In the first mode, it could perform a zooming operation including an infinity state, while it could perform a zooming operation with a large shooting magnification. The image pickup apparatus could be achieved having an advantage for performing both small-size and high performance.

As it has been described above, the zoom lens according to the present invention is useful for small-sizing and for securing an optical performance while having a high zooming ratio.

According to the present invention, an effect is shown that it is possible to provide a zoom lens having a compact arrangement, with a small F-number, or in other words, with a large aperture, which is a zoom lens with high zooming, and favorable aberration performance, in which, a lens diameter and the number of lenses are suppressed to be small.

What is claimed is:

1. A zoom lens comprising in order from an object side:
a first lens unit having a positive refractive power;
a second lens unit having a negative refractive power;
a third lens unit having a positive refractive power; and
a fourth lens unit having a positive refractive power, wherein
at the time of zooming, the first lens unit moves, and the zoom lens satisfies the following conditional expressions (1-1a), (1-2a), and (1-3a)

$$0.43<(\beta_{2T}/\beta_{2W})/(\beta_{3T}/\beta_{3W})<0.68 \quad (1\text{-}1a)$$

$$0.4<(\Delta_{1G}/f_1)/(\Delta_{4G}/f_4)<2.3 \quad (1\text{-}2a)$$

$$2.1<f_3/f_W<4.1 \quad (1\text{-}3a)$$

where,
$\beta_{2W}$ denotes a lateral magnification at a wide angle end of the second lens unit,
$\beta_{2T}$ denotes a lateral magnification at a telephoto end of the second lens unit,
$\beta_{3W}$ denotes a lateral magnification at a wide angle end of the third lens unit,
$\beta_{3T}$ denotes a lateral magnification at a telephoto end of the third lens unit,
$\Delta_{1G}$ denotes an amount of movement of the first lens unit at the time of zooming from the wide angle end to the telephoto end,
$\Delta_{4G}$ denotes an amount of movement of the fourth lens unit at the time of zooming from the wide angle end to the telephoto end,
$f_1$ denotes a focal length of the first lens unit,
$f_3$ denotes a focal length of the third lens unit,
$f_4$ denotes a focal length of the fourth lens unit, and
$f_W$ denotes a focal length of the overall zoom lens system at the wide angle end.

2. The zoom lens according to claim 1, wherein the first lens unit includes a cemented lens.

3. The zoom lens according to claim 1, wherein the zoom lens satisfies the following conditional expression (1-4)

$$0.12<(\beta_{4T}/\beta_{4W})/(\beta_{3T}/\beta_{3W})<0.4 \quad (1\text{-}4)$$

$\beta_{4W}$ denotes a lateral magnification at a wide angle end of the fourth lens unit,
$\beta_{4T}$ denotes a lateral magnification at a telephoto end of the fourth lens unit.

4. The zoom lens according to claim 1, wherein the zoom lens satisfies the following conditional expression (1-5)

$$0<\Delta_{1G}/\Delta_{4G}<4 \quad (1\text{-}5)$$

where,
$\Delta_{1G}$ denotes the amount of movement of the first lens unit at the time of zooming from the wide angle end to the telephoto end, and
$\Delta_{4G}$ denotes the amount of movement of the fourth lens unit at the time of zooming from the wide angle end to the telephoto end.

5. The zoom lens according to claim 1, wherein the zoom lens satisfies the following conditional expression (1-6)

$$1.4<|f_2/f_W|<3 \quad (1\text{-}6)$$

where,
$f_2$ denotes a focal length of the second lens unit, and
$f_W$ denotes the focal length of the overall zoom lens system at the wide angle end.

6. The zoom lens according to claim 1, wherein the zoom lens satisfies the following conditional expression (1-7)

$$0.3<|f_2/f_3|<1.5 \quad (1\text{-}7)$$

where,
$f_2$ denotes a focal length of the second lens unit, and
$f_3$ denotes the focal length of the third lens unit.

7. The zoom lens according to claim 1, wherein the zoom lens satisfies the following conditional expression (1-8)

$$L_T/f_T<3.3 \quad (1\text{-}8)$$

where,
$L_T$ denotes a total length of the overall zoom lens system at the telephoto end, and
$f_T$ denotes a focal length of the overall zoom lens system at the telephoto end.

8. The zoom lens according to claim 1, wherein the zoom lens satisfies the following conditional expression (1-9)

$$\Sigma d_{3G}/f_T<0.5 \quad (1\text{-}9)$$

where,
$\Sigma d_{3G}$ denotes a total length of the third lens unit, and
$f_T$ denotes a focal length of the overall zoom lens system at the telephoto end.

9. The zoom lens according to claim 1, wherein the zoom lens satisfies the following conditional expression (1-10)

$$3.1<f_T/f_W<10 \quad (1\text{-}10)$$

where,
$f_W$ denotes the focal length of the overall zoom lens system at the wide angle end, and
$f_T$ denotes a focal length of the overall zoom lens system at the telephoto end.

10. The zoom lens according to claim 1, wherein the zoom lens satisfies the following conditional expression (1-11)

$$1.3<|f_{3\_2}/f_{3\_1}|<5 \quad (1-11)$$

wherein, $f_{3\_1}$ denotes a focal length of a lens component nearest to the object side, from among two or more than two lens components in the third lens unit, and $f_{3\_2}$ denotes a focal length of a lens component on the object side next to the lens component nearest to the object side, from among the two or more than two lens components in the third lens unit.

11. The zoom lens according to claim 1, wherein the zoom lens satisfies the following conditional expression (1-12)

$$0.6<f_{3\_1}/f_3<1.2 \quad (1-12)$$

where, $f_{3\_1}$ denotes a focal length of a lens component nearest to the object side, from among two or more than two lens components in the third lens unit, and $f_3$ denotes the focal length of the third lens unit.

12. The zoom lens according to claim 1, wherein the zoom lens satisfies the following conditional expression (1-13)

$$0.9<|f_{3\_2}/f_3|<4 \quad (13)$$

where, $f_{3\_2}$ denotes a focal length of a lens component on the object side next to the lens component nearest to the object side, from among two or more than two lens components in the third lens unit, and $f_3$ denotes the focal length of the third lens unit.

13. An image pickup apparatus comprising:
a zoom lens; and
an image pickup element which includes an image pickup surface which is disposed on an image side of the zoom lens, and which receives an image formed by the zoom lens, wherein
the zoom lens is a zoom lens according to claim 1.

14. A zoom lens comprising in order from an object side:
a first lens unit having a positive refractive power;
a second lens unit having a negative refractive power;
a third lens unit having a positive refractive power; and
a fourth lens unit having a positive refractive power, wherein
at the time of zooming, the first lens unit moves, and
the first lens unit includes in order from the object side, a first lens having a negative refractive power, and a second lens having a positive refractive power, and
the zoom lens satisfies the following conditional expressions (1-1b) and (1-2b)

$$0.2<(\beta_{2T}/\beta_{2W})/(\beta_{3T}/\beta_{3W})<0.8 \quad (1-1b)$$

$$0<(\Delta_{1G}/f_1)/(\Delta_{4G}/f_4)<1.5 \quad (1-2b)$$

where, $\beta_{2W}$ denotes a lateral magnification at a wide angle end of the second lens unit, $\beta_{2T}$ denotes a lateral magnification at a telephoto end of the second lens unit, $\beta_{3W}$ denotes a lateral magnification at a wide angle end of the third lens unit, $\beta_{3T}$ denotes a lateral magnification at a telephoto end of the third lens unit, $\Delta_{1G}$ denotes an amount of movement of the first lens unit at the time of zooming from the wide angle end to the telephoto end, $\Delta_{4G}$ denotes an amount of movement of the fourth lens unit at the time of zooming from the wide angle end to the telephoto end, $f_1$ denotes a focal length of the first lens unit, and $f_4$ denotes a focal length of the fourth lens unit.

15. The zoom lens according to claim 14, wherein the zoom lens satisfies the following condition (1-3b)

$$1.8<f_3/f_W<4.1 \quad (1-3b)$$

where, $f_3$ denotes a focal length of the third lens unit, and $f_W$ denotes a focal length of the overall zoom lens system at the wide angle end.

16. A zoom lens comprising in order from an object side,
a first lens unit having a positive refractive power;
a second lens unit having a negative refractive power; and
a third lens unit having a positive refractive power, wherein
the third lens unit comprises in order from the object, a first lens component having a positive refractive power and a second lens component having a negative refractive power,
the zoom lens satisfies the following conditional expressions (2-1), (2-2), and (2-3)

$$2<|f_{3\_2}/f_{3\_1}|<5 \quad (2-1)$$

$$0.1<(\beta_{2T}/\beta_{2W})/(\beta_{3T}/\beta_{3W})<0.8 \quad (2-2)$$

$$Fno(W)<2.5 \quad (2-3)$$

where, $f_{3\_1}$ denotes a focal length of the first lens component in the third lens unit, $f_{3\_2}$ denotes a focal length of the second lens component in the third lens unit, $\beta_{2W}$ denotes a lateral magnification at a wide angle end of the second lens unit, $\beta_{2T}$ denotes a lateral magnification at a telephoto end of the second lens unit, $\beta_{3W}$ denotes a lateral magnification at a wide angle end of the third lens unit, $\beta_{3T}$ denotes a lateral magnification at a telephoto end of the third lens unit, $\Delta_{1G}$ denotes an amount of movement of the first lens unit at the time of zooming from the wide angle end to the telephoto end, $\Delta_{4G}$ denotes an amount of movement of the fourth lens unit at the time of zooming from the wide angle end to the telephoto end, and Fno (W) denotes F number at a wide angle end.

17. The zoom lens according to claim 16, wherein the zoom lens satisfies the following conditional expression (2-4)

$$1.9<f_3/f_W<5 \quad (2-4)$$

where, $f_3$ denotes a focal length of the third lens unit, and $f_W$ denotes a focal length of the overall zoom lens system at the wide angle end.

18. The zoom lens according to claim 16, wherein the zoom lens satisfies the following conditional expression (2-5)

$$\Sigma d_{3G}/f_T<0.42 \quad (2-5)$$

$\Sigma d_{3G}$ denotes a total length of the third lens unit, $f_T$ denotes a focal length of the overall zoom lens system at the telephoto end.

19. The zoom lens according to claim 16, wherein the zoom lens satisfies the following conditional expression (2-6)

$$0.6<|f_{3\_1}/f_3|<1.2 \quad (2-6)$$

where, $f_{3\_1}$ denotes a focal length of the first lens component in the third lens unit, and $f_3$ denotes the focal length of the third lens unit.

20. The zoom lens according to claim 16, wherein the zoom lens satisfies the following conditional expression (2-7)

$$0.9 < |f_{3\_2}/f_3| < 4 \quad (2\text{-}7)$$

where, $f_{3\_2}$ denotes a focal length of the second lens component in the third lens unit, and $f_3$ denotes the focal length of the third lens unit.

21. The zoom lens according to claim 16, wherein the zoom lens satisfies the following conditional expression (2-8)

$$L_T/f_T < 3.3 \quad (2\text{-}8)$$

where, $L_T$ denotes a total length of the overall zoom lens system at the telephoto end, and $f_T$ denotes a focal length of the overall zoom lens system at the telephoto end.

22. The zoom lens according to claim 16, wherein the zoom lens satisfies the following conditional expression (2-9)

$$3.1 < f_T/f_W < 10 \quad (2\text{-}9)$$

where, $f_W$ denotes the focal length of the overall zoom lens system at the wide angle end, and $f_T$ denotes a focal length of the overall zoom lens system at the telephoto end.

23. The zoom lens according to claim 16, wherein the zoom lens satisfies the following conditional expression (2-10)

$$-5 < f_2/f_W < -1.5 \quad (2\text{-}10)$$

where, $f_2$ denotes a focal length of the second lens unit, and $f_W$ denotes a focal length of the overall zoom lens system at the wide angle end.

24. An image pickup apparatus comprising:

a zoom lens; and an image pickup element which includes an image pickup surface which is disposed on an image side of the zoom lens, and which receives an image formed by the zoom lens, wherein the zoom lens is the zoom lens according to claim 16.

25. A zoom lens comprising in order from an object side:

a first lens unit having a positive refractive power;

a second lens unit having a negative refractive power; and a third lens unit having a positive refractive power, wherein the first lens unit includes in order from the object side, a first lens having a negative refractive power, and a second lens having a positive refractive power, and the third lens unit includes in order from the object side, a first lens component having a positive refractive power, a second lens component having a negative refractive power, and a third lens component, and the zoom lens satisfies the following conditional expressions (3-1), (3-2), and (3-3)

$$1.3 < |f_{3\_2}/f_{3\_1}| < 5 \quad (3\text{-}1)$$

$$\Sigma d_{3G}/f_T < 0.42 \quad (3\text{-}2)$$

$$Fno(W) < 2.5 \quad (3\text{-}3)$$

where, $f_{3\_1}$ denotes a focal length of the first lens component having a positive refractive power in the third lens unit, $f_{3\_2}$ denotes a focal length of the second lens component having a negative refractive power in the third lens unit, $\Sigma d_{3G}$ denotes a total length of the third lens unit, $f_T$ denotes a focal length of the overall zoom lens system at the telephoto end, and $Fno(W)$ denotes an F-number of the zoom lens at the wide angle end.

26. The zoom lens according to claim 25, wherein the first lens unit includes a cemented lens.

27. The zoom lens according to claim 25, wherein the zoom lens satisfies the following conditional expression (3-4)

$$0.1 < (\beta_{2T}/\beta_{2W})/(\beta_{3T}/\beta_{3W}) < 0.8 \quad (3\text{-}4)$$

where, $\beta_{2W}$ denotes a lateral magnification at a wide angle end of the second lens unit, $\beta_{2T}$ denotes a lateral magnification at a telephoto end of the second lens unit, $\beta_{3W}$ denotes a lateral magnification at a wide angle end of the third lens unit, $\beta_{3T}$ denotes a lateral magnification at a telephoto end of the third lens unit.

28. The zoom lens according to claim 25, wherein the zoom lens satisfies the following conditional expression (3-5)

$$2 < f_3/f_W < 5 \quad (2\text{-}5)$$

where, $f_3$ denotes a focal length of the third lens unit, and $f_W$ denotes a focal length of the overall zoom lens system at the wide angle end.

29. The zoom lens according to claim 25, wherein the zoom lens satisfies the following conditional expression (3-6)

$$0.6 < f_{3\_1}/f_3 < 1.2 \quad (3\text{-}6)$$

where, $f_{3\_1}$ denotes a focal length of the first lens component in the third lens unit, and $f_3$ denotes the focal length of the third lens unit.

30. The zoom lens according to claim 25, wherein the zoom lens satisfies the following conditional expression (3-7)

$$0.9 < |f_{3\_2}/f_3| < 4 \quad (3\text{-}7)$$

where, $f_{3\_2}$ denotes a focal length of the second lens component in the third lens unit, and $f_3$ denotes the focal length of the third lens unit.

31. The zoom lens according to claim 25, wherein the zoom lens satisfies the following conditional expression (3-8)

$$L_T/f_T < 3.3 \quad (3\text{-}8)$$

where, $L_T$ denotes a total length of the overall zoom lens system at the telephoto end, and $f_T$ denotes a focal length of the overall zoom lens system at the telephoto end.

32. The zoom lens according to claim 25, wherein the zoom lens satisfies the following conditional expression (3-9)

$$3.1 < f_T/f_W < 10 \quad (3\text{-}9)$$

where, $f_W$ denotes the focal length of the overall zoom lens system at the wide angle end, and $f_T$ denotes a focal length of the overall zoom lens system at the telephoto end.

33. The zoom lens according to claim 25, wherein the zoom lens satisfies the following conditional expression (3-10)

$$-5 < f_2/f_W < -1.5 \quad (3\text{-}10)$$

where,
$f_2$ denotes a focal length of the second lens unit, and
$f_W$ denotes a focal length of the overall zoom lens system at the wide angle end.

34. An image pickup apparatus comprising:
a zoom lens; and
an image pickup element which includes an image pickup surface which is disposed on an image side of the zoom lens, and which receives an image formed by the zoom lens, wherein
the zoom lens is the zoom lens according to claim 25.

* * * * *